Figure 5:
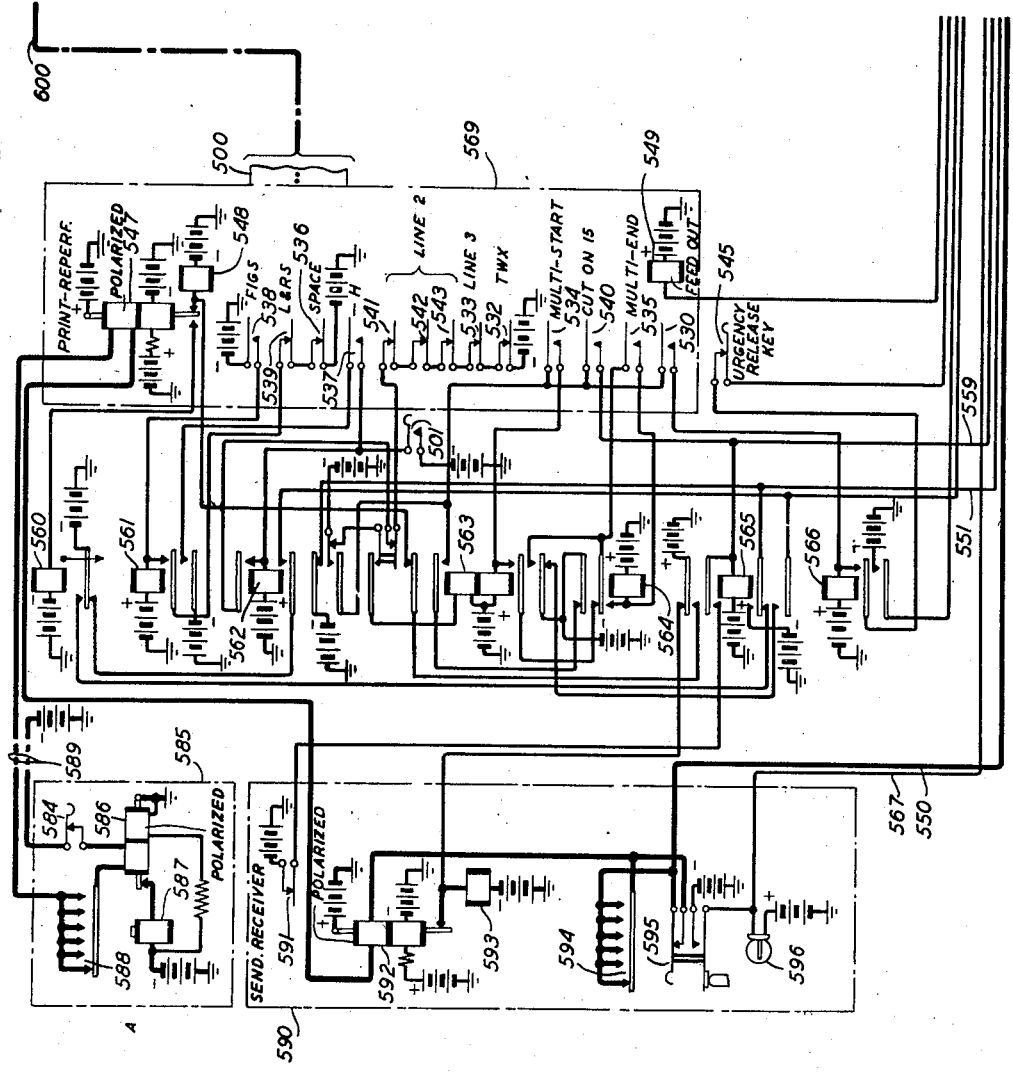

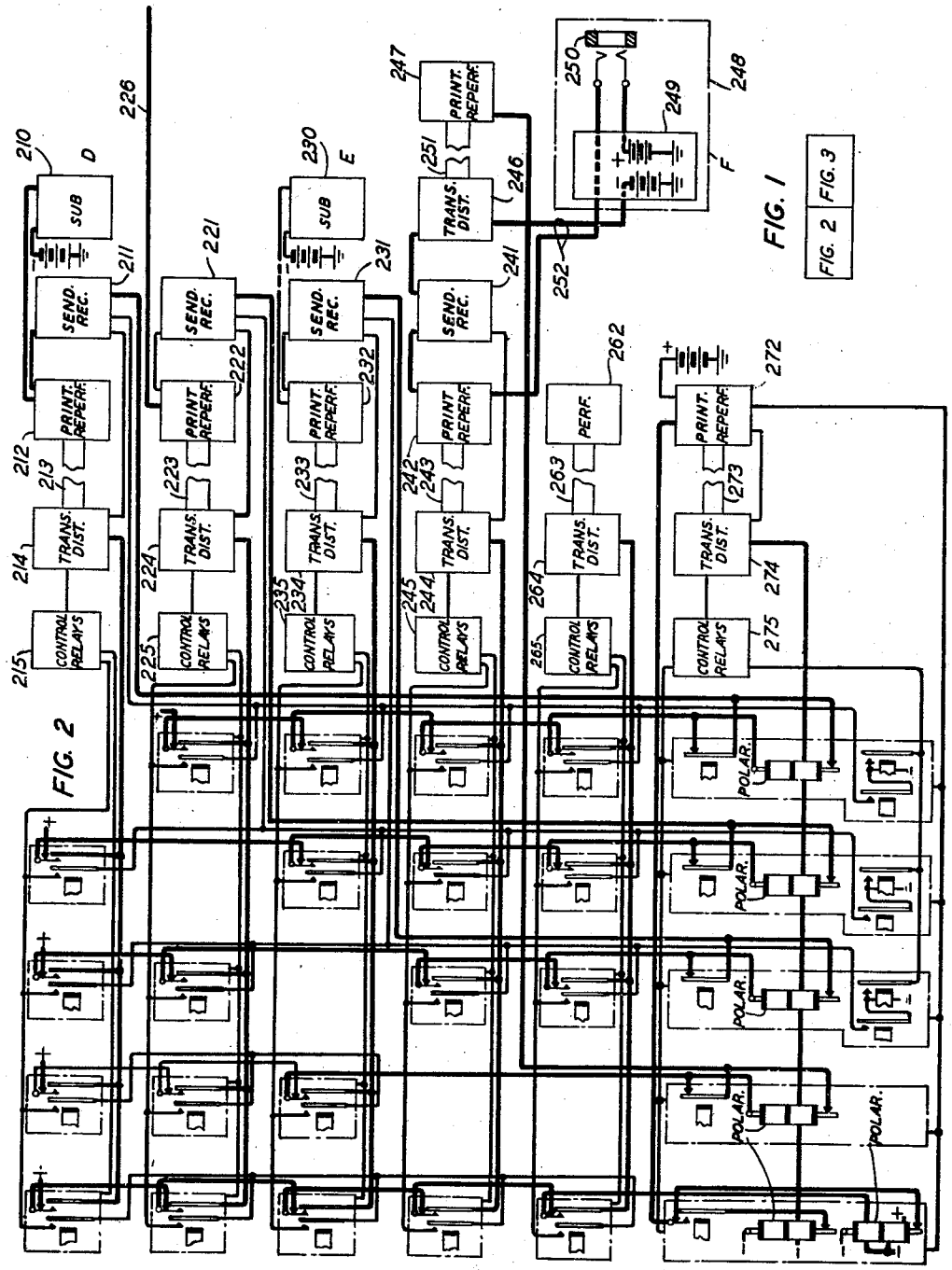

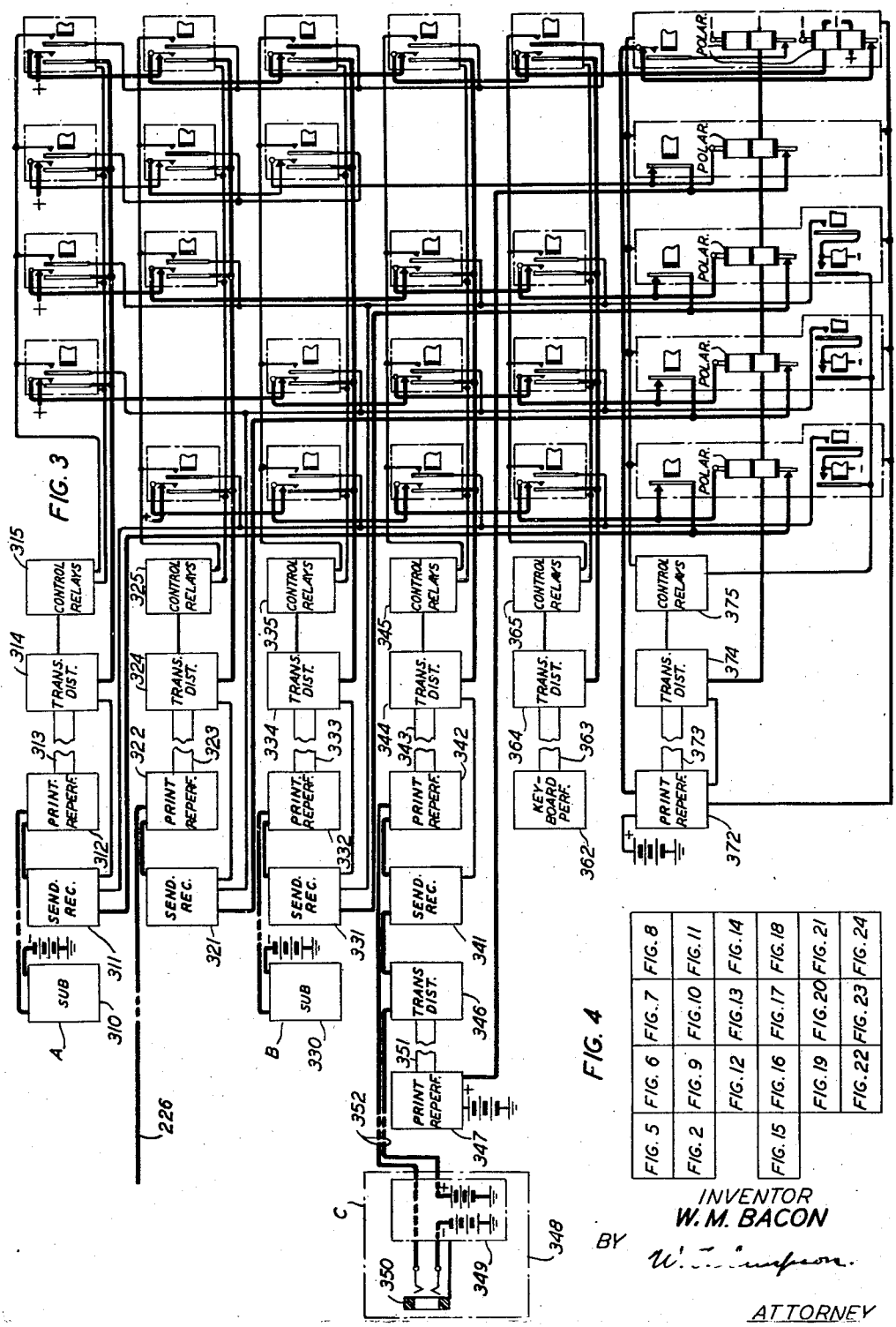

Jan. 8, 1946.   W. M. BACON   2,392,356
TELEGRAPH SYSTEM
Filed May 31, 1941   23 Sheets-Sheet 3

INVENTOR
W. M. BACON
BY
W. F. Simpson
ATTORNEY

Jan. 8, 1946.    W. M. BACON    2,392,356
TELEGRAPH SYSTEM
Filed May 31, 1941    23 Sheets-Sheet 9

INVENTOR
W. M. BACON
BY W. F. Simpson
ATTORNEY

Jan. 8, 1946.   W. M. BACON   2,392,356
TELEGRAPH SYSTEM
Filed May 31, 1941   23 Sheets-Sheet 13

FIG. 15

INVENTOR
W. M. BACON
BY
ATTORNEY

Jan. 8, 1946.　　　W. M. BACON　　　2,392,356
TELEGRAPH SYSTEM
Filed May 31, 1941　　　23 Sheets-Sheet 16

INVENTOR
W. M. BACON
BY W. F. Simpson
ATTORNEY

Jan. 8, 1946.  W. M. BACON  2,392,356
TELEGRAPH SYSTEM
Filed May 31, 1941  23 Sheets-Sheet 19

INVENTOR
W. M. BACON
BY
ATTORNEY

Jan. 8, 1946.  W. M. BACON  2,392,356
TELEGRAPH SYSTEM
Filed May 31, 1941   23 Sheets-Sheet 20

INVENTOR
W. M. BACON
BY
W. F. Simpson
ATTORNEY

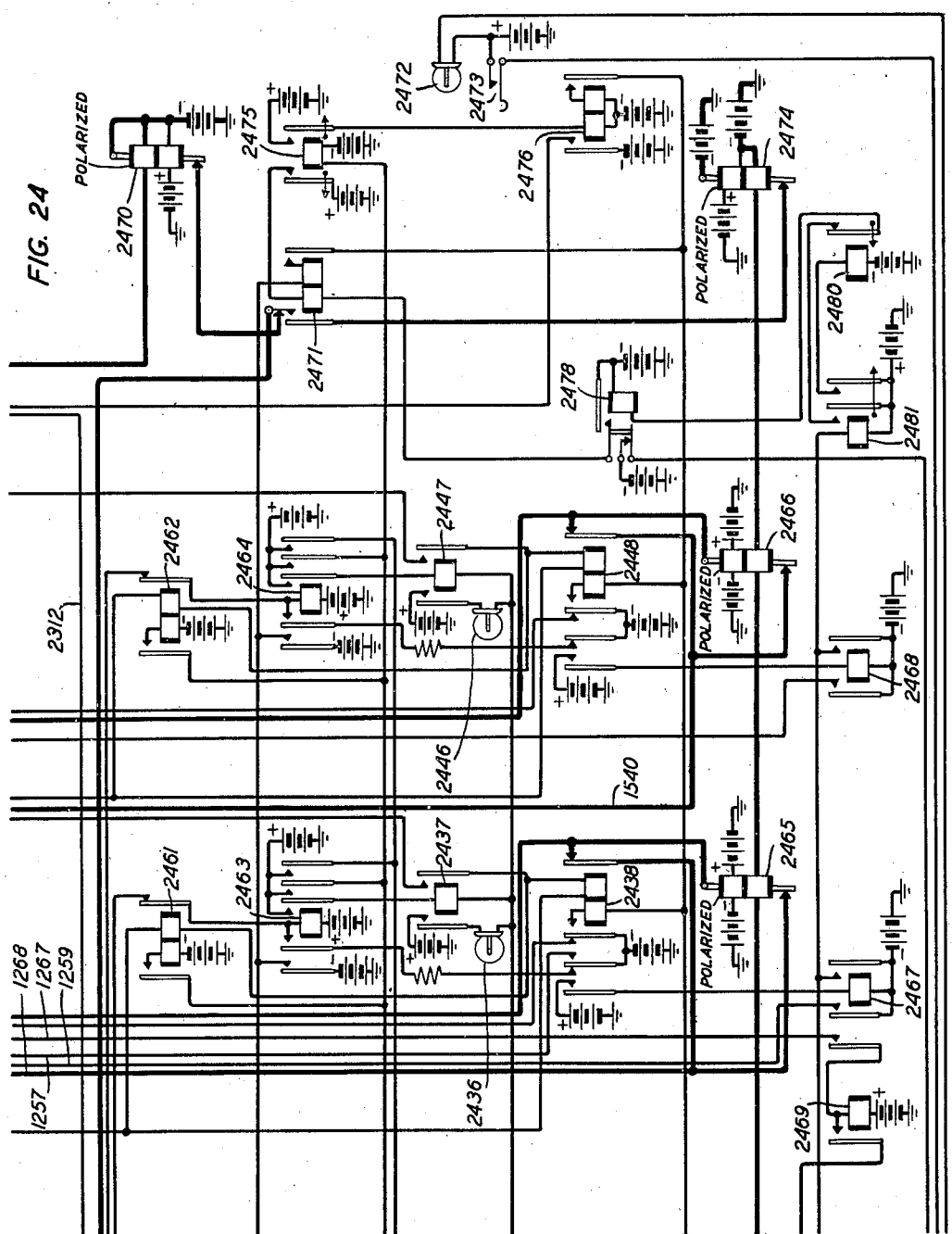

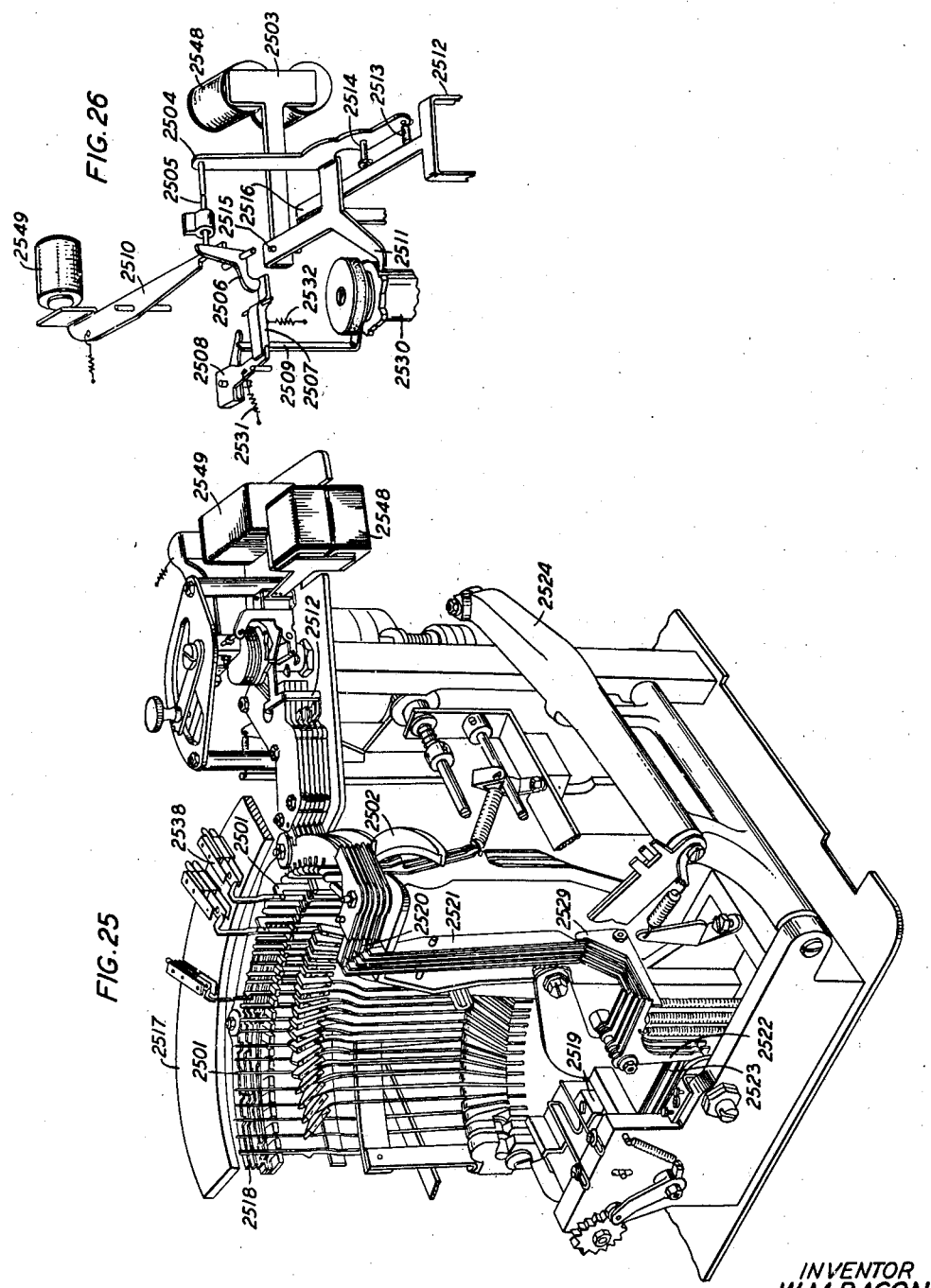

Patented Jan. 8, 1946

2,392,356

UNITED STATES PATENT OFFICE 2,392,356

TELEGRAPH SYSTEM

Walter M. Bacon, New York, N. Y., assignor to Bell Telephone Laboratories, Incorporated, New York, N. Y., a corporation of New York Application May 31, 1941, Serial No. 396,203

101 Claims. (Cl. 178—3)

This invention relates to communication systems and more particularly to automatic switching systems controlled by permutation code groups of signaling impulses.

This invention is directed to a full automatic switching system which will provide substantially all of the operating features, without the assistance of an operator at the switching station, as provided by the manual switching system disclosed in applicant's copending application Serial No. 371,521, filed December 24, 1940.

An embodiment of this invention is directed to telegraph systems and more particularly to automatic switching systems for use in telegraph networks.

In previous communication systems except the manual system of this applicant identified above, it has been necessary to transmit messages from one station every time it is desired to send it to another station or to transmit it from one station to a plurality of other stations simultaneously.

It is an object of the present invention to provide an automatic switching arrangement and method of switching in which a telegraph message may be transmitted from any one of a plurality of stations through one or more switching stations to one or more of a plurality of other connected stations without requiring all of the stations to which the message is directed or lines or trunks extending thereto to be simultaneously idle and without requiring the retransmission of the message from the originating station each time it is transmitted to any of the stations or lines or trunks for which it is directed.

In the previous telegraph systems it has been the custom to transmit directing signals preceding each message. When it was necessary to transmit the message automatically through more than one switching station or apparatus it has been necessary to transmit a character or group of signals for controlling the switching apparatus at each of said stations or each stage of the switching apparatus. The characters or signals controlling each step in the switching system are absorbed by the apparatus controlling that step of the switching operation and the remaining signals transmitted on to the next stage or step of the system. This requires the transmission of a considerable number of switching signals preceding each message and in addition requires the transmission of different signaling impulses preceding each message directed to a given station or apparatus depending upon the station from which the message is transmitted, that is, the station from which it originates.

It is another object of this invention to provide an improved automatic switching system in which the same groups of signaling impulses are employed to control the switching apparatus at each stage or step in a switching system and then to transmit the switching signals on to the succeeding stage and then finally to the desired station. This arrangement has the advantage that each station is designated by a given group or groups of signaling impulses and all messages originating in the system irrespective of the station at which they originate and from which they are transmitted are directed to the desired station by the same group or groups of switching impulses. In addition the number of switching impulses preceding each message is greatly reduced which results in a more convenient method of operation and enables a considerable portion of the time normally required for transmission of signaling impulses to be saved and rendered available for the transmission of the message signals.

Another object of this invention is to provide an automatic communication system in which additional switching centers may be added at will through which messages may be transmitted to other stations and from which messages may be directed to the existing stations connected to existing switching senders without changes, additions or alterations of switching information required to be transmitted preceding messages intended for any of the existing stations.

Another object of this invention is to provide an automatic repeating arrangement which is capable of receiving and storing messages and directing them to one or more than one station connected to the switching system to which it is desired that the messages shall proceed.

It is an object of this invention to arrange this repeating apparatus to automatically and simultaneously transmit messages stored therein to a number of stations for which the message is intended and which are idle at that time. If any of the lines or stations to which the message is directed are busy the system is arranged to repeat the message to itself so that the message will be available for transmission to the other line or lines, station or stations, to which the message is directed when they become idle.

Another object of this invention is to provide an automatic broadcasting arrangement and method in which messages may be automatically transmitted from any one of a plurality of stations to any of a plurality of stations to which it is desired to broadcast either simultaneously or in succession as said stations become idle.

Another object of this invention relates to an automatic break feature and method which enables the attendant or operator at one of the telegraph stations to signal the operator at the central switching station during the reception of messages at said one station and to interrupt the transmission of messages to said station.

Another object of this invention is to provide an overflow circuit to which messages may be directed by the operator at the central switching station in case the station for which the message is intended is busy and from which the message is automatically transmitted to said station when it becomes idle.

Another object of this invention is to provide means for signaling the operator at the central switching station in case any of the stations connected thereto transmits an urgent message, the transmission of which it is desired to expedite.

A further feature of this invention relates to a means of and method for operating an additional signal when an urgent message has been transmitted to the station or line to which it is directed during the normal course of operation of said switching system.

Another object of this invention is to provide equipment to store the messages at the central switching station in the form of a perforated or punched tape and at the same time to print the message on said tape so that the operator may readily read the message perforated in the tape together with symbols indicating all the stations to which it is to be transmitted.

It is a further object of this invention to provide receiving apparatus capable of both printing the received message on a tape and storing a multiple directed message in said tape by means of perforations or punches in said tape and at the same time to selectively operate one of a plurality of switches.

Another object of this invention is to provide circuits for and methods of receiving and storing messages from other types of telegraph switching systems for transmission through the switching system in accordance with this invention.

Another object of this invention is to provide circuits for storing messages originating within the telegraph system arranged in accordance with this invention, transmitting them over other types of telegraph systems, particularly other types of switching systems employed in the telegraph network to the stations to which the messages are directed.

Another object is to provide improved methods and systems for transmitting automatically code directed messages in two directions over a two-way trunk or telegraphic transmission path.

Another object is to expedite the transmission of messages from a storage point to a plurality of ultimate transmission points by providing for their transmission over idle channels immediately and over channels busy at the initiation of the first transmission by a later transmission.

Another object is to provide improved means and methods of directing code combinations emitted from a transmitter controlled by stored signals by controlling them conjointly and automatically by stored signals and the condition of paths of transmission.

Another object is to improve telegraph transmission by causing a telegraph transmitter controlled by a storage medium to selectively restore messages or code combinations in the storage medium.

Another object is to provide improved telegraph transmission systems by application of the principle of marking channels over which stored signals are to be later transmitted as an incident of the storage.

The foregoing objects and features of this invention, the novel features of which are specifically pointed out in the claims appended hereto, may be more fully and more readily understood from the following description read with reference to the attached drawings in which:

Fig. 1 illustrates the manner of placing Fig. 3 adjacent to Fig. 2 to form a diagrammatic outline of a typical telegraph system in accordance with this invention;

Figs. 2 and 3, when positioned as shown in Fig. 1, show in abbreviated form the various stations, elements and apparatus in the manner in which they all cooperate to form a typical telegraph switching system in accordance with this invention;

Fig. 4 illustrates the manner in which Figs. 2 and 5 through 24 are positioned adjacent each other;

Figs. 2 and 5 through 24 when positioned as shown in Fig. 4 show in detail various circuits and apparatus employed in a typical telegraph system in accordance with this invention; and Figs. 25 and 26 show certain mechanical details and structural features of a typical typing reperforator suitable for use in the exemplary system embodying the present invention and described in the present application.

GENERAL DESCRIPTION

Referring now to Figs. 2 and 3, when arranged as shown in Fig. 1, Fig. 2 represents a switching center or station together with representations of the different apparatus and equipment associated therewith and also the lines and stations connected to this switching center. Two representative outlying or subscriber stations 210 and 230 are shown in Fig. 2.

A trunk circuit 226 extends to a second switching station shown in Fig. 3 which is similar to the switching center or station shown in Fig. 2. Here two representative subscriber stations are shown at 310 and 330. In addition, trunks or connections to other switching stations 248 and 348 are shown together with the associated equipment for connecting them to the switching system shown in Figs. 2 and 3. At each of the central stations a local transmitting arrangement is provided and indicated at 262 and 362, respectively.

Each subscriber's station, as, for example, 210, is connected over a telegraph line to its respective central switching station. At the central switching station the line terminates in receiving and switching equipment. In the preferred embodiment of this invention, two types of receiving equipment are associated with each of the lines connected to an outlying station. One of the receiving equipments is designed to record messages intended for the central switching station while the other receiving apparatus is employed to record or store the messages intended for other stations which may be reached through the switching equipment.

In a preferred embodiment of this invention the receiving equipment for receiving messages intended for the central switching station is a teletypewriter or other teleprinting mechanism while the equipment for receiving messages directed to other stations is a reperforating mechanism which may or may not be also provided with a printing means for both printing the message and perforating tape. Auxiliary contacts are provided for both of these machines and controlled by them so that, generally speaking, either of these machines may be connected to the incoming line and the other disconnected therefrom, depending upon the destination of the following message.

To accomplish the various switching functions at the central switching station, certain characters or combinations of characters are transmitted from the outlying subscriber's station to the central station preceding each message or group of messages it is desired to transmit through the system to any other station which may be reached through the system.

The switching combinations preceding each message or group of messages are employed to control the auxiliary contacts associated with equipment at the central station and, in the case of the receiving devices 211 and 212, they determine which of the two devices will receive the message. Under certain circumstances, as pointed out hereinafter, both of these devices may simultaneously receive the same message.

The messages received by the reperforator 212 are recorded in a tape or other signal storing means 213. This tape controls the transmitting device 214 which, in turn, controls selecting relays 215. The selecting relays control switching relays for connecting the transmitting apparatus 214 for transmission to any of the other lines connected to the system.

Means are also provided for causing any of the incoming lines to test busy as soon as signals are received from it so that another transmitter can not be connected to it until the message or group of messages in the progress of transmission over this line have been completed. The line is also made busy when messages are transmitted from any of the transmitting apparatus at the switching station so that none of the other transmitting apparatus at the central switching station will be able to attempt to transmit to this line at that time. Thus interference with the messages being transmitted is prevented. Each of the other outlying stations, such as 230, is similarly provided with lines extending from it to the central switching station where receiving apparatus 231 is provided for receiving messages intended for the central switching station and apparatus 232 intended for recording the messages directed to other stations which may be reached through the system. This apparatus records the signals in tape 233 which tape, in turn, controls the transmitter 234. The switching signals preceding the message cause this transmitter to control the selecting relays 235 to connect the transmitter through the switching equipment to the proper line.

Trunk circuits including the usual types of transmitting and terminating equipment, including repeaters, networks, etc., which are necessary or usually employed in trunk circuits and long line transmission circuits, such as 226, extending to other switching stations may be similarly provided with two types of receiving equipment 221, 222, signal recording tape 223, transmitting device 224 and selecting relays 225. This equipment operates in the same manner as equipment associated with the lines extending to outlying stations. At the switching station shown in Fig. 2, other apparatus is provided for receiving messages from and transmitting messages to other types of switching stations, such as a manual switching station of any of the usual types employed in telegraph switching networks and illustrated diagrammatically by the rectangle 248. This switching system indicated at 248 is connected by means of trunk 252 to the switching equipment shown in Fig. 2, i. e., all of Fig. 2 except stations A and B and system 248. Associated with trunk 252 at the station shown in Fig. 2 is a receiving device 241 for recording messages intended for this switching station and a second receiving apparatus 242 intended to receive and record the messages which are intended for other stations by perforating tape 243. Transmitting device 246 is controlled by a second perforated tape 251 and is also associated with a line or trunk 252 for transmitting messages, received from other lines or stations, to the manual switching station or system represented by the rectangle 248.

The switching station represented by rectangle 248 may be of any type and is provided with line equipment 249 and a jack 250. In case the connecting system 248 is of an automatic type, the jack would be replaced by the type of switches employed in the system 248. The system in accordance with this invention is designed to transmit the same type of supervisory and message signals over line 252 as normally employed on local or trunk lines extending from the system 248 so that it will normally be unnecessary to provide any additional or special equipment at these connecting stations to enable messages to be exchanged between the different systems.

Means are also provided at the switching station for transmitting messages originating at the switching station to any of the other stations which may be reached through the system comprising a manually operated signal storing device 262 for perforating tape 263 in accordance with the messages to be transmitted. Perforated tape 263 controls the transmitter 264 which, in turn, controls the selecting relays 265 which cause the operation of the switching equipment to connect transmitter 264 to any of the lines to other stations.

The system in accordance with this invention is also designed to enable any station to transmit the same message to more than one of the other stations in the system without requiring the station transmitting the message to repeat it for each station for which the message is intended.

To accomplish this, a special repeating arrangement is provided which comprises the perforating device 272 which perforates the tape 273. When it is desired to transmit such a message, the operator or attendant at the outlying station will first transmit a special switching signal after which the switching signals of all of the stations to which it is desired to send the message will be transmitted. A second special switching signal or character will then be transmitted following which the message itself will be transmitted by the operator or attendant at the outlying station.

The special switching signal preceding the usual switching signals and the message will cause the message as received by any of the typing reperforators such as 212, 222, 232 or 242, to be repeated through the switching equipment to the typing reperforator 272. The tape 273 is perforated in accordance with this message intended for a plurality of stations and controls a special transmitter 274. The perforator 212 controls the associated selecting relays 275 and the selecting relays 275 in turn control switching equipment and connect all of the lines to the transmitter 274 which are idle and for which the message is intended. If any of the lines for which the message is intended are busy, a connection is also established between the transmitter 274 and receiving device 272. However, it is desirable that the entire message be received and recorded by the receiving device 272 before transmitting device 274 is connected to any of the lines or to receiving reperforator 272 to prevent holding any of these lines busy an unnecessarily long interval of time and to prevent any interference with the message being received by the receiving device 272. After the entire message is received by the receiving device 272, transmitter 274 will be connected to the lines which are idle and to which the message is directed. Transmitter 274 will then be started and transmit the message to all of the lines to which transmitter 274 is connected and also to the receiving device 272 if any of the lines to which the message is directed are busy so that the message will still be available for transmission to these other lines which were busy during the first transmission of the message. When any of these busy lines become idle after the entire message has been transmitted to the idle lines, the message may be transmitted to it in the same manner and this operation repeated until the message has been transmitted to all of the lines for which the message is intended.

The switching system shown in Fig. 3 is substantially a duplicate of the switching station shown in Fig. 2 and operates in substantially the same manner. It should be noted that any of the stations of the system shown in Fig. 3 may transmit a message to any of the stations shown in Fig. 2. Furthermore, any of the stations, such as 310 in Fig. 3 or 210 in Fig. 2, may direct a single message both to stations connected to its respective central switching station and to stations connected to the other central switching station. For example, station 310 may direct a single message to station 330, the central switching station shown in Fig. 2, and stations 210 and 230. The system shown in Fig. 3 operates in this case substantially the same as that described with reference to Fig. 2. The message transmitted from station 310 is preceded by special switching signals which cause the message to be directed to the receiving device 372. The usual switching signals are transmitted following this special switching signal so that the message may be directed to the proper lines. In this case the switching signals for directing the message to the central switching station shown in Fig. 2 and stations 210 and 230 will cause the selecting relays 375, after the entire message has been recorded by the receiving device 372, to select trunk 226 extending to the second switching station. The switching signals are transmitted over the line or trunk 226 to the switching station shown in Fig. 2 where at least certain of the switching signals cause the message to be directed to the receiving device 272 of the special repeating device. Thereafter this repeating device 272 causes the message to be transmitted to stations 210 and 230 when they become idle as described above. In case the message is also intended for the central switching station shown in Fig. 2, as assumed above, the switching signals transmitted over the line 226 will cause the message to be repeated to both the receiving devices 221 and 222; the message recorded on the device 221 being the copy of the message for the switching station shown in Fig. 2.

As pointed out hereinafter, the selecting relays and switching equipment, as well as the transmitters, are all arranged so that a different group of switching signals may be assigned to each of the stations connected to the system and messages preceded by the respective switching signals will be directed to that switching station irrespective of where they originate within the system. Furthermore, in case it is necessary to transmit the message through more than one switching station between the originating and terminating stations, the same switching signals will direct the message through each of the switching systems over the proper lines and trunks to the proper terminal station.

The specific embodiment of this invention illustrated in Figs. 2 and 3 is applied to a telegraph system comprising two central switching stations. It is to be understood, however, that any number of central switching stations may be connected in the system and each of the switching stations having trunks extending to any, or all of the other switching stations, the connections between the selecting relays and switching equipment at each station being so arranged that the messages will be properly routed between the various switching stations so as to be transmitted to the proper terminal station. Furthermore, the switching information is repeated to each of the switching stations ahead of the message and will control the switching equipment at the respective stations to direct the message to the proper line or trunk.

Idle condition

Referring now to Figs. 2 and 5 through 24 when arranged as shown in Fig. 4, the relays assume the positions shown in the drawings when power is first applied either after the system is first installed or after power has been disconnected from it, as for example, during the night. In applying power to the system all of the various power switches are closed and power is applied to the driving motors for the transmitting and receiving apparatus, some of which are not shown in the drawings. In the case of the typing reperforators, no motors have been shown in Figs. 2, 3, or 5 through 24 of the drawings. It is to be understood, however, that driving motors are provided for this apparatus and that power is supplied to them and that they are continuously operating so that the equipment is ready to respond to received signals. When power is applied to the system, relay 547 will be operated to its right-hand position which maintains an obvious circuit through the receiving magnet 548 and maintains this magnet operated, thus holding the receiving reperforator 569 in its idle condition. Relay 547 is operated to its right-hand position in the transmission circuit extending from negative battery over loop 589 to the subscriber's station A, designated 585 in Fig. 5 of the drawings, through break key 584, the left-hand winding of the receiving relay 586, transmitting contacts 588, loop 589, upper winding of relay 547, upper winding of relay 592, contacts 594 and 595 in parallel, lead 550 which extends through Figs. 6, 7, 10, 13, 17, 20 and 23; through the outer left-hand break contacts of relays 2318, 2018, 1718, 1318 and 1018 to positive battery. Similar transmission circuits may be traced through the upper windings of relays 947, 1247 and 1647.

Relay 592 is also maintained in its right-hand position by current flowing through its upper winding at this time and thus completes an obvious circuit through the printer magnet 593 of the receiving teletypewriter 590 at the central station associated with the incoming line or loop 589. An obvious circuit is also completed through the upper break contacts of relay 565 for maintaining a circuit through the printer magnet 593, thus insuring that teletypewriter 590 will remain idle at this time.

Figure 6:
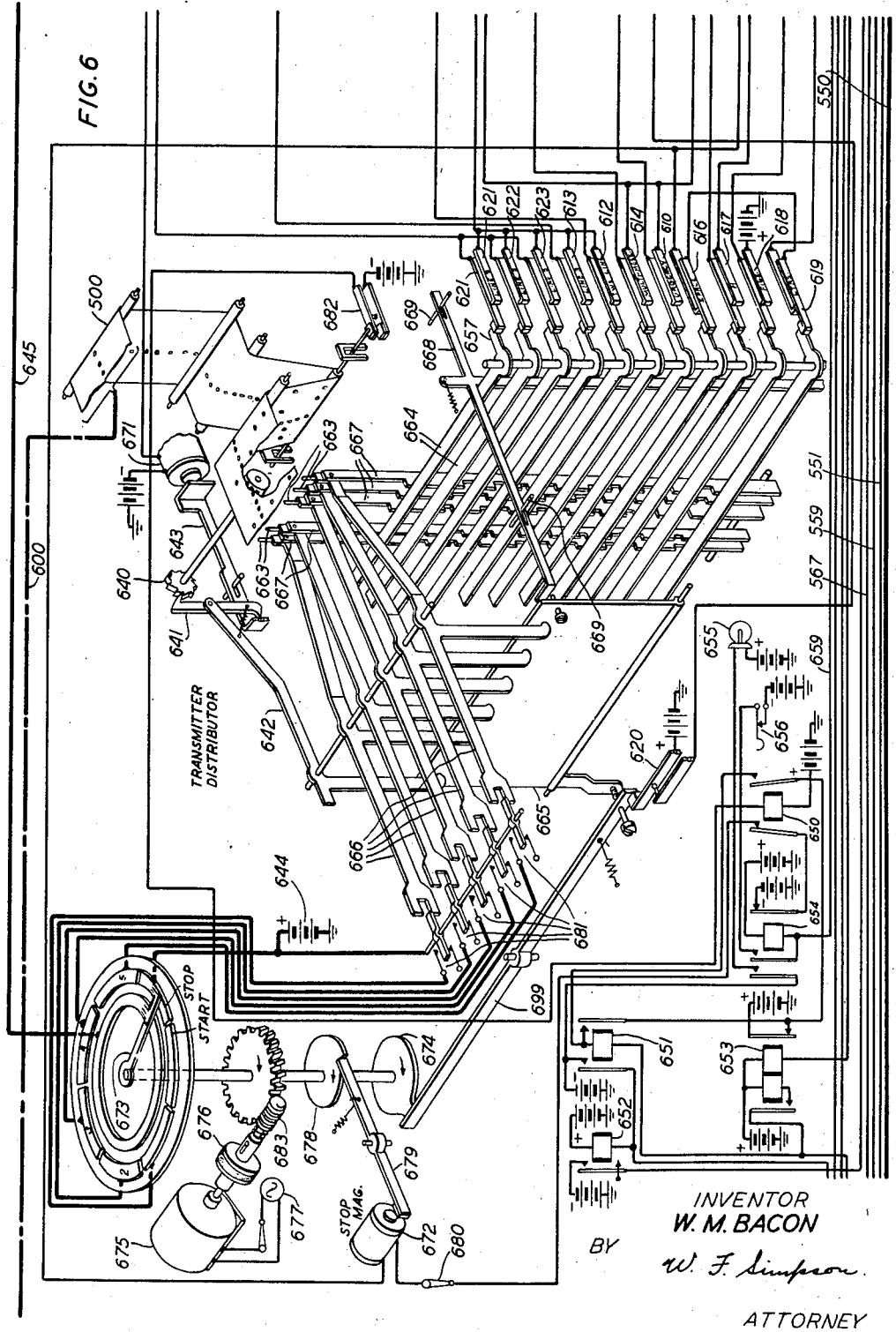
Figure 7:
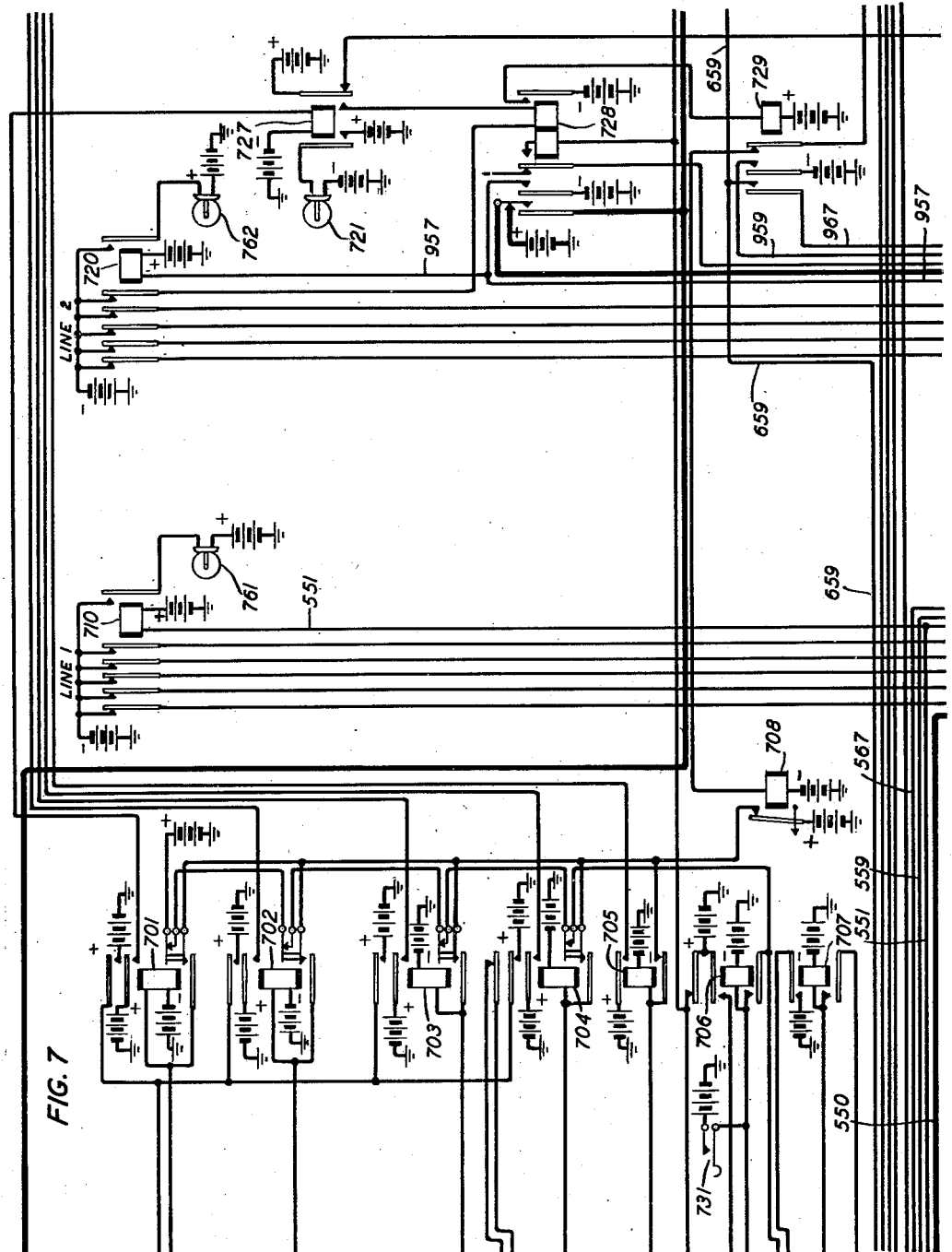
Figure 8:
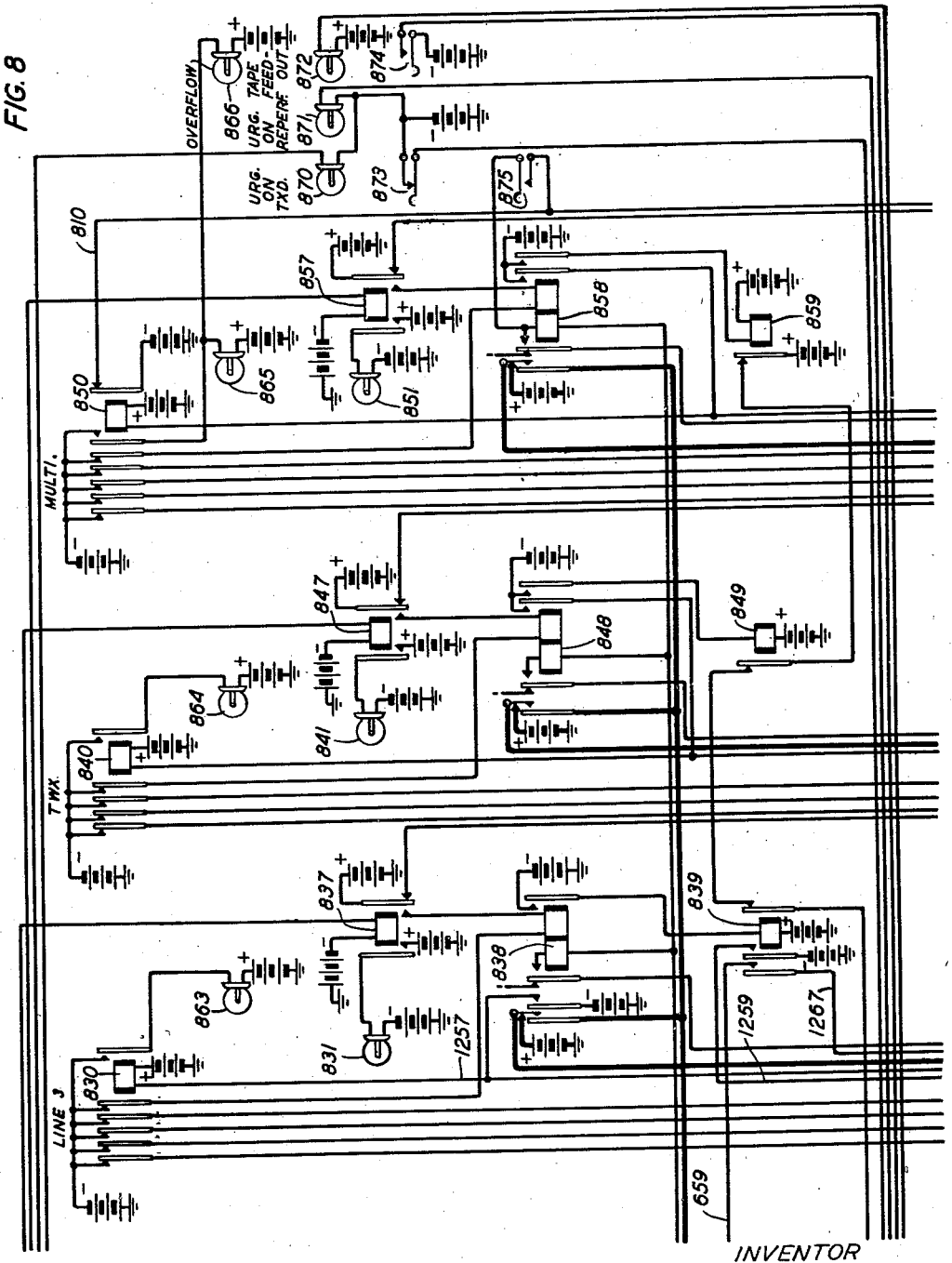
Figure 9:
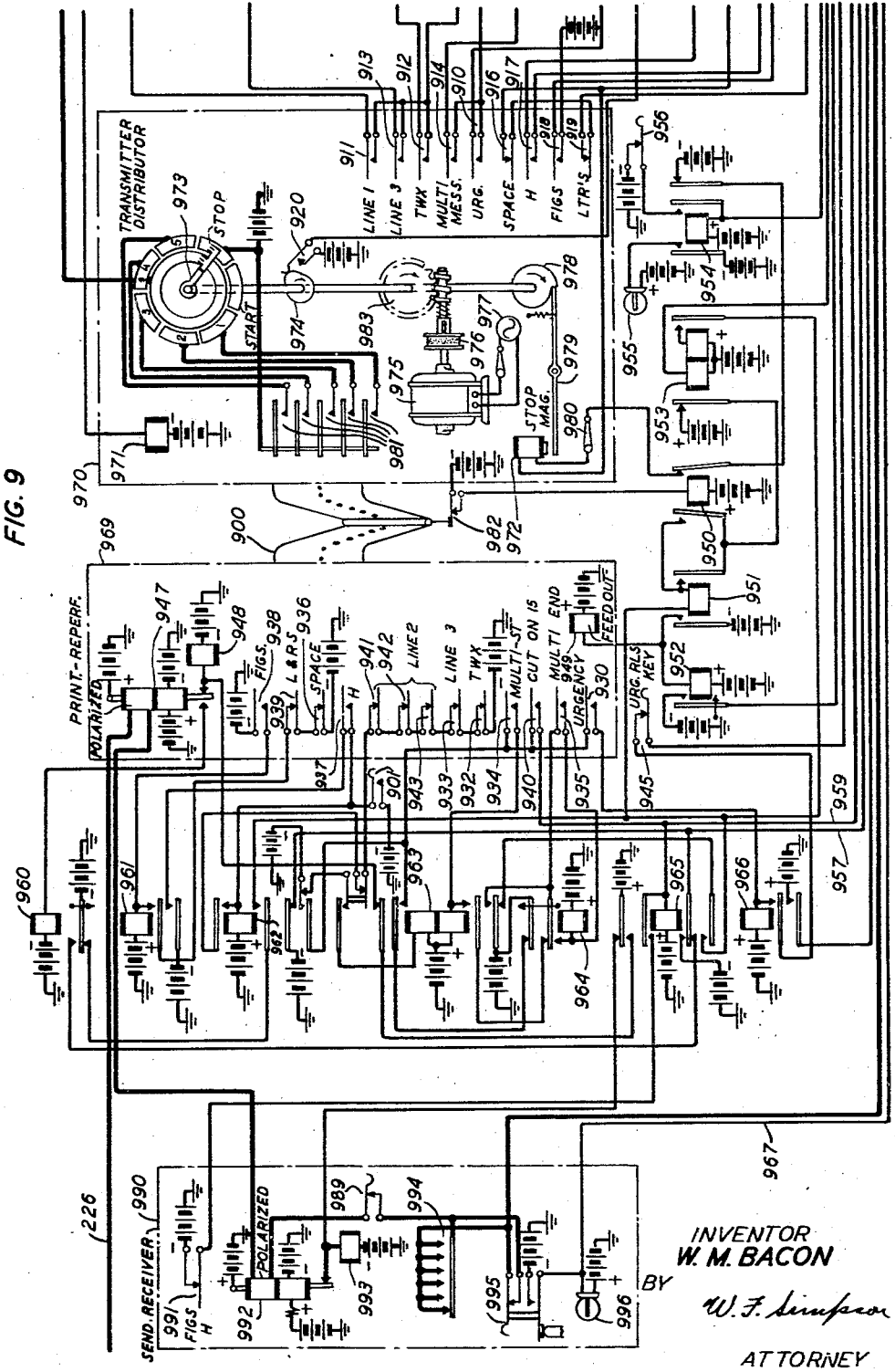
Figure 10:
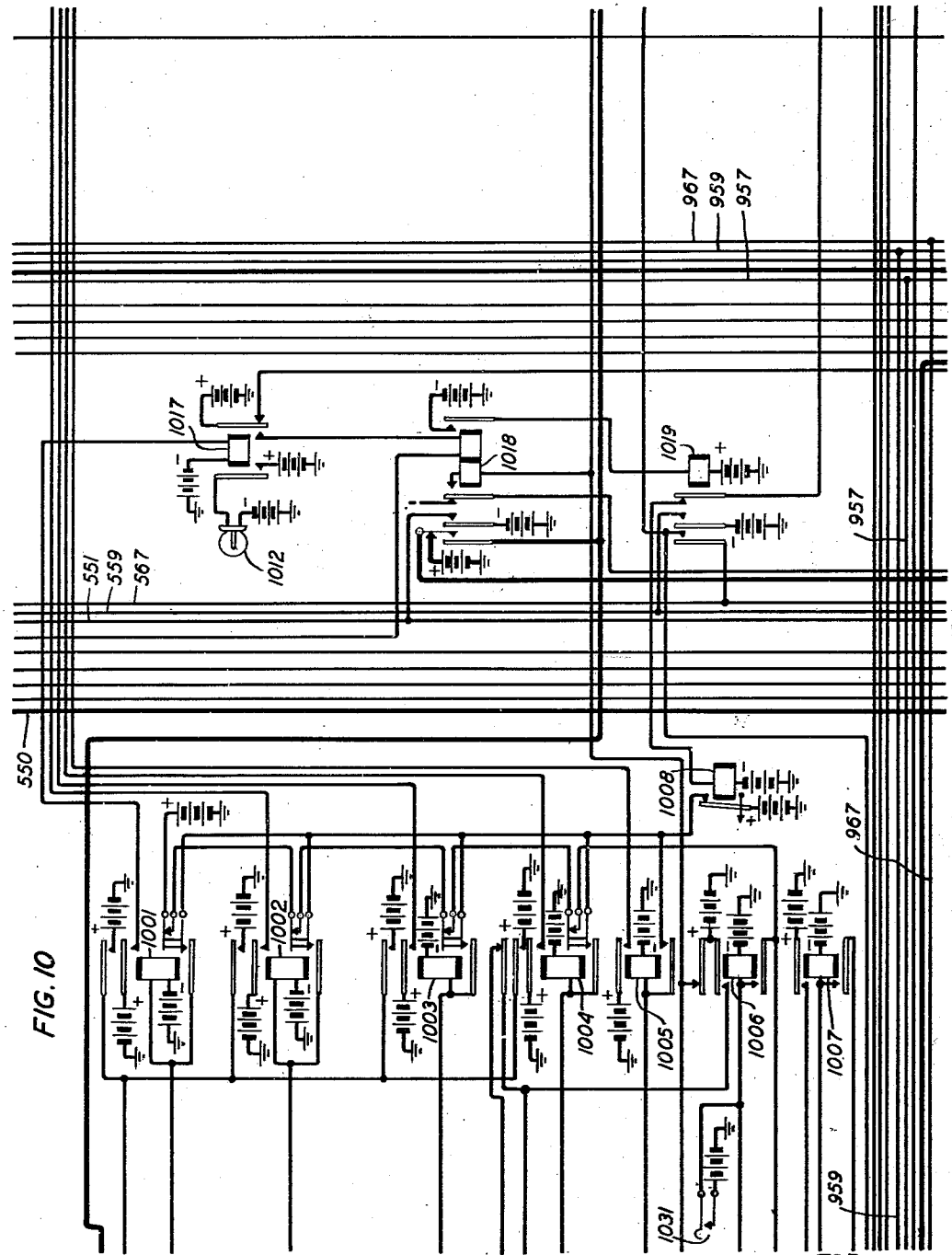
Figure 11:
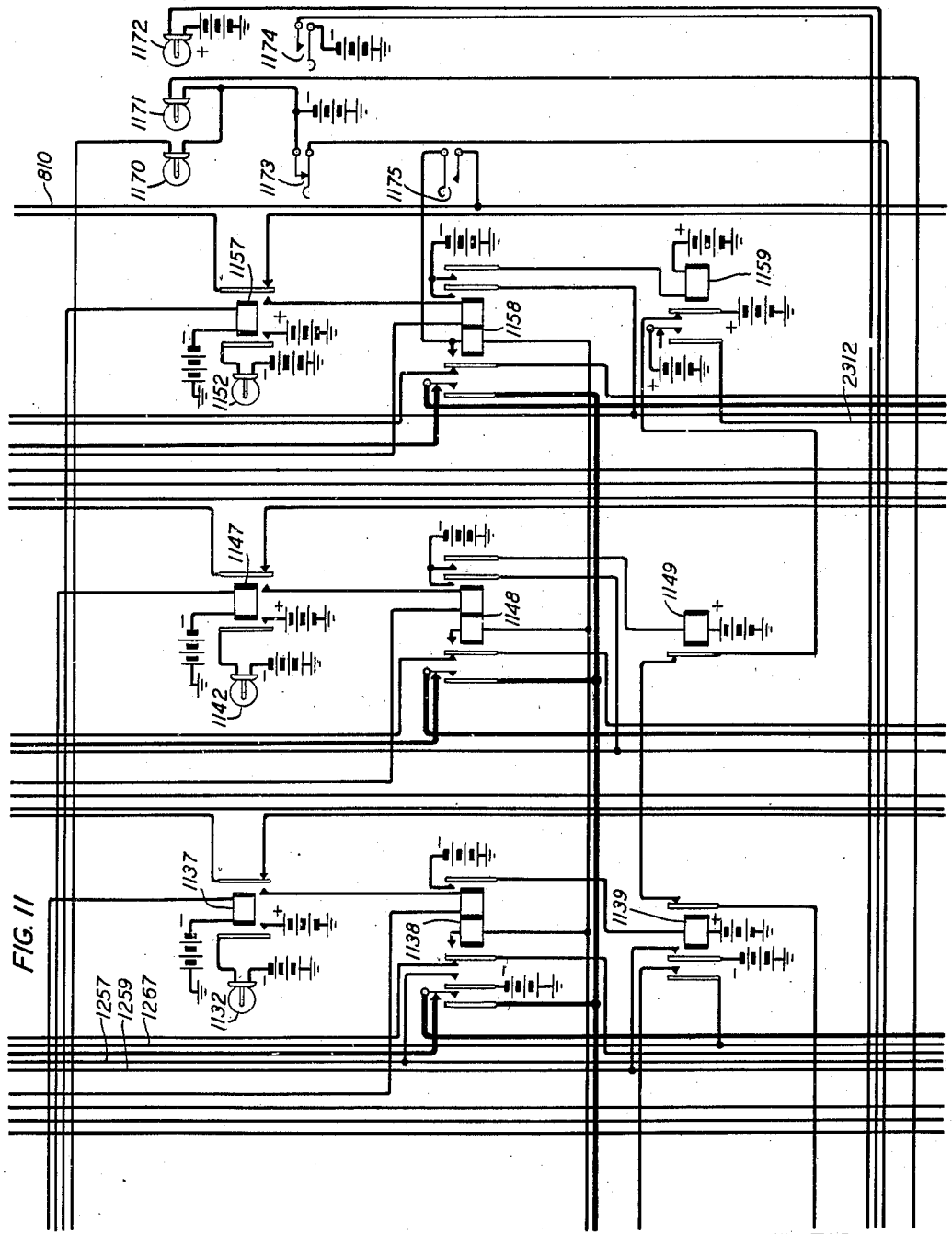

If there is a sufficient supply of perforated tape 500 between the tape transmitter shown in Fig. 6 and the reperforator 569 shown in Fig. 5, tape controlled contact 682 will be closed and an obvious circuit for the operation of relay 650 will be completed when power is applied to the system. Relay 650, in operating, completes a circuit for the operation of start magnet 672 from negative battery through the right-hand break contacts of relay 654, the left-hand operated contacts of relay 650, switch 680, start magnet 672 to positive battery through the lower break contacts of relays 704, 703, 702 and 701. Magnet 672 will operate in this circuit withdrawing the stop latch 679 from engagement with the cam 678, thus permitting the transmitter-distributor to also operate. The transmitter will rotate and advance tape 500 through the transmitter. At this time, however, the transmitter is not connected to any lines and it will generally ignore any of the perforations perforated in the tape 500 because it is not properly conditioned to respond to these perforations, as will be described hereinafter. The transmitter shown in Fig. 6 will thus continue to advance tape 500 until the supply of tape between the reperforator 569 and the tape controlled transmitter, shown in Fig. 6, has been reduced so that tape controlled contact 682 will open, thus interrupting the circuit of relay 650. Relay 650 releases and interrupts the circuit of the start magnet 672, whereupon the transmitter will come to rest and remain in that position until signals are recorded in the tape 500 by the printer reperforator 659.

Tape controlled transmitter 970 similarly advances the tape 900. Likewise, the tape controlled transmitters 1270, 1670 and 1970 advance their respective tapes 1200, 1600 and 1900 until the supply of perforated tape is reduced to a predetermined minimum quantity. In a somewhat similar manner the tape controlled transmitter 2270 causes tape 2200 to be advanced until the supply of perforated tape between it and the reperforator 2269 is reduced to a predetermined minimum quantity. The transmitter 1570 similarly reduces tape 1500 to the predetermined minimum quantity when switch 1580 is closed.

Relay 708 also operates in a circuit from negative battery, through its winding and break contacts of relays 729, 839, 849 and 859 to positive battery. Similar circuits may be traced for the operation of relays 1008, 1308, 1708 and 2008.

A circuit is also completed for operation of relay 710 from positive battery through the winding of relay 710 over lead 551 which extends through Figs. 6 and 5 to negative battery through the center set of lower break contacts of relay 562. The operation of relay 710 completes a circuit for lighting lamp 761. Similar circuits are completed for the operation of relays 720 and 830 and for lighting lamps 762 and 863.

The operator will be instructed to operate non- locking keys 501, 731, 901, 1031, 1201, 1331, 1501, 1601, 1731, 2031, 2201 and 2331. The operation of these keys will complete obvious circuits for the operation of the respective relays 562, 706, 962, 1006, 1262, 1306, 1562, 1662, 1706, 2006, 2262 and 2306 which relays in operating complete locking circuits for maintaining themselves operated as will be described hereinafter.

Of course one or more multicontact keys could be provided to operate all of these relays when power is first applied to the system; or the key or keys could operate one or more multicontact relays which relays in turn would complete circuits for the operation of the relays listed above; or an automatic arrangement might be provided for the operation of these relays at this time as is well understood in the art. The arrangement employing the plurality of keys is shown merely because it is the simplest and adds the least complexity to the drawings.

The operation of relays 562, 962 and 1262 interrupts the circuits of the respective relays 710, 720 and 830 which relays release and in turn extinguish the respective lamps 961, 762 and 863. The operation of these relays, under certain conditions may cause the printing reperforators to automatically perforate an additional supply of tape as will be described hereinafter.

The operation of these relays conditions the system and apparatus for the reception of switching signals which precede the messages.

The contacts of key 1556 are normally closed, so circuits will be completed for the operation of relays 1665 and 1687 at this time. The operation of relay 1665 renders the typing reperforator 1669 non-responsive to any received signals by completing a circuit through the selector magnet from negative battery through the winding of magnet 1648, the inner upper break contacts of relay 1663 to positive battery through the upper outer operated contacts of relay 1665. The operation of relay 1665 interrupts the holding circuit for magnet 1693 and thus permits this magnet to follow the operation of relay 1692.

In the case of the receiving devices 1669 and 1690 the circuits for the driving motors extend through leads 1688 which are open at the contacts of key 1686. These motors are not normally operating as are all the other motors for driving the other equipment at the central station.

*Subscriber initiates a call*

Assume now that the subscriber at station 585 desires to transmit a message to, say, station B designated 1285. The apparatus at station A comprises transmitting contacts 588 together with receiving relay 586 which, in turn, controls, by means of an obvious circuit, printing magnet 587 of the telegraph receiving and recording device. The receiving relay 586 is provided with a biasing winding as is the usual practice.

The equipment at station A may comprise any suitable type of telegraph transmitting and receiving apparatus. Typical examples of suitable printing telegraph apparatus such as would be employed in typical telegraph systems in accordance with this invention are described in detail in U. S. Patent 1,904,164, granted to S. Morton et al. April 18, 1933, and 1,745,633, granted to S. Morton et al. February 4, 1930. The disclosures of these patents are hereby made a part of the present application to the same extent as if set forth herein in full. When desirable, tape transmitting apparatus may be also included at the subscriber's station. Details of typical keyboard perforating mechanisms and associated transmitters are shown in detail in U. S. Patents 1,965,572, granted to Burcky et al. July 10, 1934, 1,965,602, granted to Lake July 10, 1934, and 1,969,891, granted to Lake et al. August 14, 1934. These patents are also hereby made a part of the present application as if fully included herein.

The signals are transmitted from station A by the transmitting contacts 588 opening the transmission loop 589 extending to the central station. At the central station relays 547 and 592 follow these signals. The selector magnet 548 follows the signals repeated to it by relay 547. However, the printing magnet 593 does not follow these signals because its circuit is maintained closed from positive battery through the upper break contacts of relay 565.

The receiving relay 586 at station A also follows the signals and repeats them to the printer magnet 587 which produces a local or home copy of the signals transmitted from station 585.

In case the circuits have been conditioned as described above, the attendant at station A may transmit one or more signals followed by the switching character or characters and then the message. The operator may also precede the switching character by a "figures" signal followed by a letter "H" signal or code combination. If the circuits have not been previously conditioned these signals will condition them and if the circuits are already conditioned these signals will not interfere with their operation. In order to allow sufficient time for the different switching and receiving devices and apparatus and circuits to function it may be desirable to transmit one or more "letters" signals before and after as well as between the switching signals or code combinations except that a "letters" signal is never transmitted between the "figures" signal and the H signal or code combination. With this exception the transmission of the "letters" signals does not in any way interfere with the operation of the various switching apparatus and circuits and provides time for their operation.

Assume that the first signal combination transmitted by the operator at station A will be a figures or upper case signal. When this signal is received by the selector magnet 548 it causes the associated selector apparatus to close contacts 538. One manner in which receiving selector and reperforator 569 may cause the contacts 538 to operate is described in detail in U. S. Patents 2,112,234, granted to Beattie et al. March 29, 1938, and 2,120,235, granted to Beattie et al. June 14, 1938. The disclosures of these patents are hereby incorporated and made a part of this application to the same extent as if set forth herein in full. It is to be understood, however, that the contacts controlled by the selector mechanism are connected as shown in the drawings attached hereto and not as shown in the above-identified patents to Beattie et al. However, the contacts are operated in a similar manner by the receiving selector in both cases.

In the embodiment of this invention shown in the drawings it is desired to print the message on the tape as well as perforate the tape in accordance with it. This enables operators and attendants to readily read the message stored in the tape. Figs. 25 and 26 show details of the manner in which contacts or switches, such as contact 2538 which corresponds to contact 538 of Fig. 5, are operated by the same selecting mechanism which controls the printing and perforating mechanism. Here when the "figures" or upper case pull-bar 2501 is selected it moves to the rear or right as is viewed in Fig. 25. This allows associated contact 2538 to be operated and in this case closed. The contact remains closed during the time this pull-bar is actuated by the pull-bar bail 2502. When the pull-bar 2501 returns to normal, it returns contact 2538 to normal. The operation of the printing reperforating mechanism shown in Fig. 25 will be described in more detail hereinafter.

Returning now to Fig. 5, the momentary operation of contacts 538 in response to reception of a "figures" or upper case signal completes an obvious path for the operation of relay 561.

It should be noted that when this signal is first received by relay 547 an obvious circuit is completed for the operation of slow-release relay 560. Relay 560 is made slow in releasing so that it will be maintained operated by relay 547 during the time the armature of relay 547 is following the signals received over line 589 due to an obvious circuit when its armature is in its left-hand position. The operation of relay 560 applies negative battery through the lower operated contacts of relay 560 and lower inner break contacts of relay 565 to lead 551. Lead 551 extends across Fig. 6 to relay 710. The operation of relay 560 in applying negative battery to lead 551 completes the circuit traced above over lead 551 for the operation of relay 710. The operation of relay 710 completes an obvious circuit for lighting busy lamp 761, thus indicating that line 589 is busy. The operation of relay 710 also removes the operating battery from the switching relays associated with line 589, thus preventing the connection of any of the transmitting apparatus at the switching station to line 589 at this time.

The operation of relay 561 completes a circuit for maintaining itself operated from positive battery through the winding of relay 561, the lower inner operated contact of relay 561 to negative battery through break contacts 539 and 536. Relay 561, in operating, also connects battery through its lower operated contacts to the upper member of contacts 537.

The next signal transmitted by the attendant at station 585 will be an H signal or code combination. When this signal is received by the receiving device 569, its selecting mechanism will cause the contacts 537 to momentarily close. The closure of contacts 537 at this time completes a circuit for the operation of relay 562 from negative battery through the lower operated contacts of relay 561, operated contacts 537, to positive battery through the winding of relay 562. Relay 562, in operating, completes a circuit for maintaining itself operated from positive battery, through its winding and upper operated contacts, the upper break contacts of relay 563, to negative battery, through contacts 541, 542, 543, 533, 532 in series.

It is to be understood that the signals transmitted by the station A in addition to causing the various contacts to momentarily close as described above also causes the receiving equipment to print the corresponding characters on tape 500 as well as to perforate or punch this tape in accordance with these received signals. In accordance with the preferred embodiment of this invention, the perforations in the tape need not be complete in that no paper is completely removed from the tape. The tape is merely punched as, for example, three sides of a square or part of the circumference of a circle. These small pieces of paper are left attached to the tape just as if there had been no perforations or punches in the tape so that the printing on the tape may be just as readily read as if there had been no perforations in the tape.

The operation of relay 562 also connects negative battery to contacts 534, 540 and 530.

Figure 12:
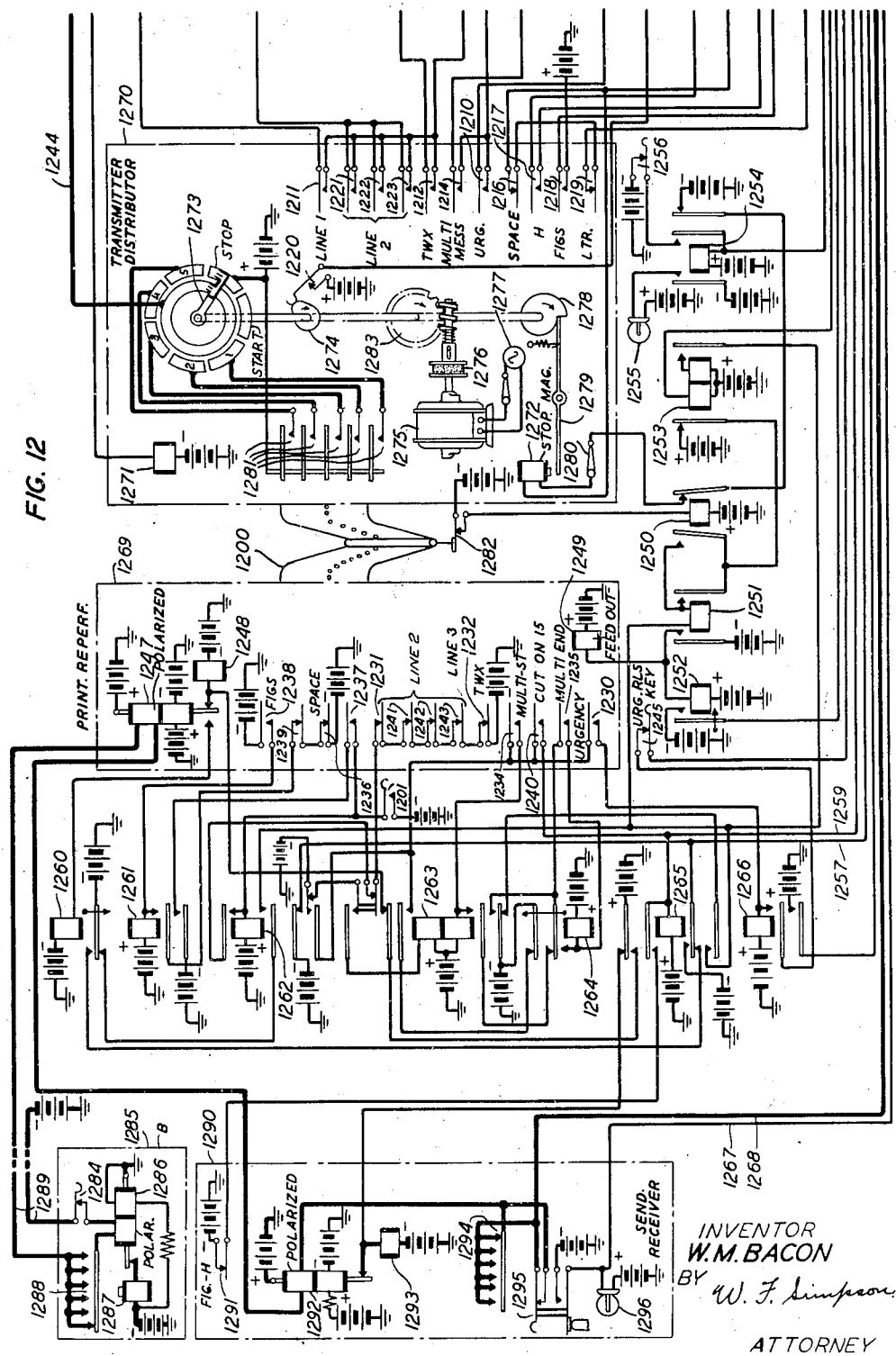

Under the assumed set of conditions, the operator at station A will next transmit the letter B which is the designation or address assigned to station 1285 shown in Fig. 12. When this signal is received and recorded in tape 500, it causes contacts 533 to momentarily open. The momentary opening of contacts 533 interrupts the locking circuit of relay 562, thus allowing this relay to release. Relay 562 in releasing also connects negative battery to lead 551 and maintains relay 710 operated and thus maintains line 589 busy even if there is a sufficiently long pause in the transmission of the message to permit relay 560 to release.

Thereafter the operator at station A will transmit the message and upon reception of the first "letters" or spacing signal by the receiving device 569 contacts 539 or 536 will momentarily open and interrupt the locking circuit of relay 561, thus allowing this relay to release. The message transmitted from station A will be recorded in tape 500 and also printed upon tape 500. The various characters transmitted will cause the contacts controlled by the selector equipment to momentarily open or close. However, due to the fact that the figures signal followed by an H signal will not be transmitted in succession without the interposition of a "letters" or a spacing signal between them, the momentary opening or closing of these contacts produces no useful function at this time. At the end of the message transmitted from station A, the operator will again transmit a "figures" signal followed by a signal representing the letter H.

It is to be understood that the succession of any two predetermined or predesignated code combinations representing any two characters or functions may be employed to activate or condition the contacts and selecting mechanism to operate suitable relays. It is also within the scope of this invention to employ only one signal to accomplish this or to accomplish it with three or more signals. The selection of two signals in the specific embodiment disclosed in this application is merely by way of example of a typical practical system.

When the figures signal following the message is received by the receiving apparatus 569, it will cause contacts 538 to again momentarily close and operate relay 561 which thereupon locks operated as described above. When the H signal is received it causes contacts 537 to be again momentarily operated which, in turn, causes relay 562 to operate. Relay 562, in operating, completes a locking circuit for maintaining itself operated as described above.

Assuming that no further signals are transmitted from station A for a time, relay 547 will be maintained in its right-hand position and thus allow relay 560 to release. The release of relay 560 at this time removes the negative battery from lead 551 and allows relay 710 to release so that line 589 is now available for transmission of messages from the switching center to station A as will be described hereinafter.

*Transmitting the message to the selected station*

When the message is received and perforated in tape 500 by device 569 as described above, an additional supply of tape is provided between the receiving device 569 and the transmitting device shown in Fig. 6. It is assumed that tape 500 passes continuously from the receiving device 569 in Fig. 5 to the transmitting device shown in Fig. 6. This is represented in the drawings by the heavy dash line 600 and is shown in this manner merely for drafting convenience to make the operation of other parts of the system more readily understandable from the drawings.

The additional supply of perforated tape between the receiving device 569 and the transmitting device shown in Fig. 6 causes contacts 682 to close and complete a circuit for the operation of relay 650, as described above. The operation of relay 650 completes a circuit for the operation of the start magnet 672 which withdraws the stop latch 679 from engagement with the stop cam 678 and thus permits the transmitter to operate and advance tape 500. Tape 500 will be advanced through the transmitter shown in Fig. 6 without producing any significant results until a switching character or a "figures" signal followed by an H code combination arrives at the control position of the transmitting device.

When the "figures" signal stored in tape 500 arrives over pins 663, all of these pins will go through the perforations or punches of the tape 500 and raise the selecting elements 667 so that the notches in the front edges of these elements line up before the switching lever 664 which controls the figures contact 618. As motor 675 continues to rotate the distributor shaft of distributor 673, cam 674 will allow lever 699 to rotate in a clockwise direction. This, in turn, permits plate 665 to also rotate in a clockwise direction and engage member 668. Member 668 is then moved to the right on bearings or supports 669 and releases all of the members 664 so that they may rotate. However, all of these levers except the one controlling contacts 618 are prevented from rotating because they will engage the front edge of one or more of the selector elements 667. In case of the switch lever 664 controlling contacts 618, the notches in the front edges of the selecting levers 667 are lined up before this switch lever so it is permitted to rotate in a clockwise direction and momentarily closed contacts 618. Near the end of the revolution of the transmitting distributor shaft, cam 674 engages lever 699 and rotates it in a counter-clockwise direction which, in turn, rotates plate 665 in a counter-clockwise direction. This causes element 668 to remove to its left-hand position, rotating the switching lever controlling contacts 618 in a counter-clockwise direction. During the continued rotation of the transmitting distributor 673 just before it stops, plate 665 engages the fingers 666, rotates them in a clockwise direction, carrying pins 663 out of engagement with the perforations in tape 500 and normally causing tape 500 to be advanced by means of sprocket 640 and levers 641 and 642. However, under the conditions assumed above, the tape does not advance at this time as will be described hereinafter.

The momentary closure of contacts 618 completes an obvious circuit for the operation of relay 707. Relay 707, in operating, completes a circuit for maintaining itself operated from battery through its winding and lower operated contacts and break contacts 619 and 616 to positive battery through the lower break contacts of relays 704, 703, 702 and 701 in series. The next signal perforated on the tape 500 will be a signal representing the character H. This causes the notches in the front edges of the selector elements 667 to line up in front of the switch lever 664 controlling contacts 617. Upon the continued rotation of the transmitting distributor 673, after the members 666 raise pins 663 to determine the character of this signal, contact 617 will be operated.

The momentary operation of contact 617 at this time completes a circuit for the operation of relay 706 from positive battery through the upper operated contacts of relay 707, operated contacts 617 to negative battery through the winding of relay 706. The operation of relay 706 completes a circuit for maintaining itself operated from negative battery through its winding and lower operated contacts to positive battery through the lower break contacts of relays 704, 703, 702 and 701 in series.

If relay 706 had been previously operated by the operation of key 731, the "figures" signal followed by an H signal are not necessary but if they are perforated in the tape the operation of the circuits will be the same as described above.

Under the assumed conditions the next signal recorded in perforated tape 500 will be the signal representing the letter B for directing the message to station B designated 1285 in Fig. 12. In case the system had been previously conditioned and the attendant merely sends a letter B preceding the message instead of a figures code combination followed in turn by an H code combination and then a B code combination the circuits would operate in the same manner from this point as described under the conditions assumed herein.

When this signal arrives over pins 663 and they go through the corresponding perforations in tape 500, contact 613 will momentarily close because the notches in the front edges of the selector elements 667 carried by the pins 663 and controlled by perforations in tape 500 will line up before the switch lever 664 controlling contacts 613.

The momentary operation of contacts 613 completes a circuit for the operation of relay 702 from positive battery through the upper inner operated contacts of relay 706, the upper outer break contacts of relay 704, operated contacts 613 to battery through the winding of relay 702.

The operation of relay 702 completes a circuit for maintaining itself operated from negative battery through its winding, lower operated contacts to positive battery through the operated contacts of relay 708. The operation of relay 702 also interrupts the locking circuit of relay 706 thus permitting this relay to release. It should be noted, however, that during the operation of relay 702 its locking circuit is completed prior to the interruption of the locking circuit of relay 706 thus insuring that relay 702 will fully operate and lock itself operated.

The operation of relay 702 also completes a circuit through its upper operated contacts from positive battery to negative battery through the winding of the tape feed withholding magnet 671. The magnet 671 operates and attracts its armature 643 to the right. This rotates lever 641 in a counter-clockwise direction so that the pawl carried by the end of this lever no longer engages with the ratchet or pinion 640 so that as the distributor 673 completes the revolution then in progress, the tape will not be advanced.

The operation of relay 702 also interrupts the operating circuit of the start magnet 672 thus allowing this magnet to release and stop the transmitter at the completion of the revolution or cycle of operation of the distributor then in progress.

The operation of relay 702 completes a circuit for operating relay 837 from negative battery through the upper inner operated contacts of relay 702 to negative battery through the winding of relay 837. The operation of relay 837 completes a circuit for lighting lamp 831.

If the line 1289 is busy, relay 830 will be operated and lamp 863 will be lighted to indicate that this line is busy. If this line is busy the circuits remain in this condition until line 1289 becomes idle.

However, assuming that the line is idle the operation of relay 837 completes a circuit for the operation of relay 838 from negative battery through the inner break contacts of relay 830, the right-hand winding of relay 838, operated contacts of relay 837 to positive battery. The operation of relay 838 completes a circuit for maintaining itself operated from negative battery through the left-hand inner break contacts of relays 2438, 2138, 1838, and 1138, the left-hand inner operated contacts and left-hand winding of relay 838 to positive battery through the upper break contacts of relay 706 which is released at this time as described above.

The operation of relay 838 completes an obvious circuit for the operation of relay 830. The operation of relay 830 completes the circuit for lighting lamp 863 and removes the operating potential from the other switching relays 1138, 1838, 2138 and 2438 thus preventing these relays from operating and interfering with the connection established between the transmitter shown in Fig. 6 and station B.

Relay 838 in operating completes a circuit for the operation of relay 839.

The operation of relay 839 connects negative battery to lead 1259 through its inner left-hand contacts. Lead 1259 extends through Figs. 11, 14, 13 and 12 to positive battery through the winding of relay 1265. Relay 1265 operates in this circuit and completes a path for maintaining itself operated from positive battery through its winding and upper inner operated contacts to negative battery through the switch contacts 1291 controlled by recording teletypewriter 1290. The operation of relay 1265 removes the positive battery connected to the upper winding terminal of the printing magnet 1293 through the upper break contacts of relay 1265, thus permitting this magnet to follow the signals repeated by relay 1292 which relay is connected in the transmission circuit extending to station B as will be described hereinafter. Magnet 1293 in following the signals transmitted over loop 1289 at this time to station B causes the receiving device or teletypewriter 1290 to record these signals. The operation of relay 1265 also connects positive battery to the left winding terminal of the selector magnet 1248 through the upper break contacts of relay 1263 and the upper outer operated contacts of relay 1265. This circuit prevents the selector magnet 1248 from following the signals transmitted over the transmission circuit to station B as described hereinafter and thus prevents messages transmitted to station B from being recorded in the tape 1200. This circuit also prevents the operation of the contacts controlled by the selector magnet 1248 and thus the message transmitted to station B does not in any way affect the switching equipment which is employed to handle messages received from station B.

The operation of relay 838 also extends the transmission path from the transmitting distributor 673 to line 1289 in a circuit traced from positive battery 644 through contacts 681 and distributor 673, over lead 645 through the left-hand outer operated contacts of relay 838 and the left-hand outer break contacts of relays 1138, 1838, 2138 and the right-hand break contacts of relay 2438, lead 1268 through Figs. 24, 21, 18, 14, 13, 12, through the upper contacts of switch 1295, the upper windings of relays 1292 and 1247 over loop 1289 to station 1285, through the transmitting contacts 1288, left-hand winding of the receiving relay 1286 and contacts of break key 1284 to negative battery over loop 1289.

The operation of relay 839 as described above also interrupts the circuit traced above for maintaining relay 708 operated and permits this relay to release. The release of relay 708 in turn interrupts the locking circuit of relay 702 and permits this relay to release. The release of relay 702 reestablishes the circuit through the start magnet 672 thus causing this magnet to operate and start the transmission from the distributor 673. The release of relay 702 also interrupts the circuit through magnet 671 so that during the operation of the distributor tape 500 will be advanced through the transmitter in a normal fashion to transmit the message intended for station B. It should be noted that the signal representing letter B in addition to controlling the establishment of the connection of the transmitter shown in Fig. 6 to line 1289 extending to station B is also transmitted to station B prior to the transmission of the message.

The transmission of the message then proceeds from the transmitter shown in Fig. 6 to station B over the transmission circuit extending through loop 1289 as described above. During the transmission of the message from the transmitter shown in Fig. 6 various contacts controlled by this transmitter will be operated when the corresponding signals are transmitted to station B. However, since the combination of the figures signal followed by an H signal will not be transmitted in succession during the message without either a letters signal or a space signal being interposed between them, the operation of the contacts controlled by the transmitting equipment shown in Fig. 6 will be ineffective to control any of the switching circuits which will be ineffective to interfere with the transmission circuit from this transmitter to station 1285.

*Receiving station breaks*

If a message is not properly received at the station B for any reason or if the operator thereat desired to interrupt the transmission and attract the operator's attention at the switching station, the operator at station B will operate the break key 1284 and maintain this key operated for an interval of time at least as long as the time required to transmit two signal combinations representing two characters or functions. This will cause the receiving or monitoring teletypewriter 1290 which is connected in the transmitting circuit at the central switching station to operate switch 1295. This switch corresponds to and is operated in the same manner by a break signal as the so-called send-receive-break switching key described in the above-identified patents to Morton et al. The operation of switch 1295 at this time removes the short circuit from around the transmitting contacts 1294 thus rendering these contacts effective to transmit signals to station B. The operation of switch 1295 at this time also completes an obvious circuit for lighting lamp 1296 to attract the operator's attention to this machine so that she can go to it and operate the keyboard and thus contacts 1294 and communicate with the operator or attendant at the outlying station B to determine what the trouble is or what additional service is required. In addition, the operator may also go to the transmitter shown in Fig. 6 and move the tape back so that the entire message will be again transmitted to station B.

When the switch 1295 is operated as described above it also causes the transmitting equipment shown in Fig. 6 to stop and thus prevents this equipment from interfering with the transmission to station B by operation of the keyboard of the monitoring teletypewriter 1290. This is accomplished by switch 1295 which connects negative battery to lead 1267 which extends through Figs. 13, 14, 11 and 8 through the left-hand outer operated contacts of relay 839 and lead 659 extending through Figs. 7 and 6 to positive battery through the winding of relay 654. Relay 654 operates in this circuit and interrupts the operating circuit of the start magnet 672 thus causing the transmitting distributor to stop at the end of the cycle then in progress; that is, at the completion of the code combination then being transmitted.

The operation of relay 654 also completes a circuit for maintaining itself operated under control of key 656 and in addition completes an obvious circuit for lighting lamp 655. The operator upon noting the lighted lamp 655 together with the lighted lamp 1296 and after communicating with the operator at station B will know that she should both restore the switch 1295 to its normal position and that she should momentarily operate key 656 after she has moved the tape 500 back so that the message will be retransmitted to station B. Upon the momentary operation of key 656 after switch 1295 has been restored, the locking circuit of relay 654 is interrupted and this relay is restored to normal. The operation of key 656 also interrupts the circuit over lead 659, contacts of relay 839 and lead 1267 to lamp 1296, and thus extinguishes this lamp. The release of relay 654 also reestablishes the circuit through the start magnet 672 so that this magnet will be reoperated and the transmission of the message to station B resumed. It should be noted that if the operator moves the tape back sufficiently far so that the switching signals including the figures combination, the H combination and the letter B are again transmitted from the transmitter shown in Fig. 6, the connection between this transmitter and station B will be interrupted and the transmission circuit from the transmitter shown in Fig. 6 to station B reestablished in the same manner as described above.

*Tape feed-out*

In case only a single message has been transmitted from station A and recorded in tape 500 after which no further messages are transmitted from station A for a considerable interval of time, the printing reperforator 569 will come to rest with the last character recorded in the tape just beyond the recording position. The last character will be the H signal which was immediately preceded by the figures signal following the end of the message. Then as the message is transmitted by the transmitter shown in Fig. 6, the supply of tape between the reperforator 569 and the transmitter will be reduced to the predetermined quantity which causes contacts 682 to open and interrupt the operating circuit of relay 650. Relay 650, in releasing, interrupts the operating circuit of magnet 672 and thus permits this magnet to release and stop the transmitter shown in Fig. 6.

The release of relay 650 at this time, however, completes a circuit for the operation of relay 651 from positive battery through the right-hand break contacts of relay 653, the right-hand break contacts of relay 650, winding of relay 651, through the lower inner operated contacts of relay 562 to negative battery through the lower break contacts of relay 560. It is noted that the relay 562 is locked operated at this time, having been operated by the H signal following the figures signal which was the signal last transmitted by the operator at station A at the end of the message.

Relay 651, in operating, completes a circuit for maintaining itself operated from positive battery through the right-hand break contact of relay 653, right-hand operated contacts of relay 651, winding of relay 651 to negative battery through the lower inner operated contacts of relay 562, lower break contacts of relay 560.

Relay 651, in operating, also completes an obvious circuit for the operation of relay 652 and feedout magnet 549 of the receiving device 569. Relay 652 is slow in operating and requires approximately fifteen seconds to operate. At the end of this time interval relay 652 operates and completes a circuit for lighting lamp 872 before the operator. The operator, upon noting the lighted lamp 872, will momentarily operate key 874. The operation of key 874 completes a circuit for the operation of relay 653. Relay 653, in operating, interrupts the operating and locking circuits of relay 651, thus permitting this relay to release and, in addition, completes a circuit for maintaining itself operated from positive battery through its left-hand winding and left-hand operated contacts to negative battery through the lower inner operated contacts of relay 562 and lower break contacts of relay 560. The release of relay 651 interrupts the operating circuit of magnet 549 and relay 652. The release of relay 652 extinguishes the lamp 872.

The operation of magnet 549 causes the reperforating device 569 to automatically perforate an additional supply of tape even though no signaling impulses are received.

The manner in which magnet 549 causes the printing reperforator to automatically feed out and perforate an additional supply of tape may be more fully understood by reference to Figs. 25 and 26. Here magnet 2549 corresponds to magnet 549 of the printing reperforator 569 shown in Fig. 5. In addition the printing magnet 548, Fig. 5, is illustrated by magnet 2548 in Figs. 25 and 26. The printing or selecting magnet 2548 controls the selecting equipment in the usual manner as is well understood and described in the above-identified patents to Morton et al. The code combinations are set up on the code bars 2518 in the usual manner to select one of the pull bars 2501 which is then actuated by the pull bar bail 2502 to print the desired character on the tape. 2519 represents the platen at which point the printing takes place. The tape is not shown in order that some of the details of the mechanism may be shown. The code combinations are transferred from the code bars 2518 through the linkage levers 2520, 2521, 2529 and 2522 to the interponents 2523 which control the perforations in the tape in the usual manner which is clearly shown and described in the above-identified patents to Burcky et al., Lake, and Lake et al. and also in Patents 2,005,748, granted June 25, 1935, to Larson and 2,042,788, granted June 2, 1936, to Krum, which patents are hereby made a part of this application as if fully included herein. It is to be understood that there are as many of each of the levers 2520, 2521, 2529, 2522 and 2523 as there are code bars and that one of each of these levers is individual to each of the code bars.

During the normal operation of this receiving equipment in response to signals received by magnet 2548, the receiving cam barrel 2530 is released for one revolution of rotation for each code combination received representing some character or function of the receiving apparatus. The release of the cam barrel 2530 is accomplished by magnet 2548 releasing its armature 2503. This permits the armature assembly to rotate in a clockwise direction about pivot 2515 and causes extension 2504 to move to the left, pushing pin 2505 to the left. When pin 2505 moves to the left it rotates a lever 2506 in a counter-clockwise direction which in turn rotates lever 2507 in a clockwise direction. This releases the stop latch 2508 and permits it to rotate in a counter-clockwise direction as viewed in Fig. 26 under the influence of extension 2509 from the cam barrel 2530 thus permitting the cam barrel to rotate. This operation precedes the reception of each group of impulses representing a character or function as is well understood in the art and described in the above-identified patents.

When magnet 2549 operates it attracts its armature 2510 and causes it to rotate in a clockwise direction which in turn causes the member 2506 to rotate in a counter-clockwise direction and in turn rotate member 2507 in a clockwise direction thus releasing the latch 2508 and permitting the cam barrel 2530 to rotate. Thus, the operation of members 2506, 2507, 2508 and the cam barrel 2530 are operated in the same manner by the operation of magnet 2549 as they are by magnet 2548 preceding the reception of each code combination in response to the reception of the start impulse. So long as magnet 2549 remains operated these members 2506 and 2507 remain in their operated position so that the cam barrel 2530 continues to rotate.

During the rotation of cam barrel 2530 under these circumstances magnet 2548 will be operated. This is due to the fact that line relay 547 shown in Fig. 5, is maintained in the right-hand position at this time due to the fact that no signals are being received from station A over the loop 589. Consequently, all of the code bars 2518 will be positioned in their so-called marking positions and in turn will cause the interponents 2523 controlled thereby through the linkages described above to also be positioned in their so-called marking positions where they will all cause corresponding perforations in the tape. This operation continues so long as magnet 2549 remains operated. Upon the release of magnet 2549 its armature will be rotated in a counter-clockwise direction and allow members 2506 and 2507 to return to their normal position under influence of spring 2532 and thus engage stop latch 2508 and cause cam barrel 2530 to come to rest at the completion of the revolution then in progress whereupon the receiving equipment is in condition to receive further signals transmitted from station 585.

Returning now to Figs. 5 and 6, when the operation of magnet 549 causes an additional supply of tape to be perforated with all marking or letters signals, this additional supply of tape will permit contacts 682 to again close and complete a circuit for the operation of relay 650. Relay 650 in operating reestablishes a circuit through the start magnet 672 thus operating this magnet and permitting the transmitting equipment shown in Fig. 6 to continue transmitting the signals stored in tape 500.

The operating time of relay 652 is so chosen that this relay will not operate to light the lamp 872 until after the entire message recorded in tape 500 has had ample time to pass through the transmitting device shown in Fig. 6. Upon the release of magnet 549 in response to the operation of key 874 which stops the perforation of tape 500 as described above, the additional supply of perforated tape between the reperforator 569 and transmitting device shown in Fig. 6 will again be reduced to a predetermined minimum quantity whereupon contact 682 reopens and again interrupts the operating circuit of relay 650 and allows this relay to release. The release of relay 650 again interrupts the operating circuit of the start magnet 672 and permits this magnet to release which in turn stops the transmitter shown in Fig. 6. The release of relay 650 at this time, however, does not cause the reoperation of relay 651 because relay 653 is locked operated as described above. Consequently, no battery is applied to the upper winding terminal of relay 651 so this relay cannot operate.

In case the attendant or operator at station 585 starts to transmit a second message to the switching station during the time that magnet 549 is operated, it is necessary to immediately release magnet 549 and return the control of the receiving device 569 to selector magnet 548. To accomplish this the first operation of relay 547 to its left-hand position in response to the first signaling impulse received from station A completes an obvious circuit for operating relay 560 and relay 560 in operating immediately removes negative battery through its lower break contact and the lower inner operated contacts of relay 562 from the lower winding terminal of relay 651 thus allowing this relay to immediately release and release the magnet 549. The release of magnet 549 stops the automatic perforation of tape 500 and permits the selector magnet 548 to control the receiving device 569 so that tape 500 will be perforated in accordance with the received signals and also so that contacts controlled by this selecting equipment will be properly actuated by the received signals. Generally a revolution of the cam barrel 2530 will be in progress when the attendant at station A initiates the transmission of the second message during the time magnet 549 is operated. Consequently, this first signaling combination will not be properly received by the receiving equipment. To prevent any errors or difficulties arising due to this condition the attendant at station A will always precede the transmission of any message by a group of one or more "letters" signals. These "letters" signals will serve to cause magnet 549 to release, as described above, and return the control of the receiving device to the selector magnet 548 but in general, will not perform any other useful function at this time. The reception of these letters signals by the receiving device 569 may cause contacts 539 to momentarily open and interrupt the locking circuit of relay 561. This permits relay 561 to release but relay 562 remains oper- ated at this time. Consequently, the release of relay 561 performs no useful function.

In case the attendant at station A waits until after magnet 549 has released before initiating the transmission of a second message from station A the receiving device 569 will be in condition to receive this message and properly record it on tape 500. In this case the operation of relay 560, in response to the first start signal transmitted from station A, interrupts the locking circuit of relay 653 through the lower contacts of relay 560 and the lower inner operated contacts of relay 562 and the left-hand operated contacts of relay 653 thus permitting relay 653 to release. The release of relay 653 at this time prepares the circuit of relay 651 for operation at the end of this second message, if no further signals are transmitted from station A until after the supply of tape between the reperforator 567 and the transmitting distributor shown in Fig. 6 is again reduced to a predetermined minimum quantity.

In case line 589 is subject to so-called "hits" or short momentary open or spacing impulses it may be desirable to retard the operation of relay 560 for an interval of time so that it will not respond to these short stray signals and interfere with the operation of these circuits as described above.

Disconnection

After the transmission of the message to station B is completed, the "figures" signal, followed by the H signal, will arrive over the fingers or pins 653 of the transmitter shown in Fig. 6. As pointed out above, the operator or attendant at station A transmitted these signals immediately following the message and they were recorded in tape 500 when received by device 569. When the "figures" signal arrives over the pins 663 it causes contacts 618 to close. The momentary closure of contacts 618 completes an obvious circuit for the operation of relay 707 which, in turn, locks operated under control of contacts 619 and 616 and relays 701, 702, 703 and 704, as described above. Relay 707 then conditions contacts 617 so that when they momentarily close in response to the following H signal a circuit will be completed for the operation of the transmitter. The operation of relay 706 completes a circuit through its inner upper operated contacts to condition the other contacts of the transmitter. The operation of relay 706 also completes a locking circuit for maintaining itself operated under control of relays 701, 702, 703 and 704.

The operation of relay 706 also removes positive battery from the locking circuit of relay 838 which was supplied through the upper break contacts of relay 706. Relay 838, however, does not immediately release at this time because battery is still connected to its locking winding through contacts 620 which are closed at this time because the cycle of operation of the transmitter shown in Fig. 6 during which this H signal is transmitted has not been completed.

It should be noted that both the figures signal and the H signal are transmitted by the transmitter shown in Fig. 6 over the transmission circuit extending through loop 1289 as described above. These signals are recorded by the monitoring teletypewriter 1290 and in response to the figures signal followed by an H signal contacts 1291 are momentarily opened. The manner in which these contacts are opened in response to a succession of two signal combinations is fully described in the above-identified patents to Morton and need not be repeated here. It should be noted that the receiving teletypewriter 1290 will momentarily open contacts 1291 a short interval of time after the H signal has been completely received. In the meantime, however, the transmitting distributor 673, shown in Fig. 6, will have come to rest and opened contacts 620, thus interrupting the locking circuit of relay 838, whereupon relay 838 releases and, in turn, releases relay 839. The release of relay 839 completes the operating circuit of relay 708 and removes the negative battery connected to lead 1259 which extends to relay 1265 and then when contacts 1291 are opened a short interval of time later relay 1265 releases and connects positive battery to the upper winding terminal of the printing magnet 1293, thus maintaining this magnet operated and preventing the receiving or monitoring instrument 1290 from following signals received over loop 1289. The release of relay 1265 also removes the battery connected from its operated contacts through the upper break contacts of relay 1263 to the left-hand winding terminal of the selector magnet 1248, thus enabling this magnet to respond to the signals transmitted over the loop 1289 and repeated by relay 1247. This restores the circuits controlling this selector mechanism 1269 and the teletypewriter 1290 to their normal condition.

The release of relay 838 disconnects the transmission circuit of the transmitter shown in Fig. 6 from the transmission circuit of loop 1289 and connects positive battery to this loop circuit to maintain it closed and thus maintain the apparatus controlled by it in their idle condition. The release of relay 838 interrupts the operating circuit of relay 830 and thus allows this relay to release and extinguish busy lamp 863. The release of relay 830 also connects battery to the operating windings of the switching relays 838, 1138, 1838, 2138 and 2438, thus conditioning these relays for operation in response to the operation of some one of the respective relays 837, 1137, 1837, 2137 and 2437 when it is desired to transmit another message to station B.

If there are "letters" signals recorded in tape 500 following the "figures" and H signals, these signals will be advanced through the transmitter until the supply of perforated tape 500 is reduced to the predetermined minimum quantity after which contacts 682 will be opened. This interrupts the circuit of relay 650 which releases and interrupts the circuit of start magnet 672, thus stopping the transmitter. Combinations other than "letters" signals which are not assigned to any of the contacts controlled by the switch levers 664 are likewise passed through the transmitter without any effect upon it.

When the first "letters" signal passes through the transmitter and each of the following "letters" signals, contacts 619 are momentarily opened. This interrupts the locking circuit of relay 707, thus permitting this relay to release. Relay 706, however, is maintained operated until one of the relays 701, 702, 703 or 704 is operated.

*Transmitting message to the central switching station*

Assume now that the operator at station A instead of having only a single message to transmit has a second message to transmit to the central switching station immediately following the first message transmitted to station B.

After the transmission of the figures and H signals at the end of the first message the operator may transmit a number of letters signals after which the operator will transmit the letter R. When this R code combination is received by the selecting magnet 548 it will cause contacts 540 to momentarily close. The momentary closure of contacts 540 completes a circuit for the operation of relay 565 from positive battery through the winding of relay 565, closed contacts 540 and lower outer operated contacts of relay 562 to negative battery. Relay 565, when operated, completes a circuit for maintaining itself operated from battery through its winding and upper inner operated contacts to negative battery through contacts 591. The operation of relay 565 connects positive battery through its upper outer operated contacts and upper outer break contacts of relay 563 to the left-hand winding terminal of selector magnet 548 thus maintaining this magnet in its operated position and preventing the further operation of the receiving mechanism 569.

The operation of relay 565 also removes the positive battery through its upper outer break contacts from the upper winding terminal of printer magnet 593 thus permitting this magnet to follow the signals transmitted over loop 589 and repeated by line relay 592. Thus the signals transmitted by the operator or attendant at station A are received by the printing magnet 593 and recorded on the receiving teletypewriter 590.

The operation of relay 565 connects negative battery directly to the busy lead 551 instead of through the lower operated contacts of relay 560. Lead 551 extends through Fig. 6 to Fig. 7. The application of negative battery to lead 551 causes the operation of relay 710 as described above. The operation of relay 710 completes an obvious circuit for lighting busy lamp 761 and in addition removes the operating potential from the switching relays 1018, 1318, 1718, 2018 and 2318. This prevents any other transmitter being connected to line 589 during the transmission of this message. The operation of relay 565 also connects negative battery through its lower outer operated contact and lower outer break contact of relay 563 to the lower winding terminal of relay 651 thus preparing a circuit for the operation of relay 651 as will be described hereinafter. It should be noted that during the transmission of this message from station A receiving relay 547 follows the signals transmitted; however, as pointed out above, the printing magnet 548 does not follow them because it is maintained operated. Relay 547 in following these signals, however, causes the operation of relay 560 which in turn removes the negative battery connected through its lower break contacts and lower inner operated contacts of relay 562 to the lower winding terminal of relay 651. However, as pointed out above, battery through the lower break contacts of relay 563, lower outer operated contacts of relay 565 is connected to the lower winding terminal of relay 651 and replaces the battery from the lower break contact of relay 560.

During the entire time this message is being received by teletypewriter 590 the printing reperforator 569 remains idle and does not perforate any additional tape. Consequently, as the transmission from the transmitter shown in Fig. 6 of the first message approaches the end of the message, the supply of perforated tape between the receiving reperforator 569 and the transmitter shown in Fig. 6, will be reduced to a predetermined minimum quantity which in turn causes contacts 682 to open and interrupt the circuit of relay 650 and allow this relay to release. The release of relay 650 will complete a circuit for the operation of relay 651 from the negative battery through the lower break contacts of relay 563, the lower outer operated contacts of relay 565, winding of relay 651 and right-hand break contacts of relay 650 to positive battery through the right-hand break contacts of relay 653. The operation of relay 651 in this circuit completes a locking circuit and also a circuit for operating relay 652 and magnet 549 as described above, thus causing an additional supply of tape 500 to be perforated with letters signals. After a predetermined interval of time relay 652 will operate and light lamp 872 whereupon the operator will operate key 874 which in turn operates relay 653. Relay 653 in operating completes a locking circuit for maintaining itself operated under control of relays 565 and 563 and interrupts the locking circuit of relay 651 thus permitting this relay to release and in turn release magnet 549 and relay 652. The release of magnet 549 stops the automatic perforation of tape 500 and the release of relay 652 extinguishes lamp 872.

Under these conditions no part of the first message will remain in the perforated tape between the reperforator 569 and the transmitting distributor shown in Fig. 6.

At the completion of the message transmitted from station A to the receiving teletypewriter 590 at the central switching station the operator or attentdant at station A will again perforate a figures signal followed by an H signal. When these signals are received by the teletypewriter 590 they will cause contacts 591 to open. This interrupts the locking circuit of relay 565 and thus allows this relay to release and restore the circuits to their normal or idle conditions.

*Transmitting message to another type of switching system*

Assume now that an attendant at station B, that is, station 1285, has a message intended for some subscriber who can be reached only through a connection through a distant manual telegraph switching system to which a large number of subscribers scattered throughout the country are connected. In this case the operator at station B will transmit a number of letters signals first. When these letters signals are received by the receiving instrument 1269 they cause it to momentarily open contacts 1239 and interrupt the locking circuit of relay 1261. Relay 1261 releases but relay 1262 does not release at this time.

It is assumed that the circuits associated with line 1289 have been previously conditioned by the reception of the figures signal followed by an H signal at the end of the previous message or that the relays 1262 and 1306 have been operated by the operation of the respective keys 1201 and 1331 or in any other suitable manner. Under these conditions the operator at station B will transmit the signal C designating the central station C, indicated by 348 in Fig. 3 and 1627 in Fig. 16, following the letters signals. It is understood that any suitable designation may be employed for any of these stations. Upon the reception of the letter C signal by the printing reperforator 1269, contacts 1232 will be momentarily opened and interrupt the locking circuit of relay 1262 thus permitting relay 1262 to release. The release of relay 1262 interrupts the circuit of the left-hand winding terminal of relay 1251 thus preventing this relay from operating during the time relays 1262 and 1265 are released. The release of relay 1262 in addition connects negative battery to lead 1257 which extends through Figs. 13, 14, 11 and 8 to the winding of relay 830 thus completing a path for holding this relay operated, it having operated when relay 1260 operated upon the reception of the first impulse transmitted from station B. The operation of relay 830 completes an obvious circuit for lighting busy lamp 863 to indicate to the operator that line 1289 extending to station B is busy. The operation of relay 830 in addition removes the operating potential from the operating windings of relays 838, 1138, 1838, 2138 and 2438 thus preventing the connection of any transmitter at the central station to line 1289 at this time.

It may be desirable after the transmission of each of the switching characters or combination of characters to again transmit one or more letters signals to provide sufficient time to insure that the various relays and switching circuits have ample time to operate to establish the proper transmission and control circuits so that none of the message characters will be either mutilated or lost due to the operation of any of the switching circuits. Following these signals the operator or attendant at station 1285 will transmit a message intended for some station connected to the switching network to which station C is connected.

Following the transmission of the message the attendant at station B will transmit the figures code combination followed by an H code combination. When the figures code combination is received by the printing reperforator 1269 it causes contacts 1238 to momentarily close and complete an obvious circuit for the operation of relay 1261. The operation of relay 1261 completes a locking circuit for maintaining itself operated under the control of contacts 1239 and 1236. Relay 1261 in operating also connects negative battery to one spring of contacts 1237.

When the H signal is received by the receiving device 1269 it causes contacts 1237 to momentarily close and complete a circuit for the operation of relay 1262. The operation of relay 1262 completes a circuit for maintaining itself operated under control of contacts 1231, 1232, 1241, 1242 and 1243. The operation of relay 1262 also connects battery to one of the terminals of contacts 1240, 1230 and 1234.

A short interval of time after the last signal is received from station B, relay 1260 will release and remove negative battery from lead 1257 extending to relay 830. Relay 830 then releases, extinguishes the busy lamp 863 and connects the operating battery to the windings of switching relays 838, 1138, 1838, 2138 and 2438 to enable them to connect any of the transmitters at the central station to line 1289.

When the signals are received by the printing reperforator 1269 it perforates tape 1200 in accordance with the received signals. This permits the tape control contacts 1282 to close and complete an obvious circuit for the operation of relay 1250. Relay 1250, in operating, completes a circuit for the operation of the start magnet 1272 from negative battery through the right-hand outer break contacts of relay 1254, the right-hand operated contacts of relay 1250, switch 1280, winding of start magnet 1272, to positive battery through the lower break contacts of relays 1304, 1303, 1302 and 1301 in series. The start magnet 1272 will be operated by current flowing in this circuit and attract its armature 1279 which will then release the stop cam 1278 and permit the distributor 1273 to rotate and advance tape 1200.

It is to be understood that the transmitter 1270, shown in Fig. 12, is similar in construction to the transmitter shown in Fig. 6. All of the mechanical details have not been shown, as for example the selecting levers similar to levers 667 and switch lever 664 controlling the contacts have not been shown. In addition, contacts 1220 are similar to the contacts 620 and are operated in a similar manner. They have been shown in Fig. 12 actuated directly by cam 1274 instead of through the intermediate lever 699 as shown in Fig. 6. It is to be understood that these contacts may be operated by the lever of the transmitting distributor 1270 which corresponds to the lever 699 of the distributor shown in Fig. 6. In addition, it has been assumed that the figures signal followed by an H signal at the end of the previous message which caused the transmitter 1270 to be disconnected from the line to which it was transmitting, operated relays 1307 and 1306 and that these relays completed circuits for maintaining themselves operated, as has been explained with reference to relays 707 and 706.

When the start magnet 1272 operates and releases the transmitter 1270, it will advance the tape through the transmitter and ignore all of the letters signals which may have been perforated in the tape. It is to be noted that contacts 1219 open momentarily for each letters signal perforated in tape 1200 as it passes through the transmitter 1270. The first time contacts 1219 thus open, the locking circuit for relay 1307 is interrupted and relay 1307 releases.

Thereafter the tape 1200 is advanced through transmitter 1270 as long as contacts 1282 remain closed or until a switching character perforated in tape 1200 reaches the control point of the transmitter 1270, at which time the associated switching contacts close. Under the assumed conditions, when the perforations representing the letter C arrive at the control point of the transmitter 1270 they will cause contacts 1212 to momentarily close. The momentary closure of contacts 1212 completes a circuit for the operation of relay 1303 from positive battery through the upper inner operated contacts of relay 1306, the upper outer break contacts of relay 1304, operated contacts 1212, to negative battery through the winding of relay 1303. The operation of relay 1303 completes a circuit for maintaining itself operated from negative battery through its winding and lower operated contacts to positive battery through operated contacts of relay 1308. Relay 1308 is maintained operated at this time by current flowing in a circuit from negative battery through the winding of relay 1308 to positive battery through the inner left-hand break contacts of relays 1319, 1329, 1449 and the outer left-hand break contacts of relay 1459.

The operation of relay 1303 interrupts the locking circuit for relay 1306 and allows this relay to release. It also interrupts the circuit of the start magnet 1272 and thus allows this magnet to release, which will cause the distributor 1273 to come to rest at the end of the revolution then in progress. The operation of relay 1303 also completes a circuit for the operation of magnet 1271. Magnet 1271 of the distributor 1270 corresponds to magnet 671 of the transmitter shown in Fig. 6. Operation of this magnet causes the tape feed pawl to disengage its associated ratchet and thus prevents the tape from being advanced. Consequently, the perforations representing the letter C remain at the control point in the transmitter 1270 at this time.

The operation of relay 1303 completes a circuit for the operation of relay 1447. Relay 1447 in operating completes a circuit for lighting lamp 1443 which indicates to an attendant that a message is waiting for transmission to the equipment associated with the line to station C designated 1627 in Fig. 16. If this equipment is busy at this time, relay 840 will be operated so that the circuits will then remain in this condition until the equipment shown in Figs. 15 and 16 becomes idle.

If in the meantime another message is directed to station C from station A, for example, relay 847 will also operate and light lamp 841. If, for example, it is also desired to transmit a message from some station at the second switching center shown in Fig. 2 to station C, relay 1147 will be operated when the letter C preceding this message arrives over the control pins of transmitter 970. All these messages then await transmission to equipment shown in Figs. 15 and 16 until this equipment becomes idle, it being assumed that it is busy receiving a message in the multiple transmission circuit shown in Figs. 22, 23 and 24, or some other station not shown in the drawings, the operation of which is described hereinafter. Upon the termination of the message from this multiple transmission circuit, relay 840 will release and apply operating battery to the right-hand windings of relays 848, 1148 and 1448. However, since relay 847 is operated, relay 848 will operate in a circuit from positive battery through the operated contacts of relay 847, right-hand winding of relay 848 to negative battery through the left-hand inner break contacts of relay 840. Since relay 847 is operated at this time, relay 1148 cannot operate because its operating circuit is interrupted at the break contacts of relay 847. Similarly, relay 1448 cannot operate because its operating circuit is interrupted at break contacts of relays 1147 and 847. Consequently, it is possible for only one of the transmitters to be connected to the circuits shown in Figs. 15 and 16 even though a number of transmitters have messages for this line and are waiting to transmit these messages to it.

Figure 16:
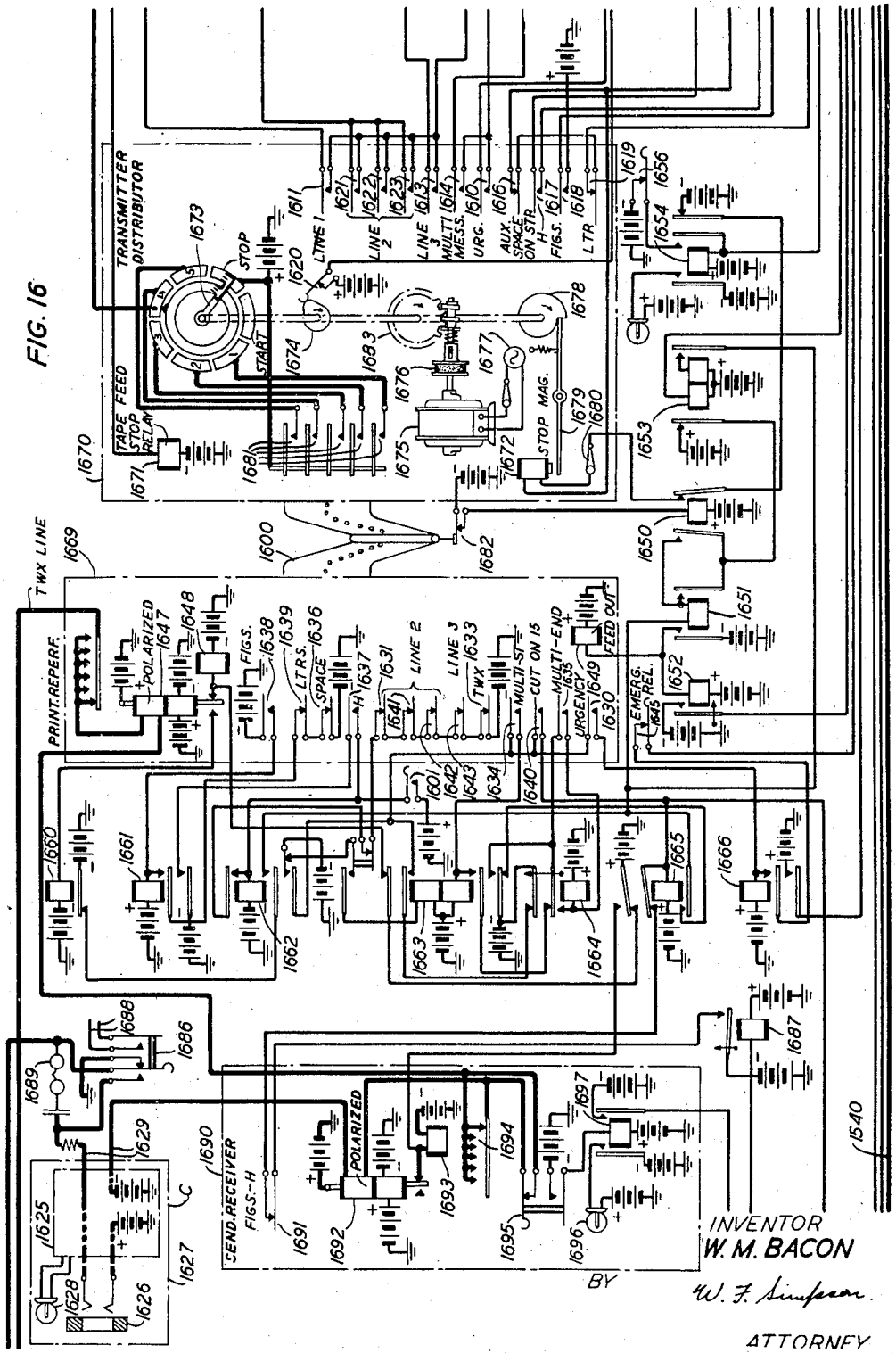
Figure 17:
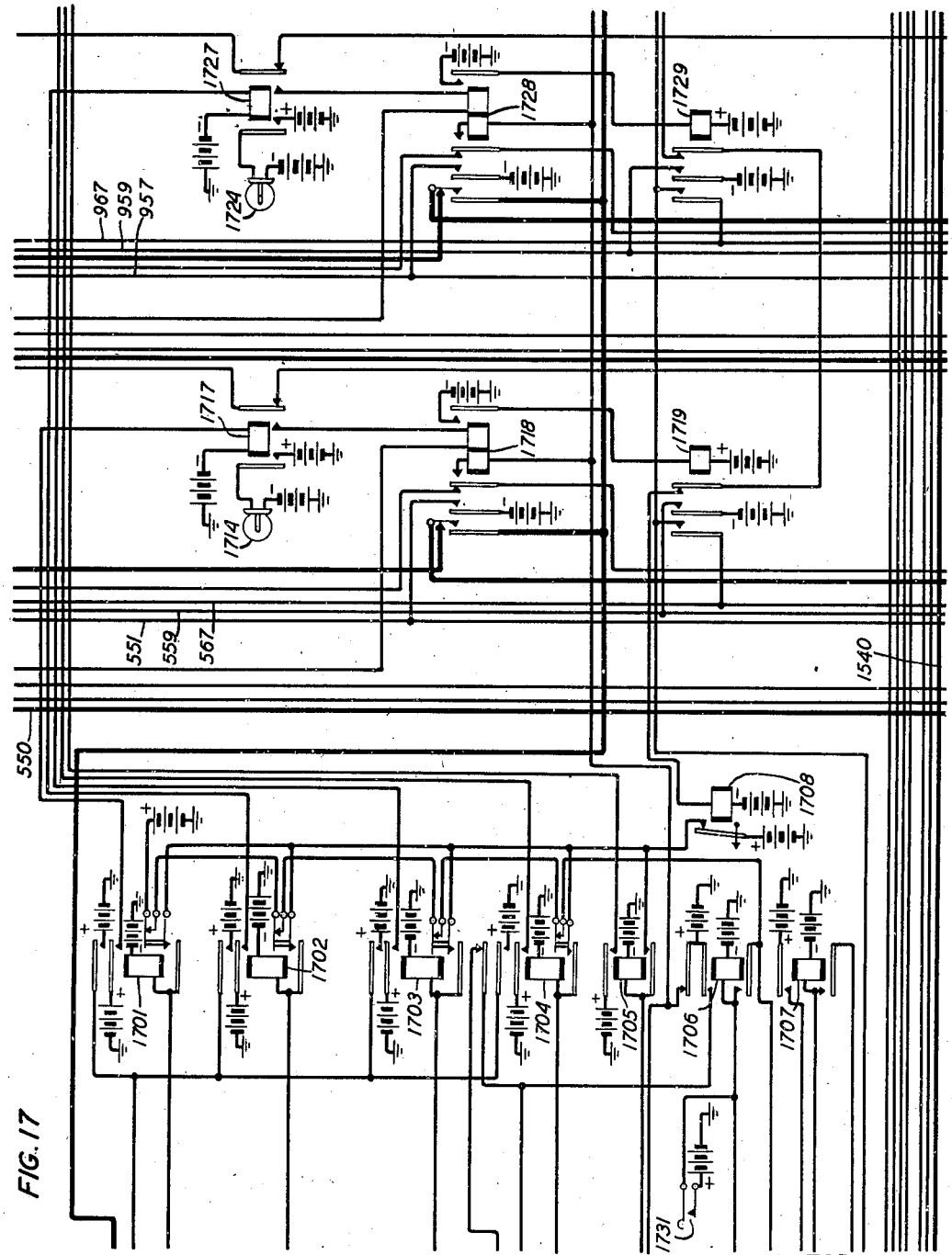
Figure 18:
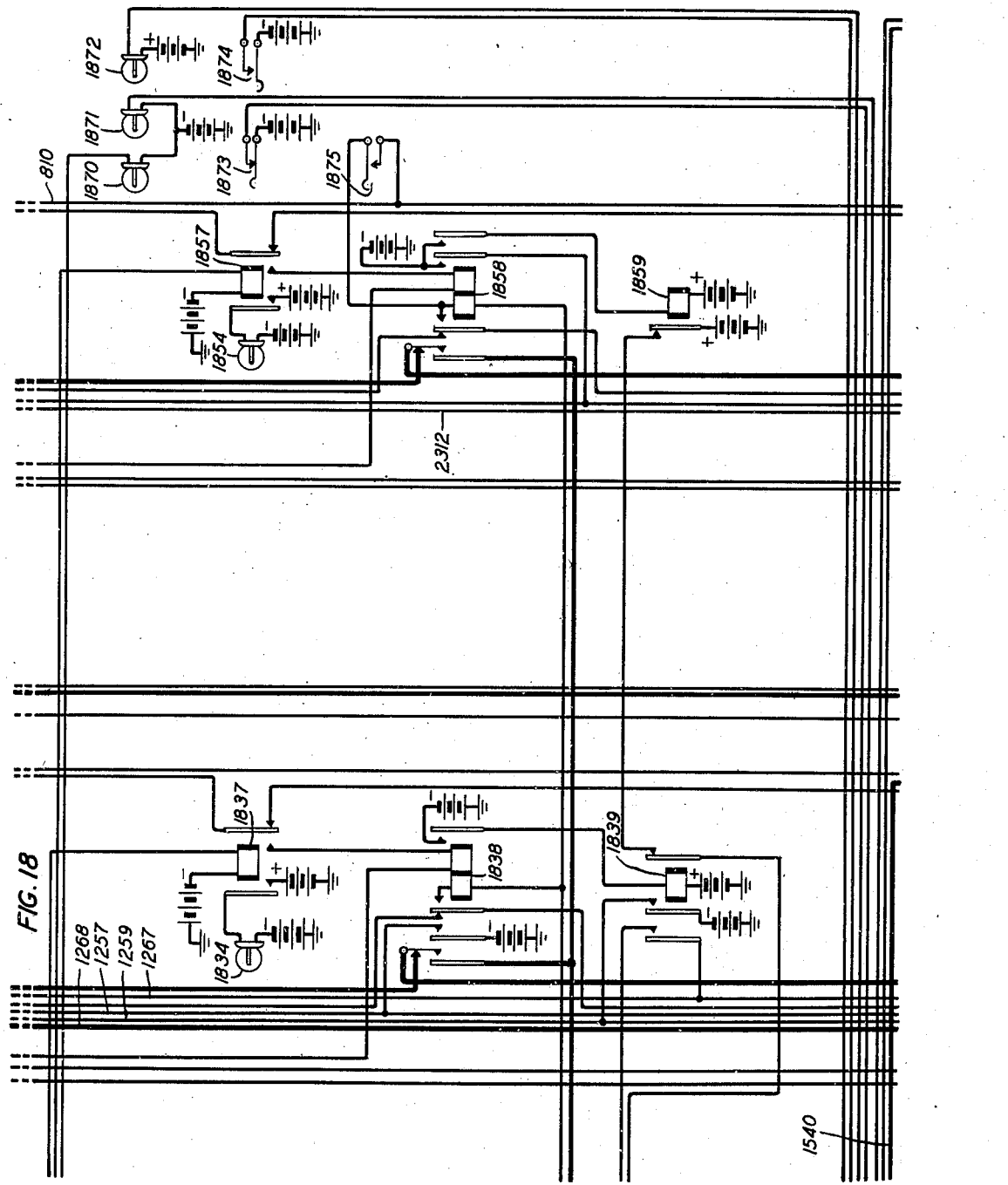
Figure 19:
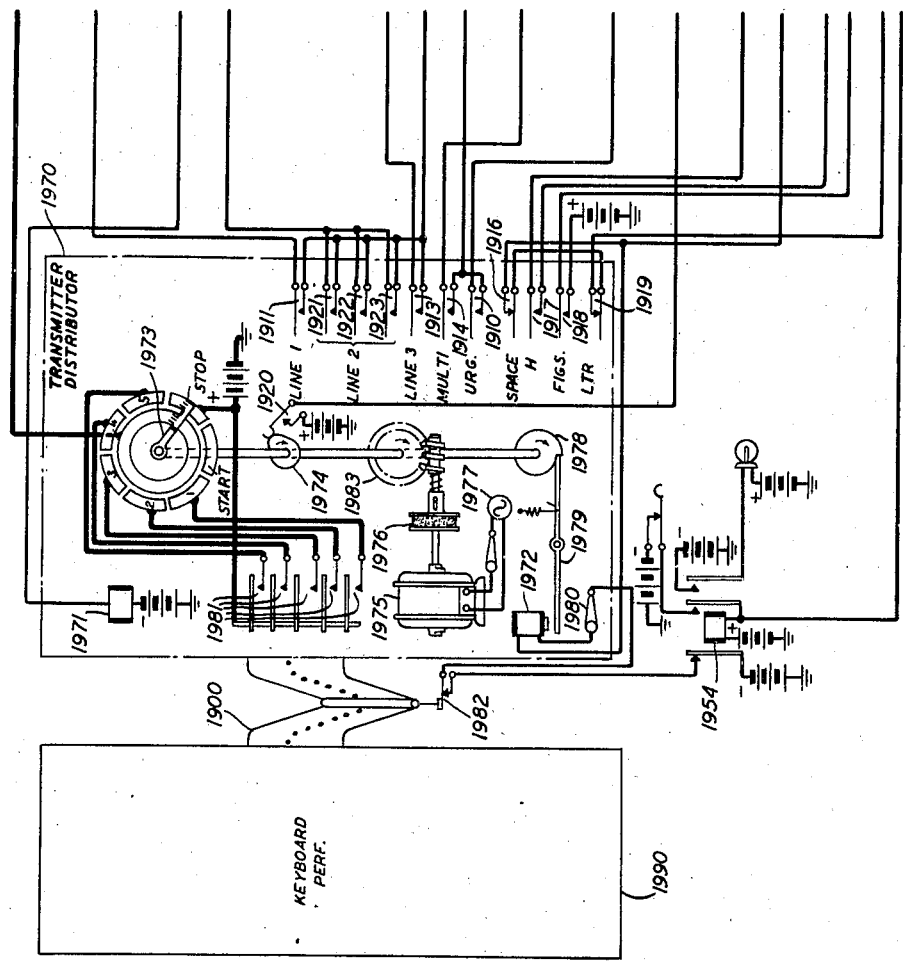
Figure 20:
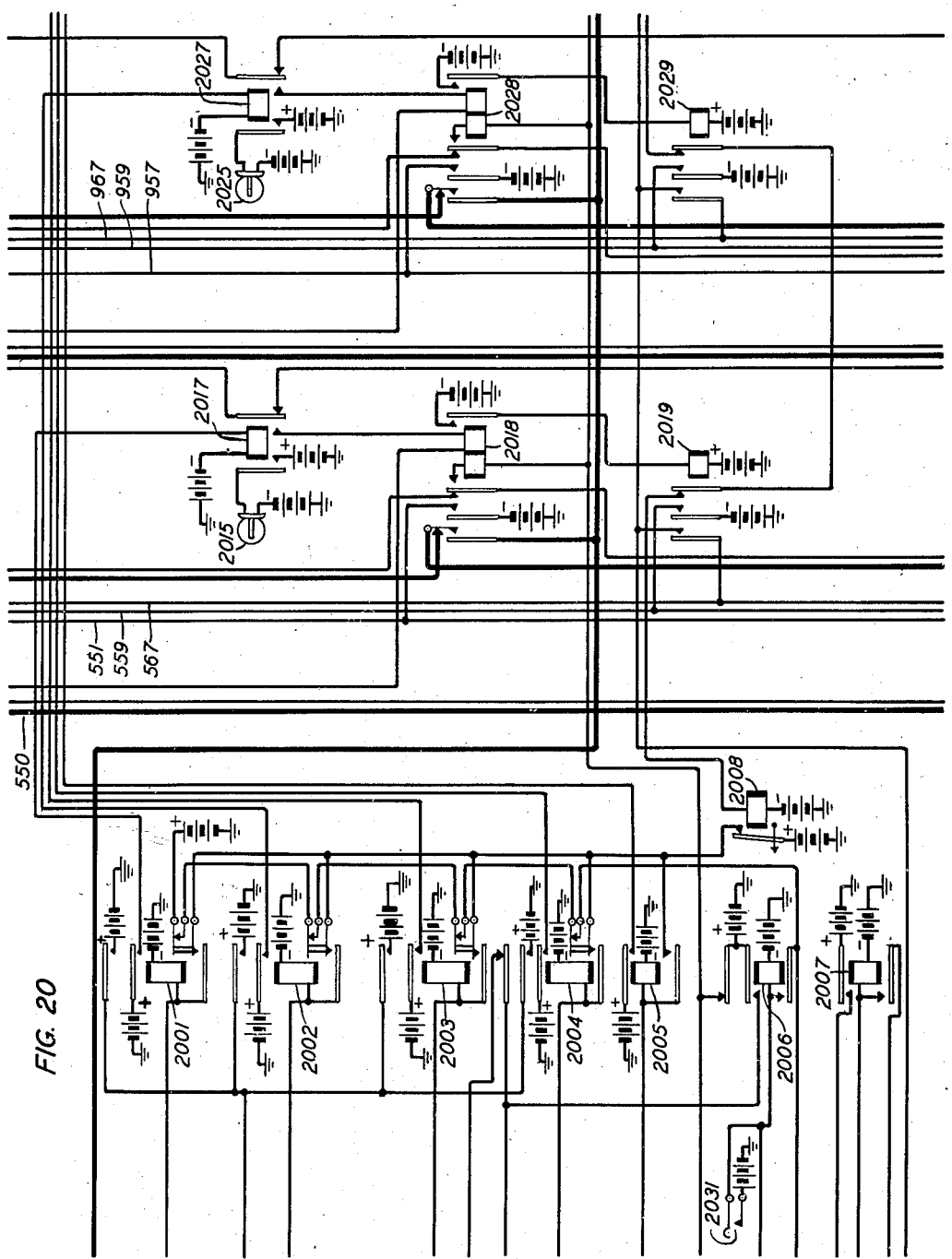
Figure 21:
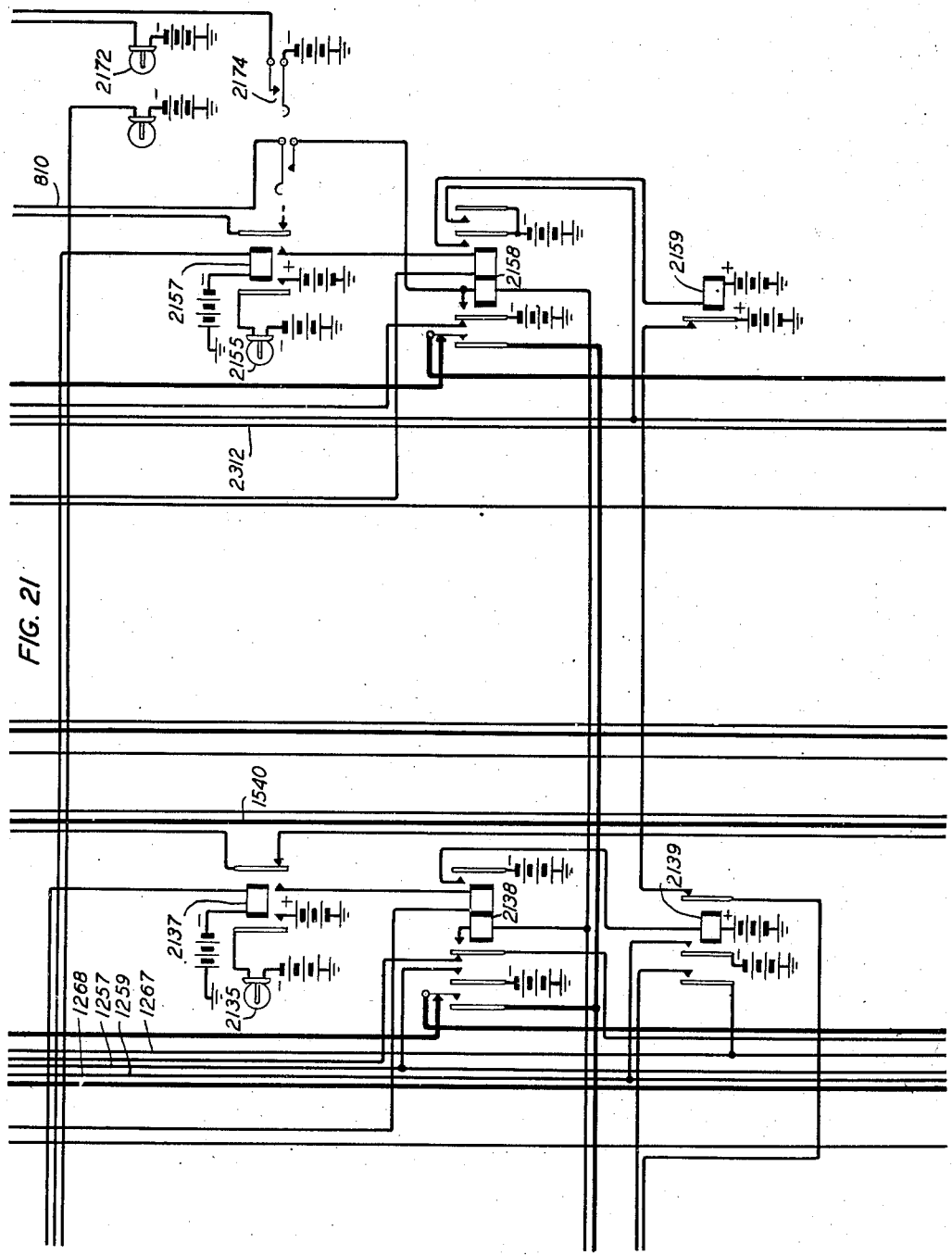

Assume now that a message from station A to station C has been transmitted to the equipment shown in Figs. 15 and 16. At the end of this message, relay 840 will again be released. At this time relay 847 will not be operated. Consequently, relay 1148 will operate in a circuit extending from positive battery through the back contacts of relay 847 and the operated contacts of relay 1147, through the right-hand winding of relay 1148 to negative battery, through the back contacts of relay 840. Assume now that at about this time relay 847 is again operated by another message from station A directed to station C, the operation of relay 847 at this time will cause the operation of relay 848 as described above. Under these circumstances, both relay 848 and relay 1148 will be operated. However, relay 1148 in operating completes a circuit for maintaining itself operated through its left-hand inner operated contacts and interrupts the locking circuit for relay 848. Both relays 1148 and 848 complete a circuit for the operation of relay 840. Relay 840 operates and removes the negative battery from the operating windings of relays 848 and 1148 whereupon relay 848 will release but relay 1148 will remain operated due to the locking circuit extending from positive battery, through the upper break contacts of relay 1006, through the left-hand winding and left-hand inner operated contacts of relay 1148 to negative battery, through the left-hand inner break contacts of relays 1448 and 2448.

Under these circumstances, the operation of relay 848 completed a circuit for the operation of relay 849 which relay in turn interrupted the operating circuit of relay 708. Relay 708, however, is slow in releasing so that it does not immediately release. The operation of relay 840 and the release of relay 848 as described above interrupts the operating circuit of relay 849 which relay releases and reestablishes the operating circuit of relay 708 before this relay releases. Consequently, the selecting relay 703 remains operated but the transmitter shown in Fig. 6 will not be started into operation.

Relay 1148 is operated and locked operated as described above and completes a circuit for the operation of relay 1149. Relay 1149 in operating interrupts the operating circuit of the slow-release relay 1008. Since relay 1148 is locked operated it will remain operated and maintain relay 1149 operated so that relay 1008 will release and start the transmission from transmitter 970 by releasing relay 1003.

Consequently, under these circumstances, only one transmitter is again connected to the equipment shown in Figs. 15 and 16.

At the termination of this message, relay 840 will be again released and the message awaiting transmission from station A will be transmitted to station C. At the termination of this message, relay 840 will be again released and if there are no messages awaiting transmission either from station A or the second switching station relay 1448 will be operated in a circuit extending from positive battery, through the break contacts of relays 847 and 1147, the operated contacts of relay 1447, the right-hand winding of relay 1448 to negative battery through break contacts of relay 840. Relay 1448, in operating, completes an obvious circuit for the operation of relay 1449. Relay 1448 also completes a circuit for the operation of relay 840 which in turn causes busy lamp 864 to light and removes the operating potential applied to the operating windings of the switching relays 848, 1148 and 2448, thus preventing any of these relays from operating and connecting another transmitter to the equipment associated with the line extending to station C, designated 1627 in Fig. 16.

Figure 13:
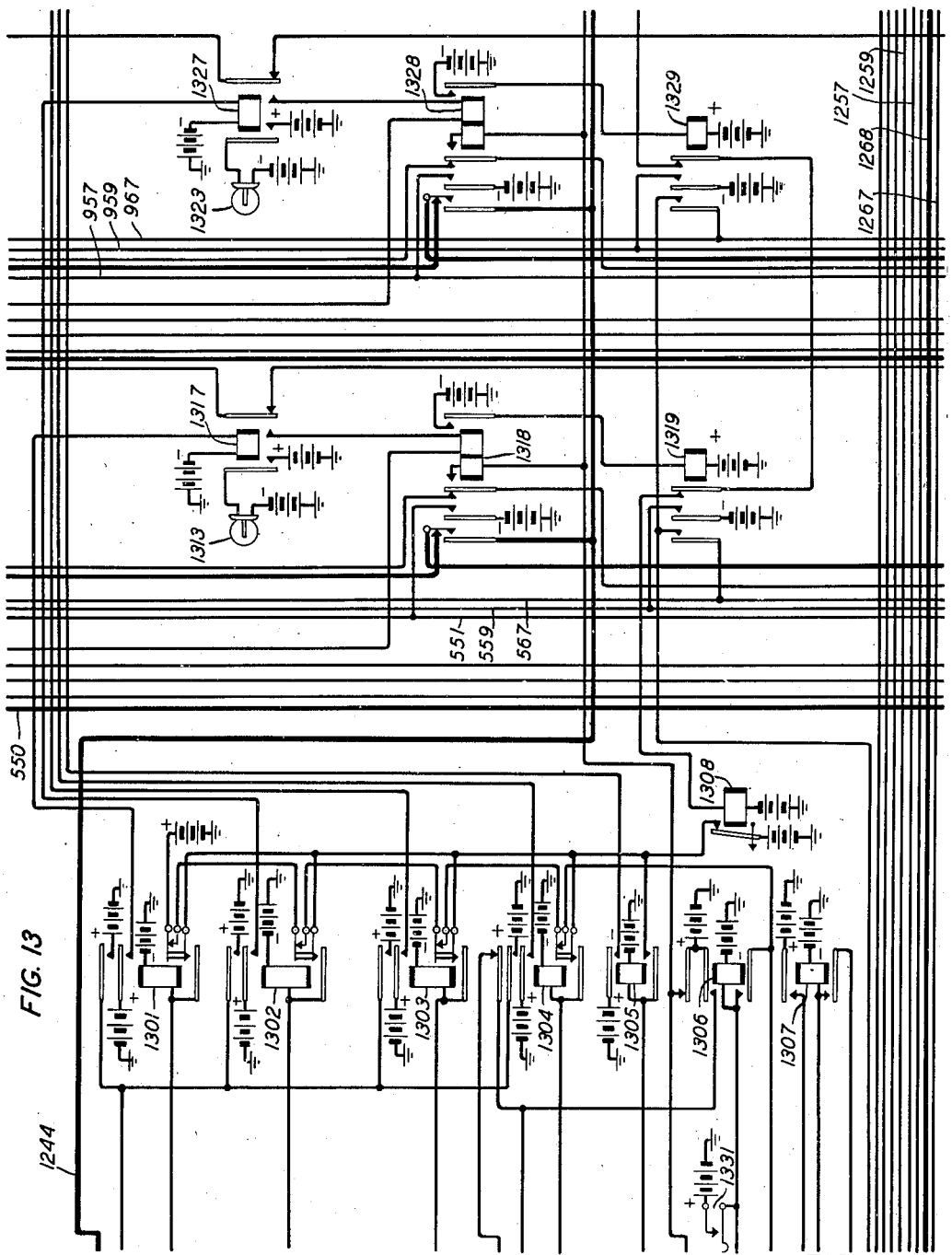
Figure 14:
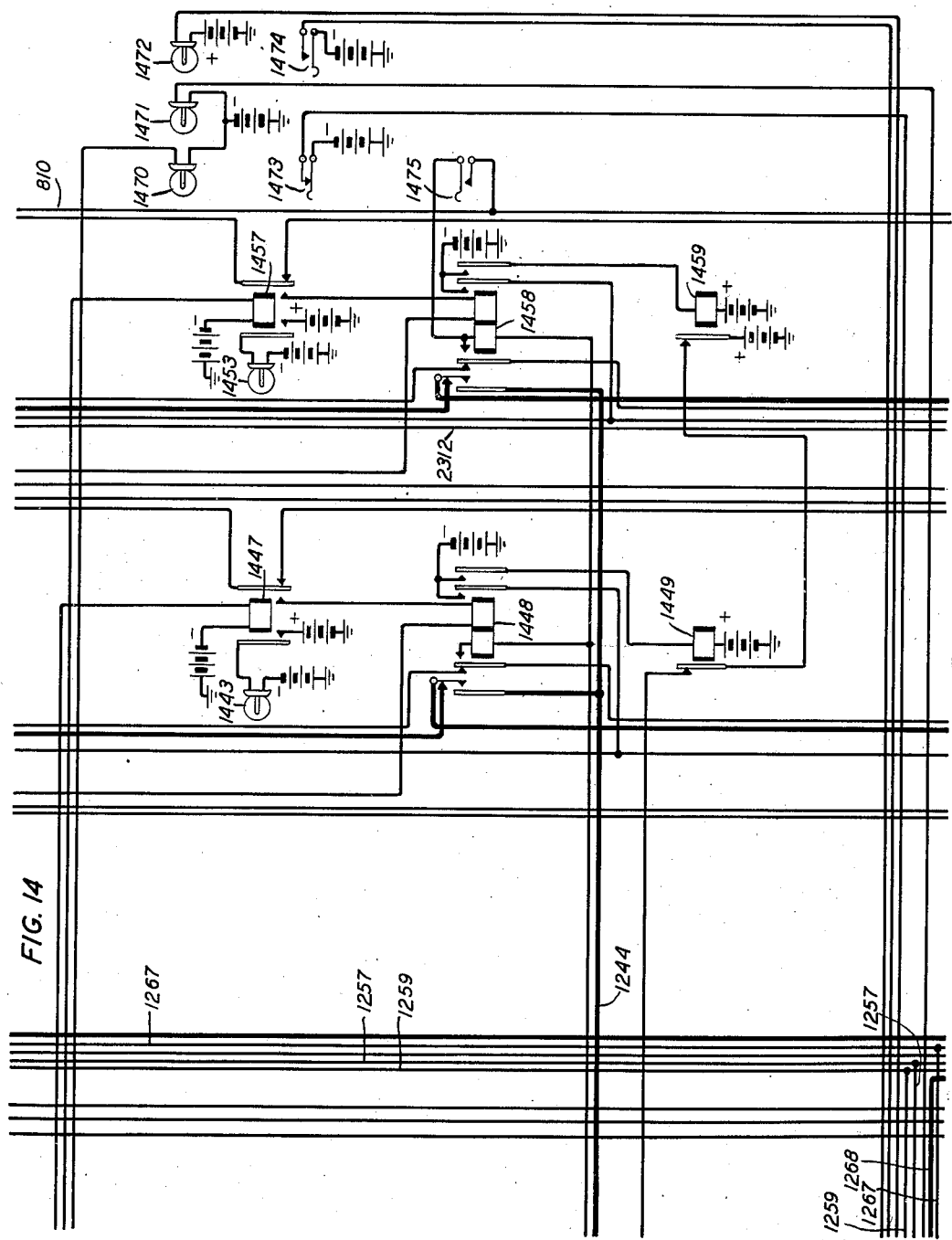

The operation of relay 1443 extends the transmission circuit of the distributor 1270 from positive battery through contacts 1281, distributor segments, the brush carried by the distributor arm 1273, distributor segments, lead 1244 which extends through Fig. 13, the left-hand outer operated contacts of relay 1448, the right-hand break contacts of relay 2448, lead 1540 which extends through Figs. 21, 18, 17, 16 and 15, to negative battery through the lower winding of receiving relay 1547 of the printing reperforator 1569.

The operation of relay 1449 as described above interrupts the operating circuit of relay 1308. When relay 1308 releases it interrupts the locking circuit of relay 1303 and permits this relay to release. The release of relay 1303 at this time interrupts the operating circuit of magnet 1271 and thus allows this magnet to release so that when the operation of the transmitter 1270 is resumed the tape 1200 will be fed through the transmitter in the normal manner. The release of relay 1303 also interrupts the circuit of relay 1447 which relay releases and extinguishes lamp 1443.

The release of relay 1303 also reestablishes the circuit through the start magnet 1272 and thus causes this magnet to operate and release the distributor arm 1273 for rotation. During the first revolution of this distributor signals representing the character C, which controlled the establishment of the transmission circuit to relay 1547 as described above, will be transmitted over the transmission circuit to the relay 1547. Signals representing the message will follow as the transmitter 1270 operates and the tape 1200 passes through and controls the signals transmitted. These signals are received by the receiving relay 1547 of the reperforating device 1569. The reperforating device 1569 is of the same type as shown in Figs. 25 and 26 and indicated graphically at 569, 969, 1269, 1669 and 2269. This printing reperforator is also provided with a group of contacts; however, only a few of these contacts are used in this circuit.

Here again it is assumed that the figures signal followed by an H signal, following the previous message transmitted through this equipment, caused relays 1561 and 1562 to operate and lock operated, or that relay 1562 has been operated by the momentary operation of key 1501. The first switching signal including the C and M signal will interrupt the locking circuit of relay 1562 by causing the reperforating mechanism to momentarily open one of the contacts 1531, 1533, 1534, 1541, 1542, 1543 in response thereto and permit this relay to release. The signals received thereafter by relay 1547 are repeated to the selecting magnet 1548 and cause the printing reperforator 1569 to print corresponding characters on tape 1500 and to perforate this tape in accordance with the received signals. The first spacing signal or letters signal received by this magnet will cause either contacts 1536 or 1539 to momentarily operate and interrupt the locking circuit of relay 1561. Normally, the switch 1580 will be open, consequently the supply of tape 1500 will be accumulated between the printing reperforator 1569 and the transmitting distributor 1570. Following the message, the figures signal followed by an H signal will momentarily close contacts 1538 and 1537 in sequence and cause the operation of relays 1561 and 1562, respectively. Upon the operation of relay 1562 and the release of relay 1560, in case the line relay 1547 remains in its marking position as a result of no further signals being transmitted to this equipment, battery is connected to the left-hand winding terminal of relay 1551, thus preparing a circuit for the operation of this relay in case the supply of tape 1500 between the printing reperforator 1569 and the transmitting distributor 1570 becomes reduced to a predetermined minimum value.

After a certain quantity of tape 1500 has been accumulated, or at specified times during the day, the operator at the central switching station will initiate a call in the usual manner to the central station C, designated 1627. To accomplish this the operator will signal station 1627 by operating key 1686 which closes the line circuit 1629 extending to station equipment 1625 and cause lamp 1628 to light before the operator at station C. The manner in which the closure of line 1629 causes lamp 1628 to light is described in detail in U. S. Patent 1,936,200, granted November 21, 1933, to G. A. Locke et al., or a patent of G. A. Locke et al. 2,237,154 dated April 1, 1941, which patents are each hereby made a part of this application to the same extent as is fully set forth herein.

The operation of key 1686 also completes the circuits of the driving motors of the devices 1690 and 1669. The operator at station C will then communicate with the operator at the central switching station and the operator at the central switching station can manually operate the send-receive switch 1695 so as to permit her to operate the transmitting contacts 1694 by operating her keyboard. After the desired connection is established by the operator at station C, the operator at the central switching station may close switch 1580 and complete the circuit of the start magnet 1572 from positive battery through the right-hand operated contacts of relay 1550, switch 1580, the winding of start magnet 1572 to negative battery through the right-hand operated contacts of relay 1697. This magnet then attracts its armature 1579 and releases the transmitting distributor brush arm 1573 whereupon the transmitter 1570 transmits the signals stored in tape 1500 over the line to station C and thence to whatever station is connected thereto.

At any time during the transmission of a message the operator at station C or the attendant or operator at the distant station to which the message is directed may interrupt the transmission from the transmitter 1570 by transmitting a break signal which exceeds the length of two code combinations. This break signal may be transmitted in any of the usual or customary manners employed in breaking as is well understood in the telegraph art.

Upon the reception of such a break signal by the receiving teletypewriter 1690 under these circumstances, the send-receive contacts 1695 are operated by the machine so as to interrupt the circuit for the operation of relay 1697. The operation of contacts 1695 in response to a break signal at least as long as two successive code combinations is clearly described in detail in the above-identified patents to Morton et al. and well understood in the telegraph art.

The release of relay 1697 also interrupts the circuit of the start magnet 1572, thus releasing this magnet and stopping the transmission from the transmitter 1570 at the end of the revolution or cycle then in progress.

The operator at the central switching station will then open switch 1580 and operate contacts 1695 to the sending position and communicate with the distant operator at station C or at the final station to which the message is directed, to determine what additional information is desired or what the cause of the trouble may be. After determining this she may move the tape 1500 back in the transmitter 1570 so that the entire message will be retransmitted to the distant station, after which she will reclose switch 1580 which reestablishes the circuit through the start magnet 1572, thus causing the transmitter 1570 to resume transmission to the distant station.

The above-described break operations may be repeated as often as desirable or necessary during the transmission of each of the messages over the line 1629 to switching station C.

Near the completion of the message if no further signals are received by the printing reperforator 1569 the tape control contacts 1582 will open whereupon relay 1550 will release and interrupt the operating circuit of magnet 1572. The release of magnet 1572 causes the transmission from the transmitter 1570 to stop at the completion of the character then in progress of being transmitted. The release of relay 1550 completes a circuit for the operation of relay 1551. Relay 1551 in turn completes a circuit for the operation of magnet 1549. The operation of magnet 1549 causes additional tape to be perforated with letters signals as described above with reference to magnet 549 so that the entire message stored in tape 1500 will be transmitted by the transmitting distributor 1570.

Relay 1551, in operating, also completes an obvious circuit for operating slow-operating relay 1552. Relay 1552 is slow in operating so as to insure that the entire message recorded in tape 1500 will have time to pass through the transmitting distributor 1570 and be transmitted, after which relay 1552 will operate and light lamp 2172. The operator upon noting lighted lamp 2172 will momentarily operate key 2174, which completes a circuit for the operation of relay 1553. Relay 1553, in operating, interrupts the locking circuit for relay 1551, thus permitting this relay to release and in turn release relay 1552 and magnet 1549. The release of magnet 1549 stops the automatic perforation of tape 1500 with letters signals and the release of relay 1552 extinguishes lamp 2172.

After the message has been completely transmitted from the transmitter 1570 the figures signal followed by an H signal will be transmitted. This causes contacts 1691 to be momentarily operated. The momentary operation of contacts 1691 in response to a figures signal followed by an H signal is clearly described in the above-identified patents to Morton et al.

Inasmuch as relay 1687 is operated at this time this operation of contacts 1691 will serve no purpose at this time. It will, therefore, be necessary for the operator to watch the tape and determine when the message is completely transmitted or all the messages to any given destination completely transmitted so that the operator may open switch 1580 at the proper time and thus communicate by means of the keyboard of machine 1690. At the end of transmission the operator may send a disconnect or recall signal to station 1627 by restoring key 1686 to normal or by restoring this key to normal and then reoperating it.

In case the operator does not open the switch at once the tape 1500 will become taut and cause contacts 1582 to open. Contacts 1582 in opening interrupt the circuit of relay 1550, which relay releases and in turn interrupts the circuit of the start magnet 1572. The start magnet then releases and stops the operation of transmitter 1570. The operator when she notes this condition may then operate the keys and apparatus as described above and the circuits will operate in substantially the same manner as described above.

*Receiving a message from another type of switching system*

In case the operator at station C has a message to transmit to the central switching station or one of the other stations connected to it, as for example station A, the operator at station C will test line 1629 to determine whether or not it is busy. If it is not busy she will cause ringer or other signaling device 1689 to operate in the usual manner as described in the above-identified patents of G. A. Locke et al.

The operator at the central switching station will respond to the operation of this device by operating key 1686. The operation of key 1686 will start the motors of devices 1690 and 1669 and condition device 1690 for communication. The operator at the central switching station will then communicate with the operator at station C or the attendant at the ultimate transmitting station or both, to determine the destination of the message or messages. In case the message or messages are intended only for the central station the operator will leave the circuits in their present condition and receive the message on the teletypewriter 1690. In case some of the messages are intended for other stations the operator will operate key 1556.

The operation of key 1556 interrupts the circuit of relays 1665 and 1687. These relays then release. Relay 1687 is made slow in releasing so as to insure that relay 1665 will release first so its locking circuit will not be completed by the release of relay 1687. The release of relay 1665 renders the teletypewriter 1690 non-responsive to received signals and renders the printing reperforator responsive to any signals received over line 1629.

Prior to the operation of key 1556 the operator at the central switching station will indicate that she is ready to receive the messages over line 1629. Then she will operate key 1556 as described above. The transmitter at the transmitting station can then transmit signals over line 1629 to the central switching station. Relays 1661 and 1662 will have been operated by the figures and H signals following the last message received over line 1629. Relays 1647 and 1692 will follow the signals transmitted over line 1629. Relay 1647 in following the received signals repeats them to the selector magnet 1648 and it in turn causes the printing reperforator 1669 to print and perforate tape 1600 in accordance with these signals. The operation of relay 1647 in following these signals causes relay 1660 to operate. The operation of relay 1660 removes battery from the left-hand winding terminal of relay 1651 and releases this relay if it had been operated and prevents its operation, thus stopping or preventing the automatic perforation of tape 1600. The operation of relay 1660 or the release of relay 1662 does not operate relay 840. Consequently, it is possible for one of the other transmitters to transmit a message to the recording device 1569 at the same time that a message is being received over line 1629 from station 1627.

Inasmuch as relay 1665 is released and maintains the printing magnet 1693 operated, the message will not be recorded by the teletypewriter 1690 or at least the first switching signal will not be recorded by this machine. If, however, any of the messages are intended for the central switching station, the printing reperforator 1669 in responding to the switching signal preceding it will cause relay 1665 to operate and permit the printing magnet 1693 to follow the signals transmitted over line 1629 and thus cause it to record the signals transmitted over this line in a manner similar to the manner station A transmits signals to the central switching station as described above.

However, under the assumed conditions where the operator has a message intended for station A she will first transmit a number of letters signals which will cause contacts 1639 to operate once for each letters signal received. This permits relay 1661 to release but relay 1662 remains operated. Following the letters signals the operator will transmit a switching signal which under the assumed conditions will be a letter A. When this signal is received by the printing reperforator 1669 it will cause contacts 1631 to be momentarily opened and thus interrupt the locking circuit of relay 1662, thus permitting this relay to release. The printing reperforator will record all of these signals and the following message signals in tape 1600 as well as print the corresponding characters on the tape 1600.

Following the figures and H signals following the last message the operator may send a disconnect signal to station 1627 by restoring key 1686 to normal. The operator will then restore key 1556 to normal and thus return the circuits extending to station 1627 to their normal condition and render them available for the transmission of other messages.

The additional perforated tape 1600 from the printing reperforator 1669 will permit contacts 1682 to close and complete an obvious circuit for the operation of relay 1650. The operation of relay 1650 completes a circuit for the operation of the start magnet 1672 from negative battery through the right-hand outer break contacts of relay 1654, right-hand operated contacts of relay 1650, switch 1680, winding of magnet 1672 to positive battery through the lower break contacts of relays 1704, 1703, 1702 and 1701 in series. Magnet 1672 will operate in response to current flowing in this circuit and attract its armature 1679 and release the distributor 1673 of the transmitter 1670. All of the letters signals and other signals recorded in tape 1600 except switching signals will be passed through the transmitter 1670. Each time a letters signal arrives at the control point over the pins corresponding to pins 663 of the transmitter shown in Fig. 6, contacts 1819 will be momentarily opened and interrupt the locking circuit of relay 1707, thus permitting this relay to release. Relay 1706, however, remains operated at this time in a circuit extending from negative battery through the winding of relay 1706, lower operated contacts of relay 1706, to positive battery through the lower break contacts of relays 1704, 1703, 1702 and 1701 in series.

When the first switching code combination or signal arrives at the control point over the controlling pins or fingers, contacts 1611 will be closed and complete a circuit for the operation of relay 1701 from positive battery through the upper inner operated contacts of relay 1706, the upper outer break contacts of relay 1704, operated contacts 1611 to negative battery through the winding of relay 1701.

The operation of relay 1701 completes a circuit for maintaining itself operated under control of relay 1708 which relay is in turn under control of relays 1719, 1729, 1839 and 1859. Relay 1701, in operating, also completes a circuit for the operation of magnet 1671. The operation of magnet 1671 disengages the feed pawl from its associated ratchet so that tape 1600 will not be advanced at the completion of the revolution of the distributor 1673 then in progress. The operation of relay 1701 interrupts the operating circuit of the start magnet 1672, thus permitting this magnet to release the start latch 1679 and cause the distributor 1673 to stop at the completion of the revolution then in progress. The operation of relay 1701 also interrupts the locking circuit of relay 1706, thus permitting this relay to release.

The operation of relay 1701 also completes a circuit for operating relay 1717. If line 589 is busy transmitter 1670 and the circuits thereof remain in this condition until the line becomes idle. When line 589 is idle the operation of relay 1717 completes a circuit for the operation of relay 1718 from positive battery through the break contacts of relays 1017 and 1317, the operated contacts of relay 1717, the right-hand winding of relay 1718 to negative battery through the break contacts of relay 710. Relay 1718, in operating, completes a circuit for maintaining itself operated under control of positive battery through the upper break contacts of relay 1706 and cam controlled contacts 1620. The operation of relay 1718 also completes a circuit for the operation of relay 1719 which relay, in turn, completes a circuit for the operation of relay 565 by connecting negative battery to lead 559 which extends from relay 1718 through Figs. 13, 10, 7, 6 and 5 to the winding of relay 565 and thence through the winding of relay 565 to positive battery.

The operation of relay 1718 extends the transmission circuit from the transmitter 1670 to loop 589. Relay 1718, in operating, completes a circuit for operating busy relay 710 which in turn lights busy lamp 761 and removes negative potential from the operating windings of relays 1018, 1318, 2018 and 2318, thus preventing any of these relays from operating at this time and interfering with the transmission from transmitter 1670.

The operation of relay 565 completes a circuit for maintaining itself operated under control of contacts 591 of the teletypewriter 590. Relay 565 also prevents the selector magnet 548 from responding to the signals transmitted over loop 589 and permits the printer magnet 593 to follow these signals as described above. Thus the operation of relay 565 permits a copy of the message transmitted over loop 589 to be recorded by the receiving teletypewriter 590 at the central switching station and prevents the receiving apparatus 569 from responding to the signals transmitted and thus prevents it from recording these signals in tape 500 and also from operating the associated switching contacts.

The operation of relay 1719 as described above interrupts the circuit of relay 1708 and permits this relay to release. The release of relay 1708 interrupts the locking circuit of relay 1701 and permits this relay to release. The release of relay 1701 interrupts the circuit of magnet 1671, thus permitting this magnet to release and enables the transmitter 1670 to advance the tape through the transmitter in the normal fashion. The release of relay 1701 also releases relay 1717 which, in turn, extinguishes the lamp 1714 and reestablishes the circuit through the start magnet 1672, thus permitting the transmitting distributor 1670 to transmit the message recorded in tape 1600 to station A, designated 585 in Fig. 5.

Here again the operator at station A at any time during the transmission of the message to station A may interrupt the transmission by sending a break signal by the operation of break key 584 for an interval of time which exceeds the time required to transmit two code combinations. This causes the receiving teletypewriter 590 to actuate the send-receive switch 595 and complete an obvious circuit for lighting lamp 596. The operation of the send-receive switch 595 also completes a circuit for the operation of relay 1654 from negative battery through the lower operated contacts of switch 595, lead 567 which extends through Figs. 6, 7, 10, 13 and 17, through the left-hand outer operated contacts of relay 1719 to positive battery through the winding of relay 1654.

The operation of relay 1654 completes an obvious circuit for lighting lamp 1655 to attract the operator's attention. The operation of relay 1654 also completes a locking circuit for maintaining itself operated under control of key 1656. In addition, the operation of relay 1654 interrupts the circuit of the start magnet 1672, thus stopping the transmission from distributor 1670.

The operation of the send-receive switch 595 as described above removes the short circuit from around the transmitting contacts 594 controlled by the keyboard of the teletypewriter 590, thus permitting the operator at the central switching station to communicate with the operator or attendant at station A to determine the reason for the break signal. Thereafter the operator at the central switching station may return the send-receive switch and contacts to the position shown in Fig. 5, move tape 1600 back so the message or any portion thereof can be retransmitted to station A, and then momentarily operate the release key 1656 thus releasing relay 1654 and extinguishing lamps 1655 and 596. The release of relay 1654 reestablishes the circuit through the stop magnet 1672 and thus causes the transmitting distributor 1670 to transmit the message to station A.

At the completion of this message a figures signal followed by an H signal is recorded in tape 1600. These signals are transmitted by the transmitting distributor 1670 and momentarily operate contacts 1618 and 1617 in succession, which in turn operate the respective relays 1707 and 1706. The operation of relays 1707 and 1706 completes locking circuits for maintaining themselves operated. The operation of relay 1706 removes positive battery from the upper break contacts of relay 1706 connected to the lower terminal of the left-hand locking winding of relay 1718. Relay 1718 does not immediately release, however, because battery is still connected to this winding terminal from contacts 1620. At the completion of the transmission of the H signal, however, contacts 1620 are opened by cam 1674, thus permitting relay 1718 to release. This in turn causes the release of relays 1719 and 710 and the reoperation of relay 1708 thus restoring these circuits to their normal condition.

When the figures signal followed by the H signal is received by the teletypewriter 590 it causes contacts 591 to be momentarily operated in response to this sequence of the figures signal and the H signal. The operation of contacts 591 interrupts the locking circuit of relay 565, thus permitting this relay to release and restore the equipment associated with line 589 to their normal or idle condition.

It should be noted that relay 1719 releases a short interval of time prior to the operation of the contacts 591 by the receiving teletypewriter 590, thus insuring that relay 565 will release when contacts 591 are momentarily operated.

*Transmission from the central switching station*

Keyboard perforator 1990 is provided at the central switching station for perforating tape in accordance with messages to be transmitted from the central switching station to any of the outlying stations connected to the system. The perforated tape passes from the keyboard perforator through the transmitting distributor 1970.

The keyboard perforator may be similar to those described in the above-identified patents to Burcky et al., Lake, and Lake et al. The transmitting distributor 1970 is similar to the transmitting distributor shown in Fig. 6 of the drawings. It responds to the signals recorded in the tape and controls the switching equipment in the same manner as the distributor shown in Fig. 6 and also distributors 970, 1270 and 1670. Also, during the transmission from the transmitting distributor 1970 to any of the outlying stations connected to the central switching station the operator or attendant at these stations may interrupt the transmission from the distributor 1970 by the transmission of a break signal which causes the operation of relay 1954 in the same manner as described above with reference to transmission of signals from other transmitters.

*Transmitting a message through two switching stations in succession*

This invention is also applicable to switching systems employing a plurality of switching stations or centers. In the system shown in Figs. 2 and 5 through 24, inclusive, when arranged as shown in Fig. 4, only two switching stations are indicated. Fig. 2 illustrates in diagrammatic form a switching station similar to that shown in Figs. 5 through 24, inclusive, connected thereto over line 226. It is to be understood that any number of additional switching stations may be connected to either or both of these switching stations shown in the drawings in the same manner. As shown in the drawings, each station is provided with only one trunk to the other station and with two outlying subscribers' stations. Means are also shown for transmitting messages from either of the switching stations to a switching station of another type, as for example the central station of a national telegraph switching network of the manual type. It is to be understood, however, that each of these switching stations may be provided with one or more lines extending to other local stations or stations individual to each of the switching stations and also one or more trunks to other similar switching centers. Additional lines may also extend to the same or other central exchange stations of a different type, as for example a national switching network.

The operation of the apparatus associated with each of the trunk circuits extending to other switching centers operates in substantially the same manner as the apparatus and equipment associated with each of the lines extending to the outlying or subscribers' stations associated with the switching stations. In this case, however, the switching signal combinations which precede the message first control the switching apparatus at the first switching station through which the message is routed, then the same switching combination is repeated over the line or trunk to the second switching station where it controls the routing of the message through the second switching station either to the desired station or through a third or as many additional switching stations as may be necessary or desirable to reach the final station for which the message is intended.

*Transmitting a message to a plurality of stations*

In case it is desired to transmit a message from any one of the stations of the system to all or any number of other stations of the system, the operator at the transmitting station will precede the message first by a special switching code combination followed by the code combinations designating each of the stations for which the message is intended. The code combinations representing the various stations to which it is desired to transmit the message may follow the initial special code combination in any order. The message may also be transmitted from any of the stations which may be operatively connected to the system and the operation of the system will be substantially the same. In order to describe in detail the various elements of the system it will be assumed first that the message originates at the central switching station shown in Figs. 5 through 24, inclusive, and that it is intended for all of the other stations connected to the system including the other central switching station, and in addition for a station connected to a national telegraph switching network. In case the central switching station is located at general headquarters, as will usually be the case, most of the messages which it is desired to broadcast to all or a number of the other stations of the system will originate at this station. It is, therefore, assumed that it is desired to transmit such a message from the central station shown in Figs. 5 through 24, inclusive. It is to be understood, however, that this message may be transmitted from any other station in the system to all or any number of the other stations connected to the system.

Assuming now that it is desired to transmit such a message from the central switching station, the keyboard perforator 1990 will be operated by the operator to perforate tape 1900. It is further assumed that at the end of the previous message transmitted from the keyboard perforator the figures signal followed by an H signal was transmitted through the transmitter distributor 1970, which caused relays 2007 and 2006 to operate and lock operated or that the operator has operated key 2031 which in turn caused relay 2006 to operate. Following these signals the operator will perforate a special signal indicating that the message is intended for transmission to a plurality of stations. Assume for example the letter M, indicating a multiple transmission of the message, is next perforated in the tape. This will be followed by the letters A, B, C, D, E and S. The operator may perforate these letters in any desired order, the only requirement being that the designation for each station for which the message is intended be perforated at this time. Following the perforation of all of the designations of all of the stations to which it is desired to transmit the message, the operator will transmit a second special signal or code combination, assume, for example, the letter X, indicating that the switching code combinations of all the stations to which it is desired to transmit the message have been perforated in the tape. Following this letter X signal, the operator perforates tape 1900 in accordance with the message it is desired to transmit to these stations. Following the message, the operator will perforate the figures signal code combination followed by an H signal code combination in tape 1900. She will then either tear the tape or, preferably, perforate a number of letters signals in the tape to insure that the entire message, including the following figures signal and H signal, will be transmitted through distributor 1900 before the supply of perforated tape 1900 causes contacts 1982 to open as described hereinafter.

When the special multiple address signal M arrives at the control point in the transmitter 1970, it causes contacts 1914 to close momentarily Contacts 1914, in momentarily closing, complete a circuit for the operation of relay 2004 from positive battery through the upper inner operated contacts of relay 2006, operated contacts 1914, to negative battery through the winding of relay 2004. Relay 2004, in operating, completes a circuit for the operation of magnet 1971. Magnet 1971, in operating, prevents tape 1900 from being advanced when the transmitter 1970 completes the revolution then in progress. The operation of relay 2004 interrupts the circuit of the start magnet 1972, thus causing this magnet to release and stop the transmitter 1970. Relay 2004, in operating, completes a circuit for the operation of relay 2157, and relay 2157 in turn completes a circuit for lighting lamp 2155. The operation of relay 2004 also completes a circuit for maintaining itself operated under control of relay 2008 which relay is held operated under control of relays 2019, 2029, 2139 and 2159. Relay 2004, in operating, also interrupts the locking circuit of relay 2006, thus permitting this relay to release.

Figure 22:
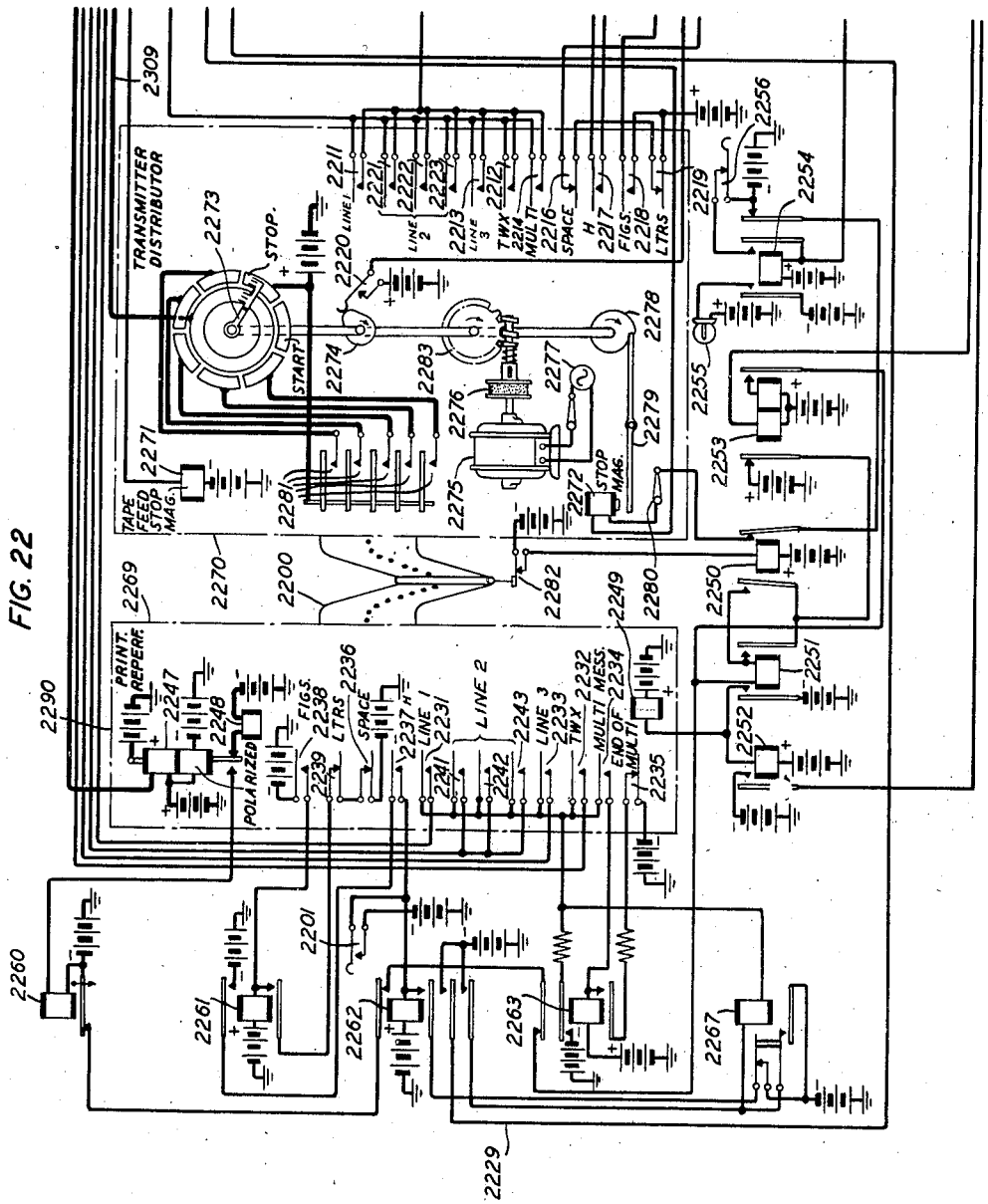
Figure 23:
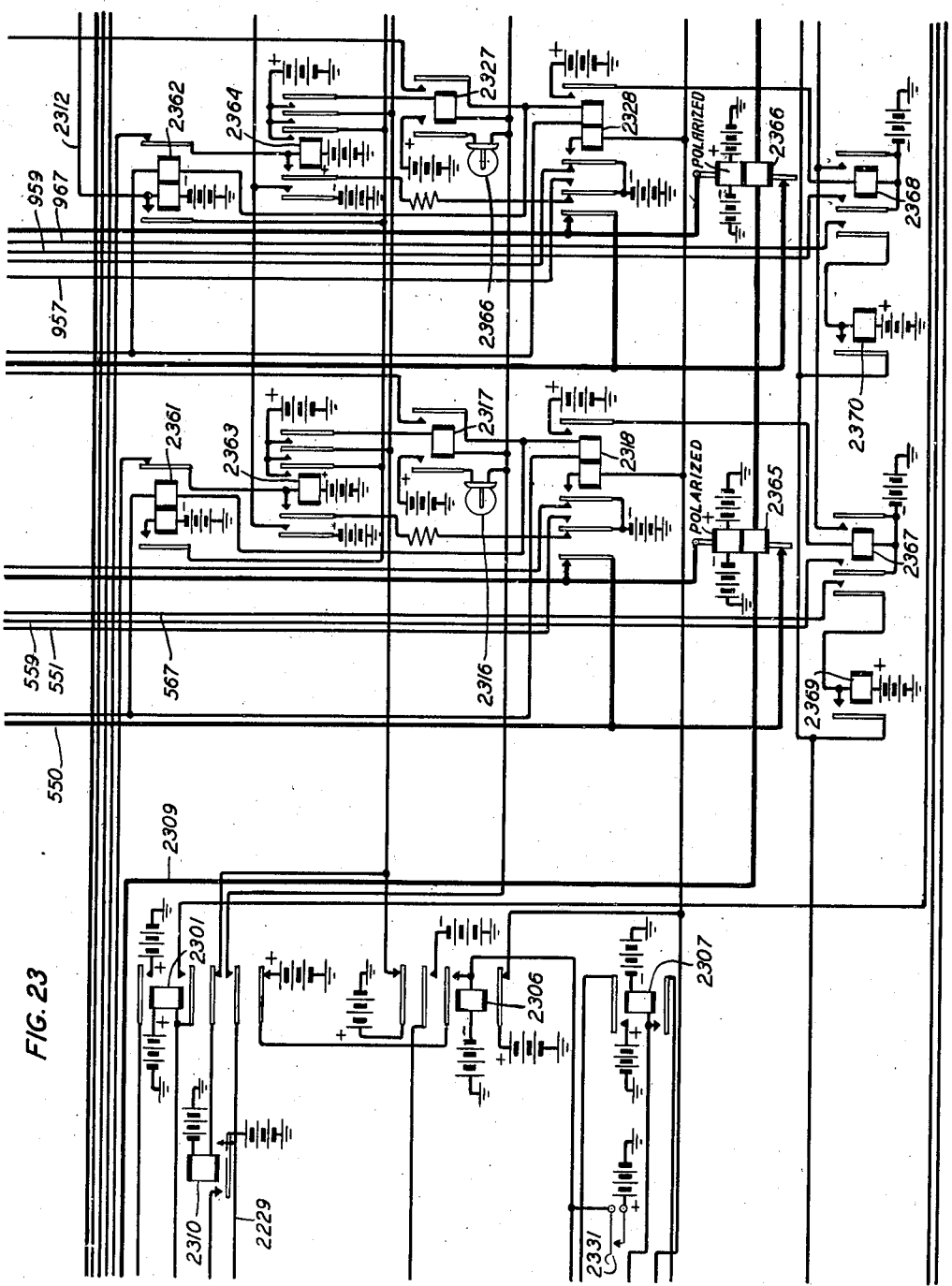

Assuming that the circuits shown in Figs. 22, 23 and 24, which are arranged to transmit messages to more than one station, are idle, the operation of relay 2157 completes a circuit through the right-hand winding of relay 2158 for causing this relay to operate. The operation of relay 2158 completes a circuit for maintaining itself operated under control of contacts 1920 and the upper break contacts of relay 2006. The operation of relay 2158 completes an obvious circuit for the operation of relay 2159.

The operation of relay 2158 extends the transmission circuit of distributor 1970 to the upper winding of the repeating relay 2470. Relay 2470 repeats the signals to the upper winding of relay 2247 and relay 2247 repeats them to the selector magnet 2248.

The operation of relay 2158 completes a circuit for the operation of relay 850 and the operation of relay 850, in turn, causes busy lamp 865 and overflow lamp 866 to light. The operation of relay 850 also removes the operating potential from the operating winding of switching relays 858, 1158, 1458 and 1858, thus preventing these relays from operating and interfering with the transmission of message signals from the transmitter 1970.

Relay 2159, in operating, interrupts the circuit of relay 2008, thus permitting this relay to release and, in turn, release relay 2004. The release of relay 2004 extinguishes lamp 2155 and releases magnet 1971. The release of relay 2004 reestablishes a circuit through the start magnet 1972 and causes this magnet to operate and start the transmission from the transmitter 1970. The release of magnet 1971 permits the transmitter 1970 to feed tape 1900 through it in a normal fashion during the transmission of signals recorded in the tape.

At the end of the previous message transmitted through these circuits, relays 2261 and 2262 were operated by the figures signal and the H signal, that is, the signal which normally represents the letter H or else the operator has operated relay 2262 by the operation of key 2201. Upon receiving the special multiple designation or letter M signal which is the first character transmitted by the distributor 1970, the receiving printing reperforator 2269 will print this signal on tape 2200 and perforate the tape in accordance with it. The selector mechanism of this reperforating apparatus, in addition, will cause contacts 2234 to momentarily close and complete a circuit for the operation of relay 2263 from positive battery, through the winding of relay 2263, contacts 2234, winding of relay 2267 and lower outer operated contacts of relay 2262 to negative battery. Relay 2263, in operating, completes a circuit for maintaining itself operated under control of contacts 2235. Relay 2267 is also operated by current flowing in the above-traced circuit for the operation of relay 2263. Relay 2267, in operating, completes a circuit for maintaining itself operated from negative battery through its lower operated contact and winding, to positive battery through contacts 2234 and the winding of relay 2263. Relay 2267 in operating interrupts the locking circuit of relay 2262, thus permitting this relay to release. It should be noted that relay 2267 closes its locking circuit before it interrupts the locking circuit of relay 2262, thus insuring that relay 2267 will fully operate and cause relay 2263 to also fully operate and lock. When contacts 2234 open after their momentary closure they interrupt the locking circuit of relay 2267 which relay then releases. The operation of relay 2263 also connects negative battery to contacts 2231, 2232, 2233, 2234, 2241, 2242 and 2243.

The following signals perforated in the tape 1900 when transmitted to the printing reperforator 2269 represent the various stations connected to the system. Under the assumed conditions where the message is intended for all of the stations connected to the system each one of the above-enumerated contacts will be closed in succession, each contact being closed by its respective code combination received by the printing reperforator 2269. The letter A will cause contact 2231 to close when it is received by printing reperforator 2269. This completes a circuit for the operation of relay 2363 from positive battery through the winding of relay 2363, right-hand break contact of relay 2361, contacts 2231, to negative battery through the inner upper operated contacts of relay 2263. Relay 2363, in operating, completes a circuit for maintaining itself operated under control of relay 2318 and it also completes a circuit for the operation of relay 2310 which, after a short interval of time, completes a circuit for the operation of start magnet 2272 which starts this transmitter into operation as soon as sufficient tape 2200 is perforated to close contacts 2282. Any letters signals or other signals except the switching signals representing the various stations to which the message is directed are passed through transmitter 2270 without any effect upon any of the circuits. It should be noted that the repeating relays 2365, 2366, 2465 and 2466 all have their contacts short-circuited and the contacts of relay 2474 are disconnected so that they are incapable of repeating any of these extraneous signal combinations. The operation of relay 2363 also completes a circuit for the operation of relay 2475. Relay 2475, in operating, completes a circuit for operating relay 2476, which relay, in turn, completes a circuit for maintaining itself operated under the joint control of the lower break contact of relay 2306 and contacts 2220. Relay 2476 also completes a circuit for maintaining relay 930 operated independently of the operation of relay 2158.

The operation of relay 2475 also partly prepares a circuit for the operation of relay 2471 but this relay does not operate at this time.

Assuming that the second directing signal received by device 2269 is a letter B, it will cause contacts 2233 of the printing reperforator 2269 to momentarily close. The closure of contacts 2233 completes a circuit for the operation of relay 2463. Relay 2463 completes a circuit for maintaining itself operated under control of relay 2438. The letter C when received by reperforator 2269 will cause contacts 2232 to momentarily close and they, in turn, complete a circuit for the operation of relay 2464. This relay locks under control of relay 2448. The addresses D, E and S assumed to be assigned to the stations reached over the trunk 226 to the second switching station, i. e., stations D, E and the second switching station will cause contacts 2241, 2242 and 2243 to close and the closure of any one of these contacts completes a circuit for the operation of relay 2364 which locks operated under control of relay 2328. The succeeding signals representing other stations reached over the trunk 226 cause the other of these contacts to close one after the other. However, since relay 2364 is operated, the closure of the succeeding contacts performs no useful function at this time.

Following the last switching signal combination, as pointed out above, the letter X signal will be transmitted to the receiving reperforator 2269 from the transmitter 1970. This will cause contacts 2235 to momentarily open and interrupt the locking circuit of relay 2263, thus permitting this relay to release. The release of relay 2263 disconnects negative battery from the switching contacts, thus rendering the operation of these contacts ineffective should they be operated by any of the succeeding message signals received by the printing reperforator. The following signals received by the reperforator 2269 will comprise the message and will be recorded in tape 2200.

As described above, the operation of the first one of these relays 2363, 2364, 2463 or 2464 causes the transmitting distributor 2270 to operate and advance the tape through it. As soon as the multiple message switching combination M reaches the control point, this transmitter causes contact 2214 to momentarily close and complete a circuit for the operation of relay 2301 from positive battery through the winding of relay 2301, contacts 2214 and upper operated contacts of relay 2306 to negative battery. It should be noted that relays 2307, 2306 have been previously operated by the figures signal followed by the H signal at the end of the previous message. The intervening letters or spacing signals recorded in the tape between this H signal and the succeeding M signal, as described above, may cause either contacts 2219 or 2216 to be momentarily opened and thus release relay 2307. However, relay 2306 remains operated at this time.

The operation of relay 2301, as described above, completes a circuit for maintaining itself operated under control of the start relay 2478. The operation of relay 2301 also interrupts the locking circuit of relay 2306 which causes this relay to release. It should be noted that the locking contact of relay 2301, which is shown as the inner lower contact, should operate first to insure that relay 2301 will fully operate before releasing relay 2306 and thus interrupt the operating circuit of relay 2301. The operation of relay 2301 also interrupts the circuit of relay 2310 which relay releases and in turn interrupts the circuit of the start magnet 2272, thus permitting this magnet to release and stop the transmitter 2270 at the completion of its cycle of operation then in progress. The operation of relay 2301 also completes an obvious circuit for operating magnet 2271. The operation of this magnet disengages the feed pawl from the feed ratchet and prevents the advance of the tape 2200 by the transmitting distributor 2270 as it nears the completion of its cycle of operation then in progress.

The circuits then remain in this condition during the reception of the remainder of the message by the receiving printing reperforator 2269. At the end of the message the figures signal followed by the H signal will be transmitted to device 2269.

On the transmission of the figures signal by the transmitting distributor 1970, contacts 1918 momentarily close and complete a circuit for the operation of relay 2007. The following H signal recorded in the tape 1900, as described above, causes contacts 1917 to momentarily close and complete a circuit for the operation of relay 2006. Both relays 2007 and 2006, in operating, complete circuits for maintaining themselves operated. The operation of relay 2006 at this time removes positive battery through its upper break contacts from the locking winding of relay 2158. Relay 2158, however, does not immediately release because a locking battery is still connected to it through contacts 1920. At the completion of the revolution or cycle of the transmitting distributor 1970 during which this H signal is transmitted, contacts 1920 will open and interrupt the locking circuit of relay 2158. Relay 2158 will then release and, in turn, release relay 2159. The release of relay 2158 disconnects the transmission circuit from the transmitting distributor 1970 from the repeating relay 2470. The release of relay 2158 removes battery from the left-hand winding terminal of relay 850. Relay 850 does not release at this time, however, because battery is connected to this winding through the left-hand operated contacts of relay 2476. The figures signal, when received by the printing reperforator 2269, will cause contacts 2238 to momentarily close and operate relay 2261. Relay 2261, in operating, locks operated under control of contacts 2239 and 2236. The following H signal causes contacts 2237 to momentarily close and complete a circuit for the operation of relay 2262 from negative battery through the upper operated contacts of relay 2261, operated contacts 2237, to positive battery through the winding of relay 2262.

The operation of relay 2262 completes a circuit for operating relays 2317, 2327, 2437 and 2447 from negative battery through the middle set of lower operated contacts of relay 2262, over lead 2229, through lower operated make contact of relay 2301, through the windings of the respective relays and operated contacts of the respective switching relays 2363, 2364, 2463 and 2464 to positive battery.

Assuming now that only the trunk line 226 is idle at this time and that all of the other lines are busy so that the busy relays 710, 830 and 840 as well as 850 are operated, the respective busy lamps 761, 863 and 864 are lighted at this time, indicating that these other lines are busy, but that the busy relay 720 is not operated and busy lamp 762 is not operated.

Under these conditions the operation of relay 2327 completes circuits for the operation of relays 2328 and 2362 in parallel from negative battery through the outermost left-hand break contacts of relay 720 and the right-hand windings of relays 2328 and 2362 in parallel, contacts of relay 2327 to positive battery, through the break contacts of relays 2027, 1727, 1327, and 727. Relay 2328, in operating, interrupts the locking circuit of relay 2364, thus permitting this relay to release, release relay 2327, and extinguish lamp 2326.

The release of relay 2364 removes positive battery connected through its right-hand inner operated contacts to the lead extending to the winding of relay 2475 but since this lead has battery connected to it through the right-hand inner contacts of the other relays 2363, 2463 and 2464, the release of relay 2364 performs no further useful function at this time.

The operation of relay 2328 completes a circuit from negative battery through its left-hand inner contacts and left-hand winding, and the lower break contacts of relay 2306 to positive battery for maintaining itself operated. Positive battery is also applied to the lower terminal of the left-hand winding of relay 2328 through the cam control contacts 2229, when the transmitting distributor 2270 is out of its stop position. The operation of relay 2328 completes an obvious circuit for operating relay 2368, and also a circuit for operating relay 720. The operation of relay 720 lights the busy lamp 762 and interrupts the operating circuit of the other switching relays 728, 1328, 1728 and 2028, thus preventing the connection of any other distributor to the trunk extending to the second switching station.

The operation of relay 2368 also completes a circuit for the operation of relay 965 in a circuit from positive battery through winding of relay 965 and lead 959 which extends from Fig. 9 through Figs. 10, 13, 17, 20 and 23 to the negative battery through the inner left-hand operated contacts of relay 2368.

The operation of relay 965 completes a circuit for maintaining itself operated under control of contacts 991 of the receiving teletypewriter 990. The operation of relay 965 also disables the printing reperforator 969 and prevents it from following any signals transmitted over the trunk 226 extending to the second switching station and permits teletypewriter 990 to respond to and record the signals transmitted over the trunk 226.

The operation of relay 2328 removes the short circuit around the contacts of repeating relay 2366 so that this relay may repeat the signaling impulses transmitted by the transmitting distributor 2270 over line 226 to the second switching station.

Relay 2362 in operating completes a circuit from negative battery through its left-hand winding and left-hand operated contacts to positive battery through the right-hand inner operated contacts of relays 2363, 2463 and 2464, for maintaining itself operated under the joint control of these relays. Relay 2362 in operating also interrupts the operating circuit of relay 2364.

The operation of relay 2368 completes a circuit for the operation of relay 2481. The operation of relay 2481 completes a circuit for the operation of relay 2480. Relay 2480 is a slow operating relay so it does not immediately operate. Relay 2480 is sufficiently slow in operating to provide time for the operation of relays 2478 and 2471 and the release of relay 2301 as will be described hereinafter.

The operation of relay 2481 completes a circuit for the operation of relay 2478 from negative battery through the winding of relay 2478 to positive battery through the break contacts of relay 2480 and the operated contacts of relay 2481. The operation of relay 2478 completes a circuit for the operation of relay 2471 from positive battery through the left-hand operated contacts of relay 2475, the left-hand winding of relay 2471, the upper operated contacts of relay 2478 to negative battery. The operation of relay 2471 completes a circuit for maintaining itself operated from positive battery through contacts 2220 and the bottom contacts of relay 2306 in parallel, the right-hand operated contacts and right-hand winding of relay 2471 to negative battery through the left-hand operated contacts of relays 2363, 2364, 2463 and 2464.

Relay 2471, in operating, also connects the contacts of the repeating relay 2474 to the transmission circuit extending through the upper winding of the receiving relay 2247 of the printing reperforator 2269. The operation of relay 2478 interrupts the locking circuit of relay 2301 and permits this relay to release. The release of relay 2301 interrupts the circuit through magnet 2271 which permits the tape 2200 to be advanced through the transmitter 2270 in the normal manner during the operation of the transmitting distributor 2270. A short interval of time after relay 2471 has operated and relay 2301 released relay 2480 will operate and interrupt the operating circuit of relay 2478 which relay then releases. The release of relay 2478 at this time merely prepares a locking circuit for relay 2301 when it is again operated. The release of relay 2478 also permits the release of relay 2471 at a later time when its locking circuit is interrupted. The release of relay 2301 interrupts the negative battery connected to the windings of switching relays 2317, 2437 and 2447. The release of these switching relays prevents the connection of any other lines to this special repeating circuit until the entire message is transmitted over line 226, as will be described hereinafter. It is to be noted that relay 2475 does not release at this time because it is held operated due to the fact that relays 2363, 2463 and 2464 are locked operated at this time.

The release of relay 2301 completes a circuit for the operation of relay 2310. Relay 2310 is sufficiently slow in operating to allow time to insure complete operation of the various switching relays before starting transmission. The operation of relay 2310 after this short interval of time completes a circuit for the start magnet 2272 from positive battery through its make contact, winding of start magnet 2272, switch 2280, right-hand operated contacts of relay 2250, to negative battery through the right-hand outer break contacts of relay 2254. The first signal transmitted by the transmitting distributor 2270 will then be the special multiple switching signal which has been assumed to be the letter M. This signal is transmitted over lead 2309 through the operating windings of the repeating relays 2365, 2366, 2465, 2466 and 2474. All of these relays follow the signals transmitted by the transmitting distributor 2270. However, the contacts of relays 2365, 2465 and 2466 are short-circuited by contacts of the respective relays 2318, 2438 and 2448. Relay 2366 repeats the signals over the trunk 226 while relay 2474 repeats the signals back to the line relay 2247 of the reperforator 2269. When the M signal is again received the line relay 2247 repeats it to the selector magnet 2248. This causes the M signal to be printed upon tape 2200 and perforated in this tape a second time. It also causes contacts 2234 to again close and operate relay 2263. It will be remembered that relays 2261 and 2262 had been previously operated and locked operated by the figures signal followed by the H signal received at the end of the message already recorded in tape 2200 which is now being transmitted by the transmitting distributor 2270. The circuit for the operation of relay 2263 is the same as described above when this relay operated the first time the letter M signal was received and extends from negative battery through the lower outer operated contacts of relay 2262, winding of relay 2267, operated contacts 2234, to the positive battery through the winding of relay 2263. Relay 2263, in operating, completes a circuit for maintaining itself operated under control of contacts 2235. Relay 2267 also operates in series with relay 2263 in the above-described circuit and locks operated after which it interrupts the locking circuit of relay 2262 and permits this relay to release. The first subsequent letters signal or spacing signal received by the printing reperforator 2269 causes contacts 2239 or 2236 to open momentarily and release relay 2261.

Thereafter the following switching signals, together with the message as first stored in tape 2200, will be transmitted by the transmitting distributor 2270 and repeated by relay 2366 over line 226. These signals are also repeated by relay 2474 back to the printing reperforator 2269 where they are again recorded in tape 2200 so that they will be available for transmission to the other stations to which the message is intended. As the switching signal combinations are again recorded by the printing reperforator 2269 they will cause their respective contacts to again close. Thus, when the letter A is recorded, it will cause contacts 2231 to close. This will again complete a circuit for the operation of relay 2363. However, inasmuch as this relay is already locked operated, the operation of contacts 2231 at this time performs no useful function. The same is true of the operation of contacts 2232 and 2233 in response to the reception and the recording of the characters B and C, respectively. When the switching characters designating stations D, E and S are received by the printing reperforator 2269 and are recorded in tape 2200 by it, the respective contacts 2241, 2242 and 2243 are closed in sequence. It will be recalled that the first one of these contacts to operate, when the message was first recorded by the printing reperforator 2269, completed a circuit for the operation of relay 2364 and that the operation of the other contacts thereafter produced no useful effect. In this case, however, relay 2362 is operated as described above, so that the operating circuit of relay 2364 is interrupted, consequently the operation of these contacts 2241, 2242 and 2243 is ineffective to operate relay 2364 at this time. Consequently, relay 2364 remains released at this time.

*Transmission to second switching station*

Upon arrival at the second switching station, the special multiple switching signal M, when received by the typing reperforator 222, will condition the circuit at the second switching station to respond to the following switching signals designating stations D and E and also the signal S designating the second switching station. Reception of all of the switching signals followed by the letter X signal, indicating the end of the switching signals, will condition the circuits of the second switching station so that the typing reperforator 222 and also the receiving machine 221 will respond to the following message transmitted over the trunk 226. The copy recorded on the receiving teletypewriter 221 will be the copy intended for the second switching station designated by the letter S under the assumed circumstances.

The message will also be recorded in tape 223 by the typing reperforator 222. The tape 223 then passes through the transmitting distributor 224. When the special multiple switching signal arrives at the control point at this transmitter, it will operate certain of the selecting relays 225 which direct the message to the typing reperforator 272 of the multiple transmission or repeating circuit. After the message is recorded in this typing reperforator, the connection between it and the transmitting distributor 224 will be interrupted and leave the transmitting distributor available for transmission of messages to other stations.

After the message has been recorded by the typing reperforator 272 in the tape 273, this tape will pass through the transmitting distributor 274. When the special multiple switching signal arrives at the control point of the transmitter 274, it will cause the selecting relays 275 to connect the transmitter 274 to lines extending to the desired stations, whereupon the message will be transmitted to these stations. In case certain of the lines are busy, they will not be connected to the transmitter 274 at this time. Instead, the message will be repeated back to the reperforator 272 for storage again in tape 273 so that it will be available for transmission to these lines when they become idle.

The operation of the equipment at the second switching station under these conditions is substantially the same as the operation of the switching equipment at the first switching station under similar circumstances, as will be described in detail hereinafter. Each of the respective receiving and transmitting devices, as well as the switching and selecting circuits, all respond to the various switching information in a similar manner, the only difference being that at one station the message may be routed to an individual line whereas at another station it may be routed to a trunk extending to another station and then routed to its individual line, all in response to the same switching signal. For example, the letters D and E at the first switching station routed the message to the trunk 226, whereas in the second switching station these switching characters D and E will route the message to the respective stations D and E and not to trunk 226. Similarly, if the message had been originally received at the second switching station shown in Fig. 2, the switching designations A and B would route the message to trunk 226, whereas at the first switching station they will route the messages to the respective stations A and B.

As pointed out above the transmission of the message proceeds from the transmitter 2270 both to the distant switching station shown in Fig. 2 and to the typing reperforator 2269. At any time during this transmission the operator at the second switching station shown in Fig. 2 may interrupt the transmission from the transmitting distributor 2270 by transmitting a long spacing or break signal back over the channel 226 by the operation of the key at the second switching station which corresponds to key 989 at the first switching station. If this signal exceeds the length of two code combinations, the receiving teletypewriter 990 connected in series with line 226 extending to the second switching station will cause contacts 995 to be operated. The manner in which these contacts are operated by the receiving teletypewriter 990 in response to a spacing or break signal which exceeds in length the time required to transmit two code combinations is clearly described in the above-identified patents to Morton et al. with reference to the send-receive-break mechanisms and switch disclosed therein. The operation of the switch 995 removes the short circuit from the transmitting contacts 994, completes a circuit for lighting lamp 996 to indicate to the operator that the distant operator has transmitted a break signal and wishes to communicate with the operator at the first switching station. The operation of the switch 995 also completes a circuit for the operation of relay 2370 from negative battery through the lower operated contacts of switch 995, lead 967 which extends through Figs. 9, 10, 13, 17, 20 and 23 through the left-hand outer operated contacts of relay 2368 to battery through the winding of relay 2370. The operation of relay 2370 extends the circuit of lead 967 through the left-hand outer operated contacts of relay 2368, left-hand operated contacts of relay 2370 to positive battery through the winding of relay 2254. Relay 2254 is operated by current flowing in this circuit and completes a circuit for maintaining itself operated from negative battery through the contacts of key 2256, right-hand inner operated contacts of relay 2254, through the winding of relay 2254 to positive battery.

The operation of relay 2254 also interrupts the circuit through the start magnet 2272, thus permitting this magnet to release and stop the transmitting distributor 2270 at the end of the code combination then in progress of transmission. The operation of relay 2254 also completes an obvious circuit for lighting lamp 2255 to indicate to the operator at the switching station that the transmitter 2270 has been the one transmitting to the distant central office. The operator at the first switching station may then communicate with the operator at the second switching station by operating the keyboard or transmitter of teletypewriter 990 to determine what additional service is required or what the trouble may be. Thereafter the operator at the first switching station may manually restore switch 995 to the position shown in Fig. 9. The operator may then operate key 2256 momentarily which interrupts the locking circuits of relays 2254 and 2370 and also the circuit of lamp 996, thus permitting these relays to release and lamp 996 to be extinguished. The release of relay 2254 also reestablishes the circuit through the start switch 2272, thus restarting the transmitting distributor 2270, whereupon this transmitter will complete the transmission of the message back to itself and also to the second switching station over trunk 226.

*Retransmission of the message to other stations*

After the message which was originally stored in tape 2200 has been fully transmitted by the transmitting distributor 2270 to the distant switching station and also recorded again in tape 2200 by the printing reperforator 2269, the figures signal followed by the H signal recorded in tape 2200 following the first recording of the message in tape 2200 will be transmitted by the transmitting distributor 2270. When the figures signal is transmitted by the transmitting distributor 2270 it causes contacts 2218 to momentarily close and complete a circuit for the operation of relay 2307. Relay 2307 locks operated under control of contacts 2216 and 2219. Then, when the H signal is transmitted by the transmitting distributor 2270, this transmitter will close contacts 2217 and complete a circuit for the operation of relay 2306 from positive battery through the upper operated contacts of relay 2307, operated contacts 2217, to negative battery through the winding of relay 2306. Relay 2306, in operating, completes a circuit for maintaining itself operated from negative battery through its winding and inner upper contacts of relay 2306 to positive battery through the lower outer break contacts of relay 2301.

The operation of relay 2306 removes positive battery from the locking circuit of relays 2328, 2471 and 2476. None of these relays releases at this time. Relays 2328 and 2471 do not release because negative battery is still connected to their locking circuits by contacts 2220. When the H code combination is completely transmitted contacts 2220 will open and interrupt the locking circuits of relays 2328 and 2471 and permit these relays to release. Relay 2476 does not release at this time because its operating circuit is maintained closed by relay 2475 which also remains operated at this time as pointed out above.

Relay 2328 in releasing releases relay 2368. Relay 2328, in releasing, short-circuits the contacts of repeating relay 2366, thus preventing this relay from repeating any further signals over trunk 226. It should be noted, however, that both the figures signal and the H signal are transmitted over trunk 226 before relay 2328 is released because relay 2328 is not released until negative battery is disconnected from the lower winding terminal of the left-hand winding of relay 2328 by contacts 2220 opening after the letters H signal has been completely transmitted by the transmitting distributor 2270. The release of relay 2328 interrupts the operating circuit of relay 720 which releases and in turn extinguishes the busy lamp 762 and prepares operating circuits for the other switching relays enabling other transmitters to be connected to the trunk 226 extending to the second switching station. The release of relay 2471 disconnects the contacts of repeating relay 2474 from the winding of relay 2247.

When the figures signal followed by the H signal is received by teletypewriter 990 which, it will be remembered, follows the signals transmitted over trunk 226 during this time, contacts 991 will open for a short interval of time after the completion of the reception of the H signal. This interrupts the locking circuit of relay 965 and allows this relay to release, its operating circuit having been previously interrupted by the release of relay 2368. The release of relay 965 disables the receiving teletypewriter 990 and removes the disabling condition applied to the printing reperforator 969, thus allowing this reperforator to respond to signals received over line 226. All of the circuits associated with the line 226 have now been returned to their normal condition and are now available for the transmission of other messages between the two switching stations.

When the figures signal followed by the H signal was transmitted by the transmitting distributor 2270 following the first transmission of the message by distributor 2270, they were relayed to the printing reperforator 2269 and again recorded in tape 2200. When this figures signal is received by the printing reperforator 2269 it will cause the contacts 2238 to momentarily close and complete a circuit for the operation of relay 2261. Relay 2261, in operating, completes a circuit for maintaining itself operated under control of contacts 2239 and 2236. When the H signal is received, it will cause relay 2262 to operate in a circuit from negative battery through the upper operated contacts of relay 2261, operated contacts 2237 to positive battery through the winding of relay 2262. The operation of relay 2262 at this time completes a circuit for maintaining itself operated under control of the break contacts of relay 2267.

The special multiple message switch signal combination, that is, the letter M signal, will be perforated in tape 2200 a second time with the second recording of the message in tape 2200 immediately following the figures signal and succeeding H signal following the first recording of the message in tape 2200. When this second M signal reaches the control point in the transmitting distributor 2270, it will cause contacts 2214 to momentarily close and complete a circuit for the operation of relay 2301. The operation of relay 2301 completes a circuit for maintaining itself operated under control of the start relay 2478. The operation of relay 2301 interrupts the locking circuit of relay 2306, thus permitting this relay to release and render the further operation of contacts 2221, 2222, 2223, 2211, 2212, 2213, and 2214 ineffective. The operation of relay 2301 also interrupts the circuit of relay 2310 which relay releases and in turn interrupts the circuit of start magnet 2272 and thus stops the transmitting distributor 2270 at the end of the cycle or revolution then in progress. It should be noted that this M signal, transmitted by the distributor at this time, is not transmitted over any of the circuits to any distant line or station because they are not connected to the transmitter at this time.

The operation of relay 2301 also completes a circuit for operating magnet 2271, thus preventing tape 2200 from being advanced near the end of the revolution of the transmitting distributor 2270 then in progress during which the letter M signal was at the control point of the transmitter 2270. The operation of relay 2301 also reestablishes the circuit for reoperating relays 2317, 2437 and 2447 from negative battery through the middle set of lower operated contacts of relay 2262 over lead 2229 through the second set of contacts from the bottom of relay 2301 through the windings of relay 2317, 2437 and 2447 in parallel to positive battery through the right-hand outer operated contacts of the respective marking relays 2363, 2463 and 2464. Operation of relays 2317, 2437 or 2447 completes circuits for the operation of the corresponding switching relays 2318, 2438 and 2448 through the break contacts of the corresponding busy relays and other switching relays controlling these lines to positive and negative battery if these relays are released.

It should be noted that since relay 2364 is released at this time relay 2327 will not be operated.

It will now be assumed that the lines extending to stations A and B are idle and that the equipment associated with the line extending to station C is also idle. Under these conditions all the other switching relays associated with these idle lines will be in their normal condition, so relays 2317, 2437 and 2447 will operate when relay 2301 operates. When relay 2317 is operated it completes a circuit for the operation of relays 2318 and 2361. Relay 2318, in turn, completes a circuit for the operation of relay 2367. Relay 2318 completes a circuit for the operation of relay 710, which relay lights busy lamp 761 and removes the operating potential applied to the operating windings of the other switching relays 1018, 1318, 1718 and 2018. The operation of relay 2318 also completes a circuit for maintaining itself operated under control of the lower break contact of relay 2306 and contacts 2220 controlled by cam 2274. Relay 2318, in operating, also removes the short circuit from the contacts of the repeating relay 2365, thus permitting this relay to transmit signaling impulses over loop 589. The operation of relay 2367 connects negative battery to lead 559 which extends through Figs. 23, 20, 17, 13, 10, 7, 6 and 5 to the winding of relay 565. Relay 565 operates in this circuit and conditions the teletypewriter 590 to respond to and record the signals transmitted over loop 589 at this time. Relay 565, in operating, completes a circuit for maintaining itself operated under control of contacts 591. The operation of relay 565 also connects positive battery to the left-hand winding terminal of the selector magnet 548 and prevents the operation of magnet 548, the printing and perforating mechanism, and the contacts in response to any of the signals transmitted over the the loop 589.

The operation of relay 2318 also interrupts the locking circuit of relay 2363, thus permitting this relay and relay 2317 to release and extinguish lamp 2316. The operation of relay 2361 interrupts the operating circuit of relay 2363, thus preventing this relay from reoperating at this time. The operation of relay 2361 also completes a circuit for maintaining itself operated under control of relays 2363, 2364, 2463 and 2464.

In a similar manner the operation of relay 2437 completes a circuit for the operation of relays 2438 and 2461. Relay 2438, in turn, causes the operation of relays 2467, 830 and 1265. These relays condition the equipment associated with the loop 1289 extending to station B in the same manner that the equipment associated with the loop extending to station A was conditioned by the operation of the corresponding relays associated therewith. In addition, the operation of relay 2438 removes the short circuit from around the transmitting or repeating contact of relay 2465, thus allowing this relay to repeat signals to station B over loop 1289. The operation of relay 2438 also interrupts the locking circuit of relay 2463, thus permitting this relay and relay 2437 to release and extinguish lamp 2436.

The operation of relay 2447 likewise completes circuits for the operation of relays 2448 and 2462. Relay 2462, in turn, completes a circuit for maintaining itself operated under control of relays 2464, 2463, 2364 and 2363. Relay 2462 also interrupts the operating circuit of relay 2464. The operation of relay 2448 causes the operation of relays 2468 and 840, which relays condition equipment associated with the lines extending to station C to transmit the messages intended for that station.

The operation of relay 2448 also interrupts the locking circuit of relay 2464 and thus permits this relay and relay 2447 to release and extinguish lamp 2446.

It has been assumed that relay 2447 operated last. In case one of the other relays 2317 or 2437 operates last, the operation of the circuits up to this point would be the same. Whichever one of these relays operates last will cause the operation of the respective relay 2318, 2438 or 2448, which relay will cause the release of the respective relays 2363, 2463 or 2464. Whichever one of these relays releases last will remove negative battery from the locking circuit of relay 2471 and will also remove the positive battery connected to the operating circuit of relay 2475, thus permitting this relay to release. The release of relay 2475 interrupts the operating circuits of relays 2471 and 2476. However, relay 2476 does not release at this time.

Whichever of the relays 2363, 2463 or 2464 releases last will also remove positive battery from the locking windings of relays 2361, 2362, 2461, 2462 and allow these relays to release.

If the lines are idle, relays 2367, 2467 and 2468 will normally operate at about the same time and whichever one operates first will complete a circuit for the operation of relay 2481. The operation of relay 2481 completes a circuit for the operation of relay 2478 which relay in turn interrupts the locking circuit of relay 2301 and permits this relay to release. The operation of relay 2478 at this time does not cause the operation of relay 2471 because relay 2475 is released. Under these conditions, when the message is again transmitted by the transmitting distributor 2270 it will not be repeated back to the printing reperforator 2269 because it is no longer necessary to transmit the message to any other stations.

The release of relay 2301 interrupts the operating circuit of magnet 2271 and permits this magnet to release. Consequently, when the transmitter 2270 is started into operation, tape 2200 will feed through the transmitter in the normal manner.

The release of relay 2301 completes a circuit for the operation of relay 2310 which in turn closes an operating circuit for start magnet 2272 from negative battery through the right-hand outer break contacts of relay 2254, right-hand operated contacts of relay 2250, switch 2280, winding of the start magnet 2272 to positive battery through the make contacts of relay 2310. When the transmitter 2270 starts, the first character transmitted will be the special switching signal, designating a message directed to a plurality of stations, that is, the letter M. Following the letter M each of the switching combinations will be transmitted and they will operate their respective contacts 2211, 2212, 2213, 2214, 2221, 2222 and 2223 in sequence as these characters are transmitted. The operation of these contacts at this time, however, does not perform any useful function because relay 2306 is released. Following the transmission of these switching combinations and the letter X, indicating the end of the switching combinations, the regular message will be transmitted again by the distributor 2270 as recorded in the tape 2200 the second time. Relays 2365, 2366, 2465, 2466 and 2474 all follow the signals transmitted by the transmitter 2270. The transmitting contacts of relay 2366 are short-circuited by the left-hand outer break contacts of relay 2328 and the contacts of relay 2474 are disconnected at the released contacts of relay 2471. Consequently, the operation of these two relays at this time does not repeat the signals to any line or circuit. The operation of relays 2365, 2465 and 2466, however, repeat the signals received by them over the respective lines 589, 1289 and lead 1540. The signals are also repeated to the receiving teletypewriters 590, 1290 and 1569. Thus, the message is transmitted to each of these stations for which it is intended, in the normal manner of transmitting messages to them.

Near the end of the transmission of the message the final time the supply of perforated tape 2200 will be sufficiently reduced to cause contacts 2282 to open and interrupt the operating circuit of relay 2250 which causes this relay to release. The release of relay 2250 interrupts the circuit of magnet 2272 causing this magnet to release and stop the transmitter 2270. The release of relay 2250 at this time completes a circuit for the operation of relay 2251 from positive battery through the left-hand break contacts of relays 2253 and 2250, the winding of relay 2251, the upper break contacts of relay 2263, the upper operated contacts of relay 2262, to negative battery through the break contacts of relay 2260. Relay 2251 in operating completes a circuit for maintaining itself operated under control of relays 2253, 2263, 2262 and 2260. Relay 2251 in operating also completes circuits for the operation of relay 2252 and magnet 2249. The operation of magnet 2249 causes the perforating apparatus 2269 to automatically perforate an additional supply of tape 2200 preferably with letters signals. Relay 2252 is sufficiently slow in operating to allow the reperforator 2269 to automatically perforate sufficient tape to insure that the entire message will be transmitted by the transmitter. After the lapse of such a minimum time interval, relay 2252 will operate and complete a circuit for lighting lamp 2472. The operator, upon noting the lighted lamp 2472, will momentarily operate key 2473 which completes a circuit for the operation of relay 2253. Relay 2253 in operating completes a locking circuit for maintaining itself operated under control of relays 2263, 2262 and 2260. The operation of relay 2253 interrupts the operating circuit of relay 2251 which relay then releases. The release of relay 2251 in turn causes the release of magnet 2249 and relay 2252. The release of magnet 2249 stops the automatic perforation of the tape by device 2269. The release of relay 2252 extinguishes lamp 2472.

The additional supply of tape automatically perforated by device 2269 causes contacts 2282 to reclose and, in turn, reoperate relay 2250. The reoperation of relay 2250 again completes the circuit of magnet 2272 which reoperates and starts transmitter 2270.

At the completion of the transmission of the message, the figures signal followed by the H signal will be transmitted from transmitting distributor 2270. When the figures signal is transmitted it causes relay 2307 to operate and to lock operated, as described above, and when the H signal is transmitted it causes contacts 2217 to operate and in turn operate relay 2306. The operation of relay 2306 interrupts the circuit of relay 2310 which relay in turn interrupts the circuit of the start magnet 2272, thus permitting this magnet to release and stop the transmitting distributor 2270 after the H signal has been completely transmitted. The operation of relay 2306 removes negative battery through its lower break contacts from the locking windings of relays 2318, 2438, 2448 and 2476. These relays do not release at this time, however, because negative battery is still connected to their locking windings through the cam controlled contacts 2220. After the H signal has been completely transmitted by the transmitting distributor, cam 2274 causes contacts 2220 to open and disconnect negative battery from the locking windings of these relays, thus permitting them to release. The release of relay 2476 at this time interrupts the operating circuit of the busy relay 850 and permits this relay to release and extinguish lamps 865 and 866.

The release of relay 2318 short-circuits the contacts of the repeating relay 2365, thus preventing the transmission of any further signals by this relay over loop 589. The release of relay 2318 also interrupts the operating circuit of relay 2367. The release of relay 2318 causes relay 710 to release. The release of relay 710 extinguishes the busy lamp 751 and connects negative battery to the operating windings of the other switching relays, thus permitting them to operate and connect other transmitters to this line. The release of relay 2318 also interrupts the operating circuit of relay 565. This relay does not immediately release at this time, however, because it is held operated under control of contacts 591.

However, a very short interval of time after the letter H signal, which was preceded by the figures signal, has been received by the teletypewriter 590, contacts 591 will open and interrupt the locking circuit of relay 565. The release of relay 565 at this time returns the circuits of the teletypewriter 590 and the printing reperforator 569 to their normal condition so that they will be ready to receive messages transmitted from station A should the operator at this station desire to transmit a message at this time.

The release of relays 2438 and 2443 similarly causes the release of the corresponding relays associated with the other lines to stations B and C and permits them to return to normal and in condition for the transmission of other messages between these stations and the central switching station.

The transmitter 2270 may be considered a source of signals controlled by tape 2200. The apparatus shown in Figs. 7, 8, 10, 11, 13, 14, 17, 18, 20, 21, 23 and 24 may be considered automatic switching apparatus for selecting any one of a plurality of stations to which the transmitter 2270 will supply signals and the automatic switching apparatus is controlled as to its switching function by code combinations as they are stored in the tape supplying the transmitter 2270. The stations A and B are typical of stations any one or more of which are selected by the automatic switching apparatus just referred to and to which the signals from the source 2270 are transmitted when the respective stations to which the signals are to be transmitted are idle.

Each of the central offices outlined in Figs. 2 and 3 are to be understood as containing a transmitter such as 2270 identified in Fig. 2 as transmitter 274 and in Fig. 3 as transmitter 374.

*Reception of a message intended for a plurality of stations from another switching station*

Assume now that one of the stations, say E, at the second switching station desires to transmit a message to some of the stations connected to this second switching station as, for example, station D, and also to the first switching station and stations A and B connected to the first switching station. The attendant or operator at station E will first transmit the special multiple switching signal M following the figures signal and the H signal at the end of the previous message. Following the M signal, the operator at station E will transmit the various switching characters in any desired order. These should include the letter D, the letter A, the letter B and the letter R which designates the first switching station. Following the letter R, the operator will transmit the multiple message signal X. Following this, the operator will transmit the message intended for all of these stations.

The equipment at the second switching station shown in Fig. 2 will operate under these circumstances, as described above with reference to transmission of a multiple message from the first switching station. The message will be transmitted from station E to the second switching station and there recorded by the printing reperforator 232 in tape 233. Tape 233 controls the transmitting distributor 234 which in turn controls the selecting or control relays 235 which direct the message automatically to the printing reperforator 272 of the multiple transmission circuit. Reperforator 272 perforates tape in accordance with the message, which tape in turn controls the transmitter 274 and transmitter 274 controls the selecting relays 275 for directing the message automatically to the desired lines after which the transmitter 274 will transmit the message to the selected lines and stations. Under the assumed conditions, the switching designations R, A and B will cause the transmitter 274 to transmit the message over trunk 226 extending to the first switching station. As pointed out above, the entire message including the special multiple transmission switching combination M followed by each of the other switching combinations will be transmitted only once over the trunk 226 to the first switching station. After the directing signals are transmitted, the end of the multiple message signal X will be transmitted following which the message is transmitted, and after the message the figures and H signals.

The printing reperforator 969 responds to all of these signals transmitted from the second switching station and causes them to be recorded in tape 900. When the M signal is received by the selector magnet 948, it causes contacts 934 to momentarily close and complete a circuit for the operation of relay 963 from positive battery through the lower winding of relay 963, operated contacts 934, to negative battery through the lower outer operated contacts of relay 962. It will be recalled that upon the reception of the figures signal followed by the H signal, following the reception of the preceding message from line 226, relays 961 and 962 were operated and locked operated. The operation of relay 963 completes a circuit for maintaining itself operated from negative battery through its lower outer operated contacts, the upper inner break contacts of relay 964 to positive battery through the lower inner operated contacts of relay 963 and winding of relay 963. Relay 963 in operating also partly prepares a second locking circuit for maintaining itself operated and then interrupts the locking circuit of relay 962 thus causing this relay to release. The release of relay 962 completes the second locking circuit for maintaining relay 963 operated from positive battery through the upper winding of relay 963, upper operated contacts of relay 963, and the lower break contacts of relay 962. Relay 963 in operating also completes a circuit for connecting negative battery through the upper outer break contacts of relay 964 and the upper inner operated contacts of relay 963 to contacts 930, 934, 935 and 940.

The release of relay 962 applies negative battery to lead 957. This battery merely supplies a circuit path in addition to the path through the lower operated contact of relay 960 and lower break contact of relay 965 to this lead to insure that the circuit for the operation of relay 720 is maintained, thus preventing the connection of any other transmitters to this line. It should be noted that upon the reception of the first spacing signal at the beginning of the message, that is, at the beginning of the reception of the letter M signal, relay 960 is operated from the spacing contact of relay 947. The operation of relay 960 at this time immediately completes a circuit for the operation of relay 720, thus preventing connection of any other transmitter to this circuit as soon as the transmission over line 226 is started.

The reception of the A and B switching signals, which directs the message to stations A and B respectively, causes contacts 941 and 942 respectively of the printing reperforator 969 to be momentarily opened. However, inasmuch as relay 962 was previously released by the operation of relay 963, operation of these contacts at this time causes no further operation of the circuits. When the R switching signal is received it causes contacts 940 to be momentarily operated. The operation of these contacts completes a circuit for the operation of relay 965 from negative battery through the upper outer break contacts of relay 964, the inner upper operated contacts of relay 963, the operated contacts 940 to positive battery through the winding of relay 965. Relay 965 in operating completes a circuit for maintaining itself operated under control of contacts 991 of the receiving teletypewriter 990.

The operation of relay 965 removes the positive battery connected to the upper winding terminal of selector or printer magnet 993 and thus permits this magnet to follow the signals repeated by the line relay 992 and cause the teletypewriter 990 to record the message received over line 226. The message recorded by this teletypewriter will be the copy of the message intended for and received by the first switching station. The operation of relay 965 at this time, however, does not complete a circuit from positive battery to the left-hand winding terminal of selector magnet 948 because relay 963 is operated. Under the conditions assumed, both the receiving teletypewriter 990 and the printing reperforator 969 will respond to the signals received over line 226, thus permitting a copy to be recorded at the first switching station and the message to be recorded in tape 900 for transmission to stations A and B.

Following the transmission of all the switching signals, the letter X signal will be received, which causes contacts 935 to operate and complete a circuit for the operation of relay 964 from positive battery through the winding of relay 964, operated contacts 935, to negative battery through the lower outer operated contacts of relay 963. Relay 964 in operating completes a circuit for maintaining itself operated under control of the lower outer operated contacts of relay 963. Relay 964 in operating also interrupts the locking circuit through the lower winding of relay 963. Relay 963, however, does not release at this time because a circuit was completed for maintaining it operated when relay 962 released, from positive battery through the upper winding and upper inner operated contacts of relay 963 to negative battery through the lower outer break contacts of relay 962.

The operation of relay 964 interrupts the battery connected to contacts 930, 934, 935 and 940, thus rendering the further operation of these contacts ineffective to alter the switching circuits during the reception of the message. The circuits of the receiving teletypewriter 990 and the printing reperforator 969 remain in this condition during the reception of the message over line 226. It should be noted that the circuit through the winding of relay 951 is interrupted at the lower inner front contacts of relay 962, which relay is released at this time, and the lower outer break contacts of relay 963, which relay is operated at this time, thus preventing relay 951 from operating during the reception of this message and consequently preventing the automatic tape perforating and feed magnet 949 from operating.

When the message is recorded in the tape 900 by the printing reperforator 969 it will cause contacts 982 to close and operate relay 950. Relay 950 in operating completes a circuit for operating the start magnet 972 which will cause the transmitting distributor 970 to advance tape 900 through the transmitter 970. Normally, the first signals recorded in the tape 900 at this time will be letters signals if no previous message has been received over line 226 for some time. If the message in question immediately follows another message, the end of the other message will be transmitted through the distributor 970. In either event the distributor 970 will advance tape 900 through it and if there are letters signals recorded in the tape they will produce no effect other than to cause the release of relay 1007. When the M signal reaches the control position in distributor 970 it will cause contacts 914 to close and complete a circuit for the operation of relay 1004. Relay 1004 in operating completes a circuit for maintaining itself operated under control of relay 1008 which in turn is held operated under control of relays 1019, 1139, 1149 and 1159. Relay 1004 in operating interrupts the locking circuit of relay 1006 and thus permits this relay to release. Relay 1004 in operating also completes a circuit for the operation of magnet 971 which prevents the distributor 970 from advancing tape 900 at the end of the cycle of operation then in progress. Relay 1004 also interrupts the circuit of the start magnet 972, thus permitting this magnet to release and stop the operation of the transmitter 970 at the completion of the revolution or cycle then in progress.

The operation of relay 1004 also causes relay 1157 to operate. If the multiple transmission circuit is idle, relay 850 will be released.

Under these conditions the operation of relay 1157 i. e., when the multiple transmission circuit is idle, completes a circuit for the operation of relay 1158. The operation of relay 1158 completes a circuit for maintaining itself operated under control of the upper break contacts of relay 1006 and contacts 920. Relay 1158 in operating completes an obvious circuit for the operation of relay 1159. Relay 1158 in operating completes a circuit for the operation of relay 850 which, in turn, causes the busy lamps 855 and 866 to light. The operation of this relay also prevents the operation of any of the other switching relays associated with the multiple transmission circuit, thus preventing the connection of any other transmitter to this circuit at this time.

The operation of relay 1158 also extends the transmission circuit from transmitting distributor 970 to relay 2470. Relay 2470 repeats the impulses received from the transmitting distributor 970 to the printing reperforator 2269.

The operation of relay 1159 interrupts the circuit of relay 1008 which relay releases after a short interval of time and, in turn, interrupts the locking circuit of relay 1004, thus permitting this relay to release. The release of relay 1004 reestablishes a circuit through the start magnet 972, thus permitting the transmitter 970 to start. The release of relay 1094 interrupts the circuit through magnet 971 so that upon the operation of the transmitter 970 tape 900 will feed through it in the normal manner.

Inasmuch as magnet 971 prevented the advance of tape 900 when the distributor 970 previously came to rest, the first signal transmitted by the distributor 970 will be a letter M signal. This will be followed by all the switching signals and they in turn will be followed by the letter X signal, indicating the end of the switching signals. Following this, the message signals will be transmitted from the transmitting distributor 970 to the printing reperforator 2269 where they will be recorded in tape 2200.

The operation of relay 1159 completes a circuit for the operation of relay 2362 from negative battery through the left-hand winding of relay 2362, over lead 2312 which extends from Fig. 23 through Figs. 24, 21, 18, 14 and 11, to positive battery through the left-hand outer operated contacts of relay 1159. The operation of relay 2362 interrupts the operating circuit of relay 2364, preventing the operation of this relay as will be described hereinafter.

When the M signal, which is the first signal transmitted by transmitter 970, is recorded by the printing reperforator 2269 contacts 2234 close and operate relay 2263. The switching signals following the M signal cause their respective contacts to close. The letter A signal causes contacts 2231 to close and complete a circuit for the operation of relay 2363. The letter B signal causes contacts 2233 to close and complete a circuit for the operation of relay 2463. Signals representing the letter D cause contacts 2241 to close. The closure of these contacts at this time does not cause the operation of any of the relays. Normally, the closure of any of these contacts at this time would cause relay 2364 to operate. However, when the message is received over trunk 226, relay 2362 operates as described above and interrupts the operating circuit of relay 2364, consequently this relay cannot operate at this time.

Relay 2364 is prevented from operating because the signals for the letter D when they arrive over the trunk 226 have already directed the message to the proper station D through the switching equipment at the second switching station. Consequently, it is not desirable that they should again select a trunk back to that station and be retransmitted back to it. In other words, they have completed their switching functions at the second switching station shown in Fig. 2, so that it is undesirable to have them control any of the switching equipment at the first switching station. However, in case the message originates at any of the other stations connected to the first switching station, closure of these contacts will cause relay 2364 to operate, as described above, when the message originated at the first switching station.

The operation of the multiple transmission circuit during the reception of the following message and the disconnect signals, figures followed by an H signal, is substantially the same as described above when a message was transmitted from the first central switching station to a plurality of other stations. When the multiple message switching combination M arrives at the control position in the transmitter 2270 it causes relay 2301 to operate and after the entire message is recorded in tape 2200 by the printing reperforator 2269, the figures signal followed by the H signal will cause relays 2261 and 2262 to operate. The operation of relay 2262 then completes a circuit for operating relays 2317 and 2437. Upon operation of these relays when the respective lines are idle, switching relays are operated to connect the transmitting distributor 2270 to the respective lines. The make-busy relay for each line is operated, which in turn lights the busy lamp, indicating that that line is busy. The operation of the switching relays when any line is idle causes relay 2478 to operate and cause relay 2301 to release and start the transmission of the switching information and the following message signals over the line or trunk to the station to which it is directed. If only one of the lines were idle and only one of the relays 2317 or 2437 operated, relays 2475 and 2478 will cause relay 2471 to operate so that the switching information together with the message is repeated back to the printing reperforator 2269 so that it will be available for transmission to the other station when it becomes idle.

After the message has been transmitted to all of the stations to which it is directed, the multiple transmission circuit will be restored to its normal condition as described above.

Returning now to the operation of the trunk circuit 226 during the reception of the message intended for the first switching station and stations A and B. Immediately following this message the figures signal followed by the letter H signal will be received by the printing reperforator 969. Upon the reception of the figures signal, contacts 938 are operated which complete a circuit for the operation of relay 961. When the following H signal is received, contacts 937 are operated and complete a circuit for the operation of relay 962. The operation of relay 962 interrupts the locking circuit of relay 963 and permits this relay to release. The release of relay 963 in turn interrupts the locking circuit of relay 964 and permits this relay to release. When the teletypewriter 990 receives this H signal preceded by the figures signal at the end of the message, it will cause contacts 991 to operate. These contacts interrupt the locking circuit of relay 965, thus permitting this relay to release. The operation of relays 961 and 962 and the release of relays 963, 964 and 965 restore the equipment associated with the trunk line 226 to its normal or idle condition so that the printing reperforator 969 will respond to further signals received over the line 226 but so that the receiving teletypewriter 990 will not respond to or record these signals until it is again selected by the letter R signal.

*Overflow messages*

The switching circuits are so arranged that multiple transmission apparatus may be used to handle overflow messages, that is, in case a number of lines or stations all direct messages to any given line, so that this line remains busy a large percentage of the time and thus delays the transmission of the messages recorded in the tapes 500, 900, 1200, 1600 and 1900 to this station and also the messages recorded in these tapes subsequent to the messages directed to the busy station for a considerable period of time. Under such circumstances it is desirable to relieve the congestion and permit the messages to the other stations to be transmitted to them and at the same time transmit the messages to this busy station at a later time when it is not so busy. Under such circumstances a portion of the messages intended for the busy station may be directed to the multiple transmission circuit for storage in tape 2200. This will permit the messages stored in any of the tapes 500, 900, 1200, 1600 and 1900 following the messages stored in them for the busy station to be more promptly transmitted to the other stations for which they are intended. To illustrate the operation of the circuits under these circumstances, it is assumed that station A is busy and that station B first transmits a message for station A and then a message for station E. It is further assumed that station A has been and will continue to be busy for a considerable period of time due to the transmission of considerable material from station C, or some outlying station connected to station C, to station A. When the message for station A is transmitted from station B, it is received by the printing reperforator 1269 as described above and stored in tape 1200. The tape advances through the transmitting distributor 1270 until the switching signal A reaches the control position in the transmitting distributor 1270. This will cause relay 1301 to operate and lock. The operation of relay 1301, as described above, will stop the operation of the transmitting distributor 1270, will prevent the tape from advancing near the completion of the revolution of the transmitter 1270 then in progress, and will cause lamp 1313 to light. The lighting of lamp 1313 will indicate to the operator that a message is waiting for transmission to station A. However, the operator also notes that the busy lamp 761 is lighted at this time due to the fact that the line 589 to station A is busy. If this condition exists for a considerable period of time, that is, if both lamps 761 and 1313 remain lighted or if both of these lamps remain lighted and another one of the lamps, for example 2015, lights, indicating that another message is waiting for transmission to station A, the operator may cause one of these messages to be stored in tape 2200.

As assumed above, immediately following the transmission of the message to station A from station B, station B transmitted a message for station E. So long as station A was busy the message stored in tape 1200 cannot be transmitted to station A, consequently both this message and the following message to station E will be delayed during this time. In a similar manner all of the other messages transmitted from station B will be similarly delayed. If, however, the message intended for station A is stored in the tape 2200 for transmission to station A when station A becomes idle, then subsequent messages in tape 1200 may be transmitted to the proper stations, as for example the message intended for station E may be transmitted through the switching equipment at the first switching station to trunk 226 to the second switching station and then at the second switching station to station E without waiting until station A becomes idle. This materially reduces the delay in transmission of a message from station B to station E.

To accomplish this the operator upon noting that lamps 1313 and 761 both remain lighted for a considerable period of time and upon the further noting that the multiple transmission circuit is idle, that is, busy lamps 865 and 866 are not lighted, will operate key 1475. The operation of key 1475 completes a circuit for the operation of relay 1458 from negative battery through the right-hand break contacts of relay 850 to lead 810 which extends from Fig. 8 through Figs. 11 and 14, through the operated contacts of key 1475, left-hand winding of relay 1458 to positive battery through the upper break contacts of relay 1306. The operation of relay 1458 connects the transmission circuit of the transmitter 1270 to relay 2470, which relay in turn repeats the signals transmitted to it from the distributor 1270 to the printing reperforator 2269.

The operation of relay 1458 completes a circuit for maintaining itself operated under the joint control of the upper break contacts of relay 1306 and the cam control contacts 1220. Relay 1458 also completes a circuit for the operation of relay 1459. The operation of relay 1458 completes a circuit for the operation of relay 850 which in turn causes busy lamp 865 and overflow lamp 866 to light, thus indicating that the multiple transmission circuit is busy. The operation of relay 850 also prevents the connection of any of the other transmitters to the multiple transmission circuit at this time. The operation of relay 1459 interrupts the locking circuit of relay 1301 and permits this relay to release. The release of relay 1301 reestablishes the circuit through the start magnet 1272 and permits this magnet to operate and start the transmitting distributor 1270. The transmitting distributor 1270 will then transmit the message to the printing reperforator 2269. When the letter A signal, which will be the first signal transmitted to it, is received by the printing reperforator 2269 it will close contacts 2231, which completes a circuit for the operation of relay 2363 from positive battery through the winding of relay 2363, the right-hand break contacts of relay 2361, the operated contacts 2231 through the winding of relay 2267 to negative battery through the lower outer operated contacts of relay 2262. Relay 2267 operates in this circuit and completes a circuit for maintaining itself operated from negative battery through its lower operated contacts and winding, closed contacts 2231 and right-hand break contacts of relay 2361 to positive battery through the winding of relay 2363. Relay 2267 in operating and after it completes its locking circuit interrupts the locking circuit of relay 2262, thus permitting this relay to release. Relay 2363 in operating completes a circuit for maintaining itself operated under control of relay 2318. Tape 2200 upon being perforated by the reperforator 2269 causes contacts 2282 to operate. The closure of these contacts in turn causes the tape to advance through the transmitting distributor 2270 until the letter A signal arrives at the control position in the transmitting distributor, at which time contacts 2211 close and complete a circuit for the operation of relay 2301. The operation of relay 2301 as described above interrupts the circuit of relay 2310 which relay releases and in turn interrupts the circuit of the start magnet 2272 and permits this magnet to release and stop the transmitting distributor 2270 at the completion of the revolution then in progress. Then after the figures signal, followed by the H signal following the message, is received by the printing reperforator 2269, relays 2261 and 2262 will be operated. Relay 2262 in operating completes a circuit for operating relay 2317. The figures signal followed by the H signal transmitted by the transmitting distributor 1270 also causes contacts 1218 and 1217 to close and operate relays 1307 and 1306. The operation of relay 1306 together with the operation of contacts 1220 by cam 1274, at the completion of the revolution of the transmitting distributor during which the H signal is transmitted, interrupts the locking circuit of relay 1458, thus permitting this relay to release and in turn release relay 1459 and restore the switching circuits controlled by transmitting distributor 1270 to their idle condition. Thereafter, the message stored in tape 1200 and intended for station E may be transmitted through the system in the normal manner as described above. The release of relays 1458 and 1459 does not release relay 850 because a circuit is maintained through the winding of this relay through the left-hand operated contacts of relay 2476. When station A becomes idle and none of the other transmitters has messages to transmit to this station, relay 2317 will be operated which causes the transmitting distributor 2270 to transmit the message stored in tape 2220 to station A over loop 589. After the transmission of this message the circuits are returned to their idle condition as described above.

Urgent message

In case a subscriber at any of the stations has an urgent message which he wishes to be transmitted through the system with the least possible delay, he will transmit before the regular switching information a special combination, as for example the letter U. Assume that the subscriber at station A transmits such a symbol immediately preceding the switching combination of the message. The receiving apparatus including the receiving reperforator 569 will respond to these signals in the normal way and control the respective contacts as described above in addition to recording the signals in tape 500. When the urgency signal U is received, contacts 530 will momentarily close and complete a circuit for the operation of relay 566 from positive battery through the winding of relay 566, closed contacts 530 to negative battery through the lower outer operated contacts of relay 562. Relay 566 in operating completes a circuit for maintaining itself operated under control of keys 545 and 873 and completes a circuit for the lighting of lamp 871, indicating that an urgent message is being recorded by the receiving reperforator 569. The operator may then go around to this receiving reperforator and take the perforated tape out of it and insert the portion containing the urgent message in tape 500, ahead of other messages which may be recorded in this tape. The operator may also insert this tape portion in any of the other transmitters, and in particular in the transmitter 1970 for transmitting messages from the central switching station. Of course, the operator may disregard the urgency lamp 871 in which case the message will arrive at and pass through the transmitter distributor shown in Fig. 6 in its normal sequence.

When the urgency signal arrives at the transmitting distributor shown in Fig. 6 it will cause contacts 610 to operate and complete a circuit for the operation of relay 705 from negative battery through the winding of relay 705, operated contacts 610 to positive battery through the upper inner operated contacts of relay 706. Relay 705 in operating completes a circuit for maintaining itself operated under control of relay 708 which relay is, in turn, controlled by the break contacts of relays 729, 839, 849 and 859. The operation of relay 705 completes a circuit for lighting lamp 870. This indicates to the operator that an urgent message has arrived at the transmitting distributor shown in Fig. 6. If, for example, the urgent message from station A is directed to station B and a message is received from station C, also directed to station B, both lamps 831 and 1132 will be lighted. In addition, the urgency lamps 870 and 871 will be lighted. Relay 839 in operating causes release of relay 705 by interrupting the operating circuit of relay 708 which relay in turn interrupts the locking circuit of relay 705 in addition to releasing the switching relay 702 which would be operated under these circumstances as described above. In order for the operator to extinguish the urgency lamp 871, it is necessary for her to operate either key 545 or 873, which she may do at any time after the lamp 871 lights.

What is claimed is:

1. In a communication system comprising a plurality of stations and automatic selective switching equipment, a source of signals, automatic switching apparatus for selecting any of said stations and transmitting signals from said source to any of said selected stations when they are idle, storing apparatus, and circuits for transmitting signals from said source to said storing apparatus only when any selected station is busy.

2. In a communication system comprising a plurality of stations and automatic selective switching equipment, a source of signals, automatic switching apparatus for selecting any of said stations and transmitting signals from said source directly to any of said selected stations when they are idle, storing apparatus, and circuits for transmitting signals from said source to said storing apparatus when any selected station is busy and further apparatus for automatically transmitting said stored signals to the selected station when it becomes idle.

3. An automatic switching station to which a plurality of telegraph transmission paths extend, a source of signals, automatic switching apparatus for selecting any of said paths and for simultaneously transmitting signals from said source to all of the selected paths which are idle, signal storing apparatus, automatic switching circuits for transmitting signals from said source to said storing apparatus when any of the selected paths are busy.

4. An automatic switching station to which a plurality of telegraph transmission paths extend, a source of signals, automatic switching apparatus for selecting any of said paths and for simultaneously transmitting signals from said source to all of the selected paths which are idle, signal storing apparatus, automatic switching circuits for transmitting signals from said source to said storing apparatus when any of the selected paths are busy and additional switching circuits for automatically transmitting the stored signals to the selected lines which were busy when they become idle.

5. In a telegraph system having a plurality of telegraph transmission paths, a source of signals, and means for transmitting groups of signals from said source, automatic selective switching apparatus controlled by the first portion of each group of signals for transmitting the remainder of the group to any of said transmission paths designated in the first portion of said group of signals, and apparatus responsive to a busy condition of a designated path for automatically transmitting the group of signals to a storing device for later transmission to the designated path when said path is idle.

6. In a telegraph system having a plurality of telegraph transmission paths, a source of groups of signals and apparatus for transmitting said groups of signals from said source, automatic selective switching apparatus responsive to the first portion of each group of signals for simultaneously transmitting the remaining portion of the group to each of said paths designated in the first portion of each group which are idle at that time, a signal storing device, switching circuits jointly responsive to busy conditions of said paths and designations of paths in the first portion of each group for transmitting the remaining portion of the message to said storing device.

7. In a telegraph switching station including a source of groups of signals and signal-responsive devices to which a plurality of transmission paths extend, a storing device, automatic selective switching apparatus controlled by the first portion of each group of signals for transmitting the entire group to any of said transmission paths designated in the first portion of the respective groups of signals, and apparatus responsive to a busy condition of a designated path for automatically transmitting the entire group of signals to a storing device and apparatus for later transmitting the stored signals to the designated path when said path is idle.

8. In a telegraph system having a plurality of transmission paths, a source of groups of signals, and apparatus for transmitting said groups of signals from said source, automatic selective switching apparatus responsive to the first part of each group of signals for transmitting the remaining portion of the group to each of said paths designated in the first portion of the respective groups which are idle at that time, a signal storing device, switching circuits jointly responsive to busy conditions of said paths and designations of the paths for transmitting an entire group of signals to said storing device.

9. In a telegraph system having a central switching station to which a plurality of telegraph transmission channels extend, a source of groups of telegraph signals, automatic switching apparatus responsive to the first portion of each group of signals for transmitting the group to the transmission channel indicated in said first portion of each of the respective groups, a storing device, other apparatus responsive to other designations in said first portion of each group for transmitting the group to said storing device, instrumentalities responsive to the reception of the first portion of the group of signals by said recording device for indicating the paths to which said group of signals is directed, a telegraph transmitting device controlled by said stored signals, switching devices for automatically transmitting the stored signals from said transmitter to the paths which are idle and to which the signals are directed, other switching circuits for transmitting the signals back to said storage transmitter in response to a busy condition of a path to which the signals are directed.

10. In a telegraph switching system, a plurality of telegraph lines, busy indicating means individual to each of said lines, a multiple repeating circuit comprising a telegraph signal storing mechanism for storing signals in a record medium, a telegraph transmitter controlled by the signals stored in said record medium, a plurality of contacts actuated by said transmitter in accordance with certain signals recorded in said record medium, switching circuits responsive to the operation of said contacts for automatically and simultaneously connecting said transmitter to a plurality of idle lines in response to signals recorded in said record medium, switching circuits responsive to the connection of said transmitter to at least one idle line for starting said transmitter into operation for transmitting a message stored in said record medium to said idle line, other switching circuits for automatically connecting said transmitter to said signal storing mechanism in response to signals recorded in said record medium designating busy lines.

11. A telegraph system comprising a telegraph station, a plurality of telegraph lines, apparatus for indicating a busy condition of each of said lines, a repeating circuit comprising a reperforating mechanism for perforating a tape in accordance with telegraph signals received thereby, automatic switching apparatus for transmitting messages from any of said lines to said reperforating mechanism, a tape controlled telegraph transmitter controlled by the tape perforated by said reperforating mechanism, a group of contacts controlled by said reperforating mechanism, a second group of contacts controlled by said transmitter, automatic selective switching circuits jointly controlled by both of said groups of contacts for simultaneously connecting said transmitter to a plurality of idle lines in accordance with the signals recorded by the reperforating mechanism and transmitted by said transmitter, and apparatus jointly responsive to a busy condition of any of said lines and signals received by said reperforator directing messages to busy lines for automatically connecting said transmitter to said reperforating mechanism, circuits responsive to the connection of said transmitter to said plurality of lines for starting said transmitter into operation for simultaneously transmitting a message to each of said plurality of lines and to said reperforator, and apparatus responsive to a subsequent idle condition of said busy lines for connecting said transmitter thereto and for transmitting the message over them.

12. In a telegraph system comprising a plurality of switching stations, a plurality of local stations individual to each of said switching stations, telegraph lines connecting said local stations to their respective switching stations, busy indicating means at each of said switching stations individual to each line terminating thereat, telegraph lines connecting certain of said switching stations together, a special repeating circuit at each of said switching stations, automatic switching apparatus for transmitting a message received from any of the lines terminating at any of said switching stations to said special repeating circuit, additional automatic switching apparatus for simultaneously transmitting said message to all of the idle lines for which it is intended, equipment responsive to busy condition of certain of said lines and to switching signals directing a message to said busy lines for repeating said message to said repeating circuit, circuits responsive to reception of certain signals by said special repeating circuit for transmitting said message over a line to a second switching station, and means at said second switching station for directing said message to said special repeating circuit at said second station.

13. In a telegraph system, a central station, a plurality of lines terminating thereat, busy indicating means individual to each of said lines terminating at said station for indicating busy condition of the respective lines, a multiple repeating circuit, automatic connecting apparatus responsive to signals received from any of said lines preceding messages received from said line for automatically directing a message to said multiple repeating circuit, apparatus controlled by said special repeating circuit for simultaneously transmitting said message to idle lines in accordance with said switching signals, and means for preventing the retransmission of said message back over the same line from which it is received.

14. In a telegraph system, a plurality of telegraph lines, busy means individual to each of said lines for indicating a busy condition thereof, a telegraph storing device for storing received telegraph signals, a telegraph transmitter controlled by stored signals, automatic selective switching circuits controlled by said storing device responsive to switching signals for designating and recording the lines to which said message is directed, switching circuits controlled by said transmitter for automatically connecting said transmitter to said designating lines when they are idle, apparatus responsive to a busy condition of any of the designated lines for connecting said storing means to said transmitter, circuits responsive to the connection of said transmitter to any of said designated lines for simultaneously transmitting a message over all of the lines connected to it, and other switching circuits for preventing connection of said transmitter to any line a second time until said message has been transmitted over all of the designated lines.

15. In a telegraph system, a plurality of telegraph lines, busy means individual to each of said lines for indicating a busy condition thereof, a telegraph storing device for storing received telegraph signals, a telegraph transmitter controlled by stored signals, switching circuits automatically and selectively controlled by said storing device in response to switching signals for automatically and selectively designating said lines, apparatus for connecting said transmitter to designated lines when they are idle, switching apparatus responsive to a busy condition of any of the designated lines for automatically connecting said storing means to said transmitter, means responsive to the connection of said transmitter to any of said indicated lines for simultaneously transmitting a message over all of the lines connected to it, other switching circuits for preventing connection of said transmitter to any line a second time until said message has been transmitted over all of the indicated lines, and other circuit means for preventing said transmitter from being connected to retransmitting a message to a line from which said message has been received.

16. A telegraph system comprising a first automatic switching center, a plurality of telegraph lines extending thereto, switching apparatus located at said first center controlled by permutation code groups of telegraph signals for selectively conveying telegraph signals from one line to another line, a second automatic switching center operated under control of permutation code groups of signals, a second plurality of telegraph lines extending thereto, switching apparatus located at said second switching center controlled by permutation code groups of telegraph signals for selectively conveying telegraph signals from one of said second plurality of lines under control of permutation code groups of signals, and a two-way telegraph transmission path capable of transmission in only one direction at a time extending between said switching centers, said switching apparatus at both centers including equipment for conveying telegraph signals to and away from said path under control of permutation code groups of telegraph signals.

17. A telegraph system comprising a first automatic switching station, a second automatic switching station, automatic switching equipment located at each of said stations, a two-way telegraph transmission path extending between said stations, apparatus at each of said stations for conveying telegraph signals to said path under control of permutation code groups of impulses, and testing circuits at each of said stations for preventing the conveyance of more than one series of telegraph signals to said path at one time.

18. In a telegraph system comprising a first switching station, a second switching station, a two-way telegraph transmission channel capable of transmitting in only one direction at a time extending between said stations, a telegraph transmitter controlled by stored permutation code combinations at each of said stations, and switching apparatus responsive to stored permutation code combinations for selectively directing the transmission of stored permutation code combinations to said channel from either one of said transmitters one at a time.

19. In a telegraph system a first automatic switching apparatus, a second automatic switching apparatus, a two-way telegraph transmission path extending between said first and second apparatus, each of said switching apparatus including a message directing portion for selectively directing telegraph messages only one at a time over said path under the sole control of permutation code groups of telegraph signals.

20. In a telegraph system a first switching apparatus, a second switching apparatus, a telegraph transmission path extending between said first and second switching apparatus, each of said switching apparatus including a message directing portion for selectively and automatically directing messages from either of said switching apparatus over said path one at a time under the sole control of permutation code groups of signals.

21. A two-way trunk comprising a single communication channel for the transmission of telegraphic signaling currents in either direction one direction at a time, said trunk at each terminus being associated with permutation code controlled apparatus for selectively directing to and over said trunk telegraphic permutation codes, said trunk also being associated at each terminus with permutation code controlled apparatus for selective control by permutation code combinations received over said trunk to selectively direct the transmission of other permutation code combinations to and over selected paths away from said trunk.

22. A two-way trunk comprising a single telegraphic communication channel for telegraphic impulse transmission in either direction, one direction at a time, said trunk at each terminus being associated with permutation code controlled apparatus for selectively directing to and over said trunk message permutation codes.

23. A two-way trunk of telegraphic impulse transmission comprising a single transmission channel capable of transmission in either direction but in only one direction at a time, said trunk at each terminus being associated with permutation code controlled apparatus for selective control by permutation code combinations received over said trunk.

24. A two-way trunk of telegraphic impulse transmission comprising a single transmission channel capable of transmission in either direction but only in one direction at a time, said trunk being associated at each terminus with permutation code controlled apparatus for selective control by permutation code combinations received over said trunk to selectively direct the transmission of other permutation code combinations to and over a selected path away from said trunk.

25. The method of controlling transmission of messages which comprises storing such messages successively in a medium of storage in the form of stored code combinations, controlling transmission by the same code combinations either once or successively, transmitting as said controlled transmission certain series of code combinations, and either once or successively directing the emitted code combinations toward a selected station or plurality of stations of final address conjointly and automatically determined by a certain condition of a path or paths to said station or stations and by certain of the stored code combinations.

26. The method of controlling transmission of messages which comprises storing such messages successively in a medium of storage in the form of stored code combinations, controlling transmission by the same code combinations either once or successively, transmitting as said controlled transmission certain series of code combinations, and either once or successively directing the emitted code combinations over a selected path or selected divergent paths conjointly and automatically determined by a certain condition of said paths and by certain of the stored code combinations.

27. A telegraph system comprising a transmitting station for impressing upon a line code combinations representing a message and addresses of stations to which the message is to be sent, storage means for storing the message in recorded form, a storage controlled transmitter for deriving the message from said storage means, automatic switching apparatus identified with each of said stations of address selectively controlled by recorded address code combinations for relaying the derived message from the storage means to each station of address independently of the availability at that time of any channel or channels to other stations of address.

28. A telegraph system comprising a transmitting station for impressing upon a line code combinations representing a message and addresses of stations to which the message is to be sent, storage means for storing the message in recorded form, automatic switching apparatus selectively controlled by recorded address code combinations identified with each of said stations of address for deriving the message from said storage means and relaying it to the station identified by said apparatus independently of the availability at that time of any channel or channels to other stations of address, said storage means being common to a plurality of stations of address.

29. A telegraph system comprising a transmitting station for impressing upon a line code combinations representing a message and addresses of stations to which the message is to be sent, storage means for storing the message in recorded form, automatic switching apparatus selectively controlled by recorded address code combinations identified with each of said stations of address for deriving the message from said storage means and relaying it to the station identified by said apparatus independently of the availability at that time of any channel or channels to other stations of address, in which the storage means for some one station of address is different at least in part from the storage means for some other station of address.

30. The method of controlling multiaddress message transmission from a transmitter supplied by a message storage device which comprises storing a message in the message storage device, automatically controlling the transmitter by an idle channel or idle channels to transmit the message to stations for which it is intended, and subsequently automatically controlling the transmitter by another idle channel to transmit the same message to another station for which it is intended.

31. The method of controlling transmission from a telegraph transmitter supplied with code combinations in stored form to be transmitted which comprises successively causing the emission from the transmitter of identical series of messages representing code combinations and successively directing the emitted series of code combinations over paths conjointly and automatically determined by the conditions of the paths and by certain of the stored code combinations.

32. A two-way telegraph transmission path, a telegraph transmitter controlled by stored permutation codes located at each terminus of said path, and apparatus automatically controlled by the stored signals of each transmitter for selectively directing telegraph signaling currents to said path from said transmitters one at a time.

33. A two-way telegraph transmission path, a separate storage repeater for storing and repeating telegraph code combinations associated with each end of said path, automatic switching apparatus for selectively directing telegraph signaling currents to either of said storage repeaters one at a time under control of the signals stored at the opposite end of said path.

34. In a telegraph transmission system, a recorder for recording code combinations upon a physical medium, a telegraph transmitter to be later operated in accordance with the recorded code combinations, channels to which the transmitter may be selectively connected to transmit the code combinations, a channel marking element to identify each selected channel, apparatus to selectively condition a marking element incidental to the recording of the code combinations prior to their advance to the transmitter, and automatic means to transfer the message to the marked channel when the message arrives at the transmitter.

35. In a telegraph transmission system, a tape perforator for recording code combinations upon a physical tape, a telegraph transmitter to be later operated under control of the tape in accordance with the recorded code combinations, channels to which the transmitter may be selectively connected to transmit the code combinations, a channel marking element to identify each selected channel, apparatus to selectively condition a marking element incidental to the recording of the code combinations prior to their advance to the transmitter, and automatic means to transfer the message to the marked channel when the message arrives at the transmitter.

36. In a telegraph transmission system, a recorder for recording code combinations upon a physical medium, a telegraph transmitter to be later operated in accordance with the recorded code combinations, channels to which the transmitter may be selectively connected to transmit the code combinations, a channel marking element to identify each selected channel, apparatus to selectively condition the marking elements individually or in groups incidental to the recording of the recorded code combinations prior to their advance to the transmitter, automatic means to transfer the message to idle ones of the marked channels when the message arrives at the transmitter, automatic means to transfer the message to other of said marked channels at a later time, and means operative incident to a busy channel becoming idle to initiate the operation of said last-named means.

37. In a telegraph transmission system, a channel for supplying code combinations including message code combinations and code combinations of address, a recorder for recording said code combinations upon a physical medium, a telegraph transmitter to be later operated in accordance with the recorded code combinations, channels leading to stations of address to which the transmitter may be selectively connected to transmit the code combinations, a channel marking element to identify each selected channel, apparatus to selectively condition a marking element incidental to the recording of the code combinations prior to their advance to the transmitter, and automatic means to transfer the message to the marked channels when the message arrives at the transmitter.

38. In a telegraph transmission system, channels including a trunk channel for supplying code combinations including message code combinations and code combinations of address, a recorder for recording said code combinations upon a physical medium, a telegraph transmitter to be later operated in accordance with said recorded code combinations, channels including said trunk channel leading to stations of address to which the transmitter may be selectively connected to transmit to the selected channels, channel marking elements to identify each selected channel, apparatus to selectively condition a marking element incidental to the recording of code combinations prior to their advance to the transmitter, automatic means to transfer the message code combinations to the marked channels when the message arrives at the transmitter, conditionable means to inhibit transfer of a message to said trunk, and means operative incidental to supply of code combinations including message code combinations from said trunk to so condition said means to inhibit transfer.

39. In a telegraph switching system, a trunk capable of transmitting telegraph signals in either direction, a first group of stations associated with one terminus of said trunk, a second group of stations associated with the other terminus of said trunk, storage means operatively associable with any station of one of said groups or with said trunk for storing a train of signals indicating a message and address signals representing any selected one or more stations selected from either group, other storage means associable with any station of the other of said groups or with said trunk for storing a train of signals including a message and address signals representing any selected one or more stations selected from either group, means including said storage means for relaying such trains of message signals to their stations of address under control of the address signals, and means operable incident to transmission of a train of message and address signals over said trunk to estop return of said train back over said trunk regardless of the presence therein of signals of address which would normally route said train over said trunk.

40. In a telegraph system a central station, a plurality of lines terminating thereat, a multiple storage repeater for storing message signals preceded by switching signals received from any of said lines, automatic connecting apparatus responsive to stored switching signals preceding said message signals for automatically and simultaneously causing the transmission of the succeeding message signals to idle lines in accordance with said switching signals, and apparatus independent of said message signals for preventing the retransmission of said message over a line from which the message is received.

41. In a telegraph system, a storage medium for storing code combinations in physical form, transmission means controllable by said storage medium, a plurality of channels of telegraphic transmission extending from said transmission means, devices operable under control of and in accordance with certain code combinations stored in said medium to selectively broadcast said information simultaneously over more than one of said channels to a plurality of receiving stations, and paths selectively automatically controllable whereby any one of a plurality of said stations may cause the storage of code combinations in said medium.

42. In a telegraph system comprising a telegraph channel, a telegraph recording device normally operatively associated with said channel, a receiving device, switching apparatus responsive to predetermined signals for operatively associating said receiving device with said channel, other apparatus responsive to other predetermined signals received over said channel for operatively associating said receiving device with said channel and simultaneously rendering said recording device non-responsive to further signals received over said channel, a telegraph transmitter individual to and controlled by signals recorded by said recording device, and automatic electromechanical switching apparatus responsive to stored signals for connecting said transmitter to an outgoing channel.

43. A telegraph system comprising a central telegraph station, a plurality of telegraph lines terminating thereat, a telegraph recording device operatively associated with each of a plurality of said lines, individual telegraph receiving devices also associated with each of a plurality of said lines, switching apparatus responsive to certain signals received over one of said lines for operatively associating said receiving device with said line, other switching apparatus responsive to certain other signals received over said line for operatively associating said receiving device with its respective line and simultaneously disassociating said recording device from said line, a telegraph transmitting device individual to said recording device and controlled by signals recorded thereby, switching instrumentalities responsive solely to recorded signals and the condition of said lines for operatively associating said transmitter with any line of said plurality of lines.

44. A telegraph system comprising a central telegraph station, a plurality of telegraph lines terminating thereat, individual telegraph recording devices operatively associated with each of a plurality of said lines, a telegraph receiving device also associated with each of a plurality of said lines, switching apparatus responsive to signals received over said lines for operatively associating said receiving device with said line, other switching apparatus responsive to other signals received over said line for operatively associating said receiving device with its respective line and simultaneously disassociating said recording device from said line, a telegraph transmitting device individual to said recording device and controlled by signals recorded thereby, switching instrumentalities responsive solely to recorded signals and the condition of said lines for operatively associating said transmitter with any line of said plurality of lines, and apparatus responsive to the association of said transmitter with any of said lines for operatively associating the respective receiving device with said line and simultaneously disassociating the respective recording device therefrom.

45. A telegraph system comprising at a telegraph switching station, a plurality of telegraph channels terminating at said station, said channels being capable of transmission in two directions but only one direction at a time, telegraph recording apparatus associated with each of said channels, telegraph receiving apparatus individual to each of said channels, a telegraph transmitter individual to and controlled by signals recorded by said recording device, switching apparatus solely responsive to recorded signals and the conditions of said channels for operatively associating said transmitter with any of said channels.

46. A telegraph system comprising a telegraph switching station, a telegraph recording apparatus individual to and associated with each of said lines, telegraph receiving apparatus individual to each of said lines, a telegraph transmitter individual to and controlled by signals recorded by said recording device, switching apparatus solely responsive to recorded signals and the conditions of said lines for operatively associating said transmitter with any one of said lines, other switching devices responsive to the association of any transmitter with any of said lines for operatively associating the respective receiving device with said line.

47. A telegraph system comprising a telegraph switching station, a plurality of telegraph lines terminating at said station, telegraph recording apparatus associated with each of said lines, telegraph receiving apparatus individual to each of said lines, a telegraph transmitter individual to and controlled by signals recorded by said recording device, switching apparatus solely responsive to recorded signals and the conditions of said lines for operatively associating said transmitter with any one of said lines, other switching apparatus responsive to the association of said transmitter with any line for disassociating the recording device from its respective line.

48. A telegraph system comprising a plurality of telegraph switching stations, a plurality of telegraph lines terminating at each of said stations, telegraph recording apparatus individual to and normally associated with each of said lines, other telegraph receiving apparatus individual to each of said lines, telegraph transmitting apparatus individual to each of said recording devices and controlled by signals recorded thereby, telegraph trunk lines extending between said switching stations, a telegraph recording device associated with each end of said trunk lines, other telegraph receiving apparatus individual to each end of said trunk lines, a telegraph transmitting device individual to each of said recording devices and controlled by signals recorded thereby, switching apparatus controlled solely by recorded signals and the condition of said lines for transmitting signals from any of said transmitters to any of said lines, and apparatus responsive to the establishment of a transmission path from said transmitter to any of said lines for operatively associating said receiving device with its respective line and simultaneously disassociating its respective recording device from said line.

49. A telegraph system comprising a plurality of telegraph switching stations, a plurality of record controlled transmitters located at each of said stations, a two-way telegraph transmission path extending between said stations, a telegraph recording device associated with each end of each of said paths, another telegraph receiving device individual to each end of each of said paths, telegraph switching circuits responsive solely to received signals and the condition of said paths for establishing a transmission path from any of said transmitters to any of said paths, and apparatus responsive to the establishment of any of said transmission paths for operatively associating said other receiving device individual to that end of said path with said path and simultaneously disassociating the recording device at that end of said path from said path.

50. A telegraph system comprising a plurality of telegraph switching stations, a plurality of record controlled transmitters located at each of said stations, two-way telegraph transmission paths extending between a pair of said stations, a telegraph recording device associated with each end of each of said paths, telegraph switching circuits responsive solely to received signals and the condition of one of said paths for establishing a transmission path from any of said transmitters to said one of said paths, and apparatus responsive to the establishment of said path for disassociating the recording device at that end of said path therefrom.

51. In a telegraph system, a plurality of telegraph switching stations, a two-way telegraph trunk extending between said stations, telegraph recording apparatus individual to each end of said trunk, other receiving apparatus associated with each end of said trunk, telegraph transmitting apparatus at each of said switching stations, message controlled switching apparatus at each of said stations for operatively associating a transmitter at any of said stations with a trunk termination thereat and apparatus responsive to the association of a transmitter with one end of any of said two-way trunks for operatively associating the receiving apparatus individual thereto with said trunk and simultaneously disassociating said recording apparatus therefrom.

52. In a telegraph system, a plurality of telegraph switching stations, a two-way telegraph channel extending between two of said stations, telegraph recording apparatus associated with each end of said channel, other receiving apparatus associated with each end of any such channel, telegraph transmitting apparatus at each of said switching stations, electromechanical switching apparatus at each of said stations for operatively associating a transmitter at any of said stations with any such channel terminating thereat, and apparatus responsive to the association of any transmitter with either end of any of said channels for disassociating the recording apparatus at that end of said channel therefrom.

53. A telegraph system comprising a first telegraph station, a plurality of telegraph lines terminating thereat, electromechanical switching apparatus responsive solely to signals received over said lines and the conditions of said lines for transmitting telegraph signals between said lines, a second telegraph station, telegraph lines terminating thereat, manually controlled apparatus for establishing transmission paths between the lines terminating thereat, a two-way telegraph channel extending between said stations, terminal apparatus associated with each end of said channel for cooperating with the switching apparatus at the respective stations for interconnecting said stations.

54. A telegraph system comprising a first telegraph station, a plurality of telegraph lines terminating thereat, electromechanical switching apparatus responsive solely to signals received over said lines and the conditions of said lines for transmitting telegraph signals between said lines, a second telegraph station, telegraph lines terminating thereat, manually controlled apparatus for establishing transmission paths between the lines terminating thereat, a two-way telegraph trunk extending between said stations, terminal apparatus associated with each end of said trunk for cooperating with the switching apparatus at the respective stations for interconnecting said stations, telegraph storage apparatus associated with said trunk for storing signals received from said first station, and telegraph transmitting apparatus controlled by said stored signals for transmitting said signals from said second station.

55. A telegraph system comprising a first telegraph station, a plurality of telegraph lines terminating thereat, electromechanical switching apparatus responsive solely to signals received over said lines and conditions of said lines for transmitting telegraph signals between said lines, a second telegraph station, telegraph lines terminating thereat, manually controlled apparatus for establishing transmission paths between the lines terminating thereat, a two-way telegraph trunk extending between said stations, terminal apparatus associated with each end of said trunk for cooperating with the switching apparatus at the respective stations for interconnecting said stations, said trunk including storage apparatus for storing signals received from said second switching system and transmitting apparatus controlled by said stored signals for transmitting said signals through said first switching stations.

56. A telegraph system comprising a transmitting station for impressing upon a line code combinations representing a message and addresses of stations to which the message is to be sent, storage means for storing the message including the addresses in recorded form, apparatus operable solely under control of the recorded addresses for transferring the message from the storage means to each station of address independently of the availability at that time of any channel or channels to other stations of address.

57. A telegraph system comprising a transmitting station for impressing upon a line code combinations representing a message and addresses of stations to which the message is to be sent, storage means for storing the message in recorded form, apparatus identified with each of said stations of address and automatically electromechanically controlled in accordance with the addresses for deriving the message from said storage means and relaying it to said stations independently of the availability at that time of any channel or channels to other stations of address.

58. A telegraph transmitter having a flexible medium, and means for providing the medium with recorded code combinations, a plurality of relaying apparatus, devices for controlling the transmitter and causing it to automatically selectively render effective for relaying in accordance with certain of the recorded code combinations, and devices to actuate the selected relaying apparatus in accordance with the recorded code combinations, in combination with devices for rerecording at least certain of the code combinations in the medium under control of said transmitter.

59. A telegraph system including a telegraph transmitter controlled by stored signals, means operable independently of manual control to establish a condition necessitating restoring said signals, means operated by said transmitter and stored signals independently of manual control for responding to the existence of such condition necessitating restoring the signals, means operable upon determining said condition for restoring the signals, and means automatically reactivating said transmitter thereby.

60. The method of controlling transmission from a telegraph transmitter supplied with code combinations in stored form to be transmitted which comprises successively causing the emission from the transmitter of identical series of message representing code combinations, and automatically directing under the sole control of stored combinations and independently of manual control the successively emitted code combinations over paths conjointly determined by the condition of the paths and by certain stored code combinations.

61. A telegraph transmitter, apparatus responsive to stored signals for controlling the operation of said transmitter, apparatus capable of selectively establishing or not establishing one or more conditions requiring the repeated control of said transmitter by a stored signal, apparatus for automatically and selectively in accordance with stored signals testing for the existence of one or more such conditions requiring the repeated control of said transmitter by a stored signal and apparatus solely responsive to an affirmative response to such test for causing said transmitter to be repeatedly controlled by a stored signal.

62. In a telegraph system, a record-controlled telegraph transmitter comprising mechanical means for responding to signals stored in a record medium, a plurality of transmission paths extending from said transmitter, apparatus jointly and automatically controlled by said transmitter and signals stored in said record independently of manual control for establishing a transmission path from said transmitter to a selected plurality of said channels and apparatus responsive to the establishment of said path for causing said transmitter to immediately transmit signals to said selected channels.

63. A system including a signal storer and means for storage of message code and directing code signals thereby, a telegraph transmitter actuable by and in accordance with said codes, means automatically controlled by directing codes for automatically selecting a path, means also automatically controlled for rendering said path effective to convey currents representing the message codes away from said transmitter, and means operable selectively according to the directing codes to control restorage of associated message codes in said same means for storage.

64. In a telegraph system, an incoming channel for receiving message codes mixed with message directing codes, storage means for storing all of said codes, outgoing lines to which said message directing codes may direct said messages selectively, a code transmitter cooperating with selective means controlled by and in accordance with the directing codes to transmit message codes stored in said storage means over an outgoing line under an idle condition of said outgoing line making said line available for said transmission, and apparatus responsive to a busy condition of said outgoing line to cause a restoring of said message.

65. In a telegraph system, an incoming channel for receiving message codes mixed with message directing codes, storage means for storing all of said codes, outgoing lines to which said message codes may automatically and selectively direct said messages, selective means, a code transmitter cooperating with said selective means and controlled by and in accordance with said directing codes to transmit message codes stored by said storage means over a selected outgoing line when said line is available for transmission, and apparatus to cause a restoring of said message when said line is not available for transmission.

66. In a telegraph system, an incoming channel for receiving message codes accompanied by message directing codes, storage means for storing all of said received codes, restorage apparatus, outgoing lines to which said message directing codes may automatically direct said message codes selectively, busy indicating means for said outgoing lines, selective apparatus, a transmitter cooperating with said selecting apparatus and controlled by and in accordance with said directing codes to automatically initiate transmission of said stored message codes stored in said storage means to a selected outgoing line when said selected outgoing line is idle, and apparatus to automatically initiate transmission of said stored message codes to said restorage apparatus when said outgoing line is busy.

67. In a communication system comprising a plurality of stations and automatic selecting equipment, a source of signals, automatic switching apparatus for selecting any of said stations and transmitting signals from said source to any of said selected stations, busy apparatus for preventing the connection of more than one source of signals to any station at a given time, storing apparatus, and circuits jointly responsive to the operation of said switching apparatus and said busy apparatus for transmitting signals from said source to said storage apparatus when any selected station is busy.

68. In a telegraph system, a switching center, a plurality of telegraph lines terminating thereat, a source of telegraph signals, automatic switching apparatus controlled by telegraph signals for connecting said source to any of said lines, apparatus responsive to a busy condition of any of said lines for preventing the connection of said source thereto, storage apparatus, and other switching circuits responsive to said busy apparatus and said first switching apparatus for connecting said source to said storage apparatus when a selected line is busy.

69. In a telegraph system, a switching center, a plurality of telegraph lines terminating thereat, storage apparatus for storing telegraph messages received from said lines, telegraph transmitting apparatus controlled by said stored signals, switching equipment for selectively connecting said transmitting apparatus to any of said lines under control of stored telegraph signals, busy apparatus for preventing the connection of any of said transmitters to a busy line, and apparatus jointly responsive to said busy apparatus and said switching apparatus for restoring message signals when the selected line is busy.

70. In a telegraph system, a switching center, a plurality of telegraph transmission paths, a source of telegraph signals, automatic switching apparatus controlled by permutation code telegraph signals for selectively and operatively associating said source with any of said paths, apparatus responsive to a busy condition of one of said paths for preventing the connection of said source thereto, other switching circuits jointly responsive to said busy apparatus and said automatic switching apparatus for automatically operatively associating said source with another path in response to the selection of a busy path by said switching apparatus.

71. In a telegraph system, a first automatic switching station, a second automatic switching station, a two-way trunk circuit extending between said stations, automatic switching equipment controlled by permutation code combinations of telegraph signaling pulses for establishing transmission paths for conveying signals to and away from each end of said path, and apparatus responsive to the establishment of one set of paths for the transmission of signals in one direction over said trunk for the prevention of the establishment of similar paths for conveying signals over said trunk in the opposite direction.

72. In a telegraph system, a two-way trunk circuit comprising a single transmission path capable of transmitting telegraph signals in either direction thereover one direction at a time, automatic switching equipment responsive to permutation code signals for establishing transmission paths for the conveyance of permutation code signals to and away from the ends of said path, and apparatus responsive to the establishment of one set of paths for the conveyance of permutation code signals to one end of said path and away from the opposite end of said path for preventing the establishment of any other paths for conveying signals to or away from the ends of said trunk circuit.

73. In a telegraph system, a two-way telegraph trunk circuit comprising a single transmission path capable of transmitting signals in either direction thereover one direction at a time, a telegraph recording instrument individual to and associated with each end of said path, switching equipment controlled by permutation code signals for establishing transmission paths for conveying signals to said trunk circuit, and apparatus responsive to the establishment of one of said paths for operatively associating said recording instrument associated with the same end of said path with said path.

74. In a telegraph system, a two-way trunk circuit, a telegraph signal storing device normally associated with each end of said path, automatic switching equipment controlled by permutation code signals for establishing transmission paths for the conveyance of telegraph signals to said path, and apparatus responsive to the establishment of one of said paths for dissociating the storage device from said path at the same end at which the communication path is established for conveying signals to said trunk circuit.

75. In a telegraph system, a first automatic switching center, a second automatic switching center, a two-way telegraph trunk circuit extending between said switching centers comprising a single telegraph transmission path capable of transmitting signals in either direction thereover but in only one direction at a time, telegraph storage equipment normally operatively associated with each end of said path, switching equipment controlled by permutation code signals for establishing transmission channels for the conveyance of telegraph signals to and away from the ends of said path, and apparatus responsive to the reception of telegraph signals by the storage equipment at either end of said path for the prevention of the establishment of the transmission channels for the conveyance of signals to the end of said path at which said signals are received.

76. In a telegraph system, a two-way trunk circuit comprising a single transmission path capable of transmitting signals in either direction thereover but only in a single direction at a time, a plurality of transmission paths adjacent each end of said trunk, automatic switching equipment at each end of said trunk for selectively conveying signals between said trunk and said paths, and apparatus responsive to permutation code signals conveyed over said trunk for controlling said switching equipment.

77. In a telegraph switching system, a two-way trunk circuit comprising a single transmission path capable of transmitting signals in either direction but in only one direction at a time, a plurality of transmission paths leading away from each end of said trunk, automatic switching equipment at each end of said trunk for conveying telegraph signals from said trunk selectively to said paths, and apparatus responsive to telegraph signals received over said path for controlling said switching equipment.

78. A communication system comprising a telegraph system for relaying messages from one station to another, in which one or more code characters identify stations to which the messages are directed by automatic switching, means for performing this switching, an automatic tape controlled transmitter at a particular station of said system, apparatus for automatically controlling by said transmitter said means for performing said switching, a reperforator for supplying tape to said transmitter, a receiving station of another telegraph system geographically adjacent said particular station, said receiving station of said other system comprising the following instrumentalities; first, a recording instrument for recording messages intended for said station of said other system, connections for interassociating said receiving station with said reperforator, and means controlled incident to the reception of a message and operable under control of one or more code combinations thereof to assign the message to be recorded by the recorder or perforated by the reperforator.

79. A communication system comprising a telegraph system for relaying messages from one station to another, in which one or more code characters identify stations to which the messages are directed by automatic switching, means for performing this switching, an automatic transmitter controlled by a storage medium for telegraph codes at a particular station of said system, a code storer for supplying said medium to control said transmitter, a receiving station of another telegraph system geographically adjacent said particular station, said receiving station comprising the following instrumentalities; first, a recording instrument for recording messages intended for said station, connections for inter- associating said station with said storer, and means controlled incident to the reception of a message and operable under control of one or more code combinations thereof to assign the message to be recorded by the recorder or stored by the code storer and means cooperating with said automatic transmitter and responsive to at least certain of said received code combinations to automatically control said means for performing said switching.

80. A communication system comprising a first telegraph system for relaying messages from one station to another, in which one or more code characters identify stations to which the messages are directed by automatic switching, a tape controlled transmitter at a particular station of said system, a reperforator for supplying tape to said transmitter, a receiving station of a second telegraph system geographically adjacent said particular station, said receiving station comprising the following instrumentalities; first, a recording instrument for recording messages intended for said station, connections interassociating said station with said reperforator, and means controlled incident to the reception of a message and operable under control of one or more code combinations thereof to assign the message to be recorded by the recorder or perforated by the reperforator, said transmitter comprising an instrument for automatically introducing into the first system a train of message codes preceded by station identifying codes received from said second system.

81. A communication system comprising a first telegraph system for relaying messages from one station to a plurality of others in which one or more code characters selectively identify a plurality of stations to which the messages are directed by automatic switching, means for performing said automatic switching, an automatic tape controlled transmitter at a particular station of said system, a reperforator for supplying tape to said transmitter, a receiving station of a second telegraph system geographically adjacent said particular station, said receiving station comprising the following instrumentalities; a recording instrument for recording messages intended for said receiving station, connections interassociating said receiving station with said reperforator, means controlled incident to the reception of a message and operative under control of one or more code combinations included with said message to cause the recorder to operate to record the message or to cause the reperforator to operate to perforate the message in said tape and apparatus for automatically controlling said means for performing said automatic switching cooperating with said automatic transmitter and responsive to said code combinations included with said message which cause the reperforator to perforate the message in the tape.

82. A communication system comprising a first telegraph system for relaying messages from one station to a plurality of others in which one or more code characters selectively identify either a single or a plural number of stations to which the messages are directed by automatic switching, means for performing said automatic switching, an automatic storage medium controlled transmitter at a particular station of said system, apparatus for automatically controlling said means for performing said automatic switching by said transmitter in accordance with stored signals, a storer for supplying storage medium to said transmitter, a receiving station of a second telegraph system geographically adjacent said particular station, said receiving station comprising the following instrumentalities; a recording instrument for recording messages intended for receiving said station, connections interassociating said receiving station with said storer, means controlled incident to the reception of a message and operative under control of one or more code combinations of said message to assign the message to be recorded by the recorder or perforated by the reperforator.

83. In combination, two telegraph systems for different types, the first of which comprises manual means for establishing a transmission path between two stations of the system, the second of which comprises switching apparatus operated by permutatively coded code combinations each consisting of an invariable number of line conditions for selectively directing messages to stations of address according to codes accompanying similar intelligence codes forming each message, a transfer point common to both of said systems, means at said point included in one system but operated under control of the other for transferring messages from one said system directed to a point in the other said system to the other system, and and selectively operable means for operating said transfer means to transfer a message from one system to the other.

84. A first telegraph system comprising apparatus for transferring message matter from one point to any one of a plurality of remote points selectively comprising, in combination, means for storing a succession of signals in mechanical form each represented by a plurality of units each having either of two differentiating characteristics, a selector mechanism adapted for control in accordance with certain of said signals to select a transmission path leading to a receiving point predetermined by the character of the several units of the signal, in combination with a second telegraph system having a receiving station, selective means operated by messages arriving at said receiving station over said second system, a recorder selectively conditioned by said selective means to record messages intended for said receiving station, and storage means selectively conditionable by said selective means to store messages intended for delivery to a station of said first system via a transmission path of said system.

85. The method of operating two different types of telegraph systems which comprises sending from a station on the first system to a station common to the first and second systems a series of code combinations including a code combination designed to identify a station of the second system together with each message, causing the code combination to control the recording of the message at the common station when the code combination identifies the common station, and causing the code combination to select automatically transmission paths through said second system for the electrical transmission of impulses representing the message when the code combination identifies some station of the second system other than the common station.

86. The method of operating two different types of telegraph systems which comprises sending from a station of the first system to a station common to the first and second systems a series of code combinations including a code combination designed to identify a station of ultimate destination of said message, causing the identifying code combination to control the recording of the message at the common station when said identifying code combination identifies the common station and causing the identifying code combination to select automatically the electrical transmission path for the transmission of impulses representing the message through the second system when the identifying code combination is any code combination other than the code combination identifying said common station.

87. In combination, a first telegraph system comprising a plurality of telegraph stations, a switching center connected to said telegraph stations including equipment for establishing communication paths between said stations for the substantially instantaneous transmission of telegraph signals between said stations, a second telegraph system comprising a second plurality of telegraph stations, a second switching center connected to each of said second plurality of stations, including storage apparatus for storing telegraph signals received from said second plurality of stations, and switching apparatus controlled by stored signals for causing the stored message signals to be automatically conveyed to other stations of said second plurality of stations under the control of stored signals associated with each message, a station common to said two systems comprising apparatus for recording signals directed to said common station and other apparatus for storing message signals directed to other stations of said second system, and apparatus controlled by said stored signals for selecting a transmission path through said second system.

88. A communication system of the type in which a through telegraph communication path for the substantially instantaneous transmission of telegraph signals thereover is set up between local stations through one or more switching offices, a second type of communication system comprising a plurality of local stations and one or more switching offices including apparatus at the switching offices for storing incoming messages and other apparatus for selecting transmission paths through said offices under control of stored signals, a station common to said two systems including a printer, a signal storing device, switching apparatus controlled by signals received from said first system for selectively recording on said printer messages directed to said common station, other switching apparatus for directing messages intended for stations of said second system to said signal storer, and apparatus controlled by said stored signals for selecting transmission paths through said second system.

89. A multiple selective transmission system comprising an office, a storage controlled transmitter in said office, transmission lines outgoing from said office, settable elements, means including said settable elements for identifying the desired ones of said transmission lines over which the transmission of a given message is to be effected simultaneously or successively or partly simultaneously and partly successively, means automatically operating in response to the setting of said elements to cause the transmission of said message to any one or more of said lines as they may be idle and thereafter to other lines after they become idle until said message has been transmitted to all identified lines.

90. A system in accordance with the system set forth in claim 89 in which a settable element individual to each line is unset and each line made available for transmission of other messages upon completion of transmission of the given message thereover.

91. A system in accordance with the systems set forth in claim 89 in which a settable element individual to each line is unset and each line made available for transmission of other messages in response to the transmission of an end-of-message signal transmitted over the respective lines following the transmission of each message thereover.

92. The combination of a recording device including a selector for recording successive code combinations arranged in groups on a flexible medium, each group comprising a message subgroup, an address subgroup, and a conditioning subgroup, a telegraph channel over which currents representing such code combinations are transmitted to control said recording device, other telegraph channels, means operated by a conditioning subgroup to condition said selector to operate, under subsequent control of an address subgroup, to mark one of said channels automatically without manual operation for transmission of a message represented by an associated message subgroup of code combinations, and means including sensing means controlled by said flexible medium automatically to initiate and to control transmission over the marked channel of the message subgroup for which a channel was marked in accordance with the associated address subgroup.

93. A telegraph system including a channel of telegraphic transmission, means for transmitting over said channel code groups of impulses each comprising a message subgroup and a directing subgroup for controlling the transmission selectively of impulses representing the message subgroup, a selector connected to said channel for responding to said code combinations, a recording medium, a recorder for recording under control of said selector said code combinations upon said medium, path identifying means also controlled by said selector, means controlled through said selector by the directing subgroup for controlling said path identifying means to identify a path for transmission of said message code combinations under control of said medium, and means including means wholly automatically operative under control of said medium for first seizing said identified path and then controlling transmission of impulses representing each message over the path thus identified by its associated directing subgroup.

94. A multiple selective telegraph transmission system comprising a switching office, a plurality of stations, lines connecting said stations to said switching office, telegraph message sending equipment at said office, operable means at said main switching office for identifying a plurality of lines over which a single message is to be transmitted from said sending equipment, wholly automatic means to initiate the operation of said sending equipment when all or any line or lines of an identified plurality are or become idle, means operable incident to and under control of said sending means when sending to less than all the identified lines to produce a record in the switching office of the message transmitted, and wholly automatic means operable thereafter to cause transmission of said message under control of said record to other of said identified lines after they become idle.

95. A multiple selective transmission system for wholly automatically transmitting to one or more stations of address a message preceded by a proper address or addresses represented by code combinations and introduced as address and message code combinations into the system wherein transmission of telegraph messages over any one of a plurality of a group of paths may be effected, comprising a transmitter, operable means individual to each line capable of being operated automatically under control of said address code combinations to mark each path of a group over which a message is to be transmitted, operable means wholly automatically controlled by said address code combinations to seize each such path if idle or at a subsequent time when it is idle, busy guard means conditioned incident to such seizure to guard each such path, until freed, from seizure for other messages, means operable to initiate transmission of the broadcast message over each such seized path, and means responsive to and controlled by completion of transmission of a message over a seized path to uncondition such busy guard means and restore to normal such path for use for transmission of other messages.

96. A telegraph system comprising a plurality of stations to which a message may be selectively transmitted, a switching center, channels of transmission from said center to said stations, means for storing a message in mechanical form together with channel identifying data also in mechanical form in said switching center, selective means operable under control of said channel identifying data to select such of said channels over which it is desired to transmit a particular message, transmission means operable under control of said message in mechanical form, and means operable, in combined response to selective operation of said selective means and said transmission means acting under control of said message, to transmit said message over said channels concurrently or successively dependent upon the concurrent or successive idle condition of said channels.

97. A multiple selective telegraph transmission system comprising a main switching office including storage means for code combinations, a plurality of outlying offices, lines connecting said outlying offices to said storage means in said main switching office for storage therein of groups of code combinations representing messages and addresses therefor in mechanical form, message transmitting equipment at said main switching office controlled by said code combinations representing addresses, selective switching means operated automatically in accordance with an address of said form for connecting said transmitting equipment to a single selected line over which a message is to be transmitted, means at said main switching office operable in accordance with a plurality of said address representing code combinations for selecting a plurality of lines over which a single message is to be transmitted concurrently from said transmitting equipment, means automatically operable to initiate the operation of said transmitting equipment to transmit such a message when any of the lines of a selected group is idle, and means to restore to normal at the end of the message the said means for selecting the particular line or lines over which a single message is transmitted concurrently.

98. A multiple selective telegraph transmission system comprising a main switching office, a plurality of outlying stations, lines connecting said outlying stations to said main switching office, storage means for storing in mechanical form series of message codes with each message preceded by address codes also in mechanical form, message transmitting equipment controlled by said medium at said main switching office, selective means operable under control of said address codes for designating two or more of said lines over which a single message is to be transmitted simultaneously, means operable under control of the address codes of said medium for connecting said plurality of lines at the same time to said transmitting equipment, said last-mentioned means including a series of selecting relays, one for each line, and means for actuating the same selectively in accordance with said address codes of said medium, means controlled by said address codes to initiate transmission of a message to all of the selected lines, and means operative at the end of transmission of the message to each line to release said line and restore its corresponding selecting relay to normal.

99. A multiple selective transmission system wherein concurrent transmission of messages over any two or more of a group of lines is effected and each message is terminated by an end-of-message signal, impressing means for impressing in tapes sequences comprising addresses, a message and an end-of-message signal, resettable elements selectively settable in accordance with and under control of said addresses, means including said resettable elements for selecting and automatically seizing the desired ones of said lines over which transmission is to be effected, and means responsive to each end-of-message signal for resetting to normal one of said elements after transmission of the message over its respective line.

100. In a telegraph system, a switching office having lines extending to outlying points, devices for mechanical storage in said offices of two types of messages (a) single address messages and (b) plural address messages, each type of which has code combinations characteristic of its address incorporated therewith at the head of each message arriving over said lines, selectable transmission paths controllable for further transmission under control of said storage devices for furthering the progress of single address messages toward their stations of address, supplemental storage means, means automatically operable under control of the addresses characteristic of plural address messages to direct such messages to and cause their storage in said supplemental storage means, and selective means operable incident to storage in and retransmission of plural address messages from said supplemental storage means to direct each such message selectively to a plurality of paths of further transmission leading away from said supplemental storage means according to its plural address.

101. A switching office having means for storing in physical form as permutated elements both single and multiple address messages each of which as stored is accompanied by its stored single or multiple address, conductive paths, transmission means operable to transmit all messages away from said storage means under control of said elements, selective means operable automatically by all single address messages to transmit them over certain of said conductive paths, special storage means, means whereby said selective means are operable in accordance with the address elements of multiple address messages to divert them from said conductive paths to said special storage means, and automatic means selectively operable in accordance with said multiple addresses as stored in said special storage means to transmit such messages away therefrom over a plurality of paths in accordance with their respective addresses.

WALTER M. BACON.